US007976092B2

(12) United States Patent
Meredith et al.

(10) Patent No.: US 7,976,092 B2
(45) Date of Patent: Jul. 12, 2011

(54) VEHICLE SAFETY SEAT

(75) Inventors: Jeffery W. Meredith, Noblesville, IN (US); James R. Chinni, Noblesville, IN (US)

(73) Assignee: Indiana Mills & Manufacturing Inc., Westfield, IN (US)

( * ) Notice: Subject to any disclaimer, the term of this patent is extended or adjusted under 35 U.S.C. 154(b) by 0 days.

(21) Appl. No.: 12/892,673

(22) Filed: Sep. 28, 2010

(65) Prior Publication Data

US 2011/0018316 A1 Jan. 27, 2011

Related U.S. Application Data

(62) Division of application No. 11/665,690, filed as application No. PCT/US2005/037535 on Oct. 19, 2005, now abandoned.

(60) Provisional application No. 60/620,407, filed on Oct. 19, 2004, provisional application No. 60/645,298, filed on Jan. 20, 2005, provisional application No. 60/672,339, filed on Apr. 18, 2005.

(51) Int. Cl.
*B60N 2/005* (2006.01)

(52) U.S. Cl. ...... 296/63; 296/68.1; 296/65.03; 280/735; 297/217.3

(58) Field of Classification Search .......... 296/68.1, 296/63, 65.03; 280/735, 807, 801.2; 297/216.17, 297/217.3
See application file for complete search history.

(56) References Cited

U.S. PATENT DOCUMENTS

| 4,015,860 | A | 4/1977 | Tisell et al. | |
|---|---|---|---|---|
| 6,142,507 | A | 11/2000 | Okuda et al. | |
| 6,257,641 | B1 * | 7/2001 | Fritz et al. | 296/65.03 |
| 6,322,140 | B1 | 11/2001 | Jessup et al. | |
| 6,356,194 | B1 | 3/2002 | Fukui et al. | |
| 6,582,015 | B2 | 6/2003 | Jessup et al. | |
| 2003/0182042 | A1 | 9/2003 | Watson et al. | |
| 2004/0254729 | A1 | 12/2004 | Browne et al. | |

FOREIGN PATENT DOCUMENTS

| GB | 2304540 | 3/1997 |
|---|---|---|
| WO | 2001045985 | 6/2001 |

OTHER PUBLICATIONS

PCT International Search Report and Written Opinion for related PCT International Application No. PCT/US05/37535 (12 sheets).
European Search Report for European App. No. 05810248.4-2424, date completed Sep. 15, 2008.

* cited by examiner

*Primary Examiner* — Jason S Morrow
(74) *Attorney, Agent, or Firm* — Barnes & Thornburg LLP

(57) ABSTRACT

A vehicle safety seat may comprise, among other things, a vehicle seat having a seat base configured to be mounted to a support surface of a motor vehicle, and a roll sensor mounted to the seat base. The vehicle seat may be a suspension seat. The vehicle seat may have other sensors, event detection systems or the like mounted thereto. The vehicle seat may include a number of vehicle/occupant safety mechanisms integral therewith.

20 Claims, 29 Drawing Sheets

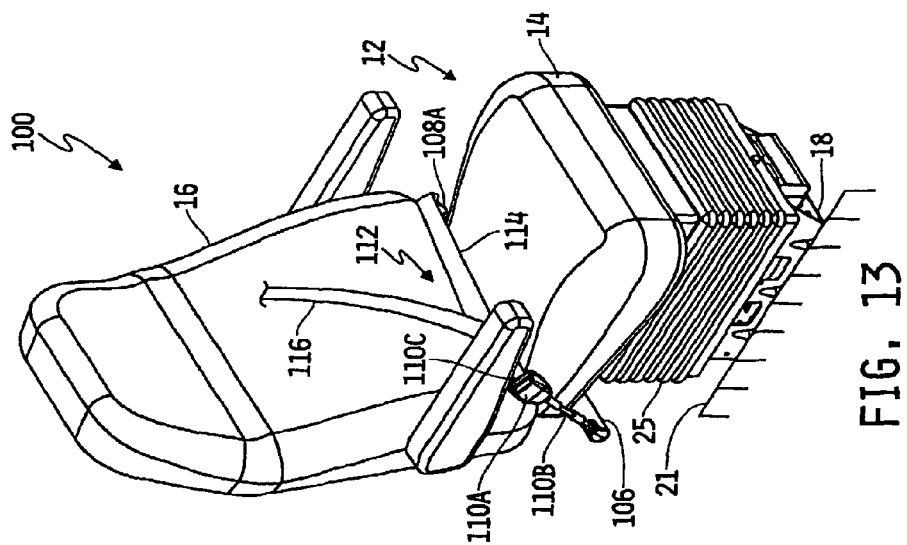
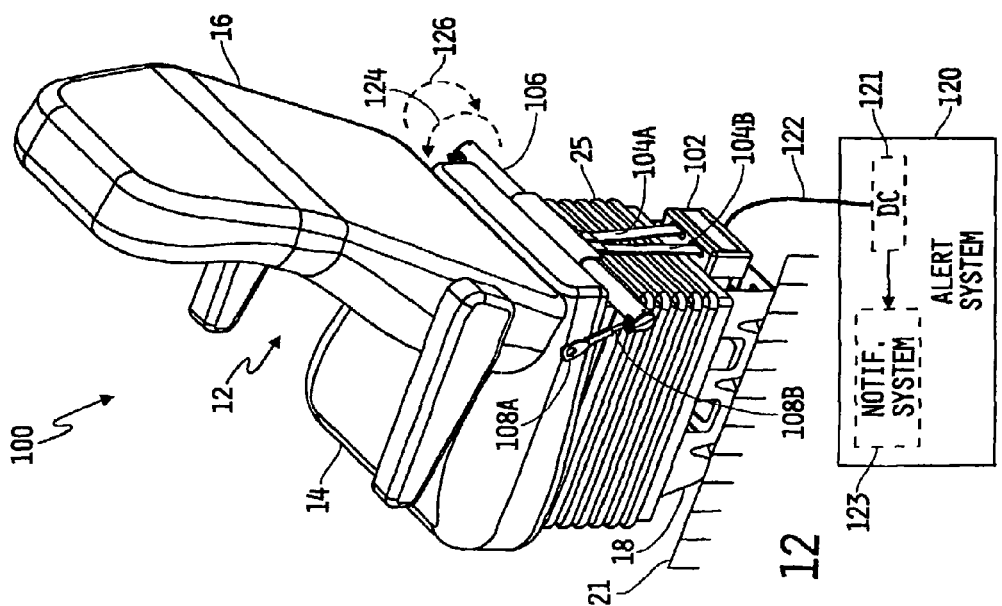

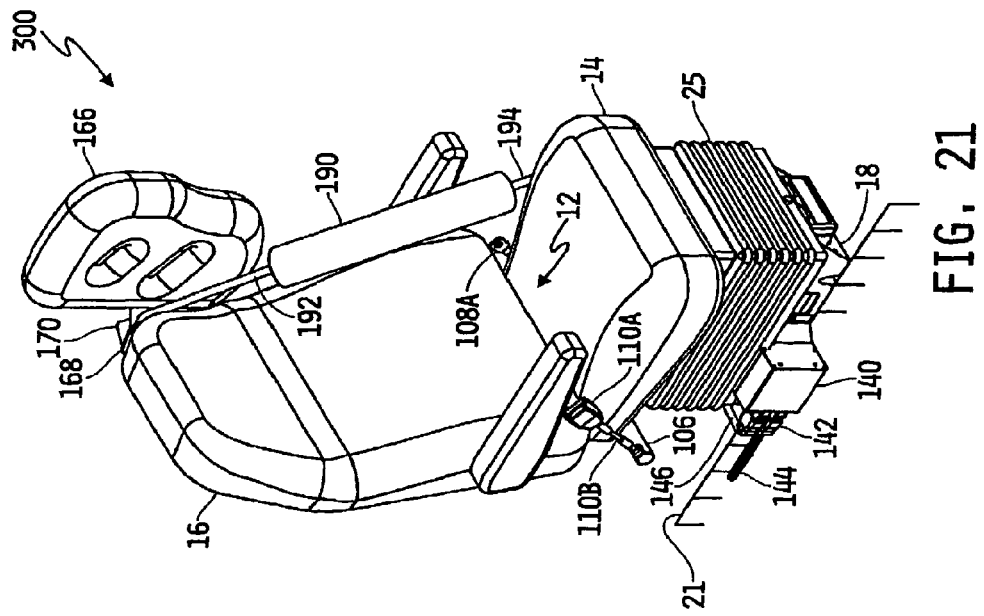
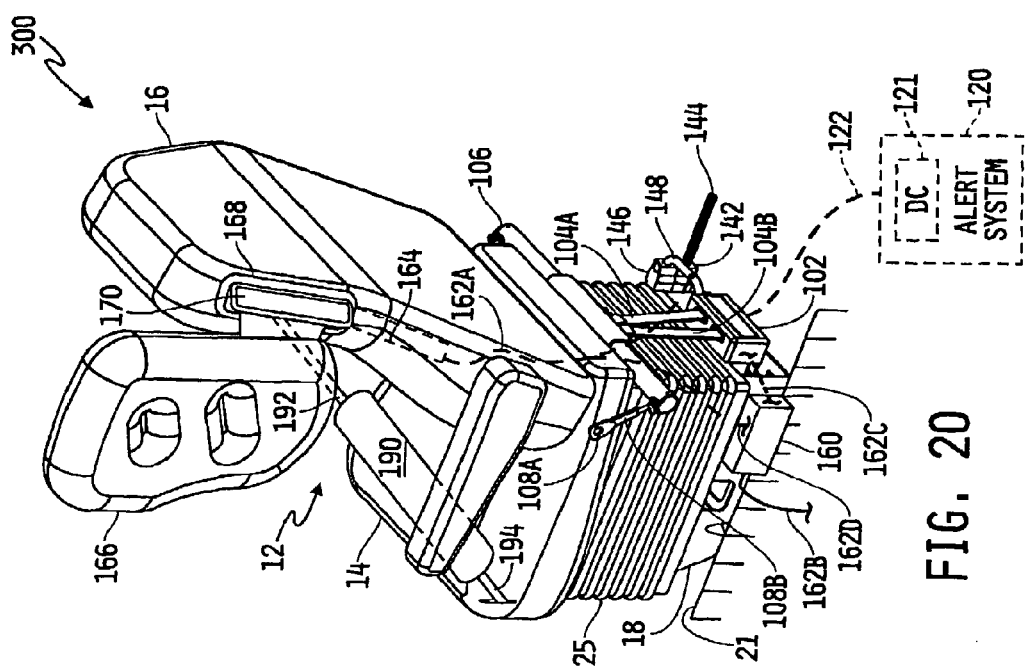

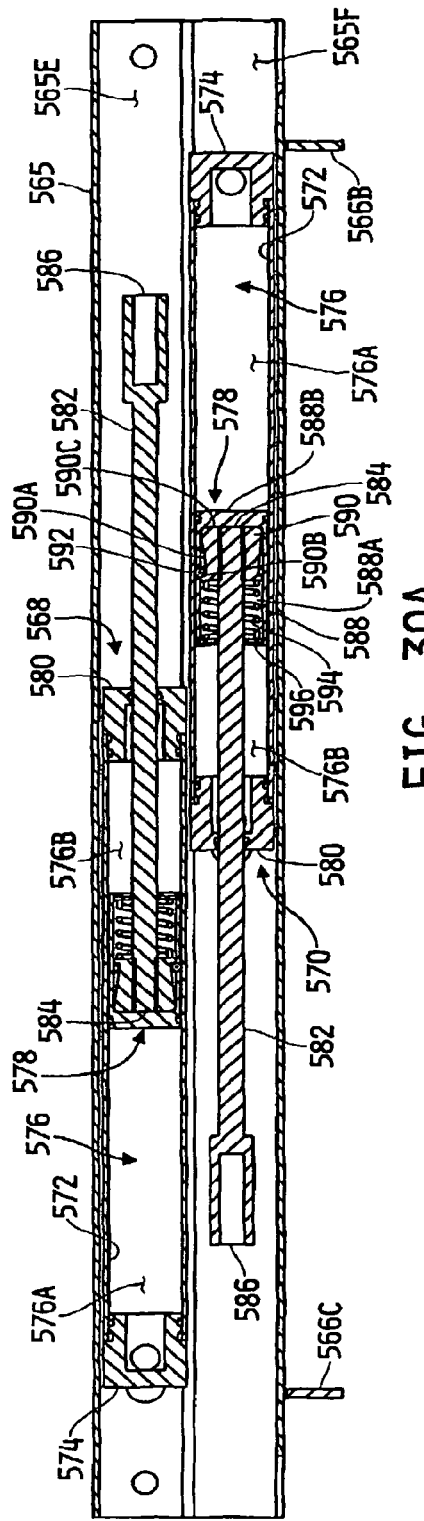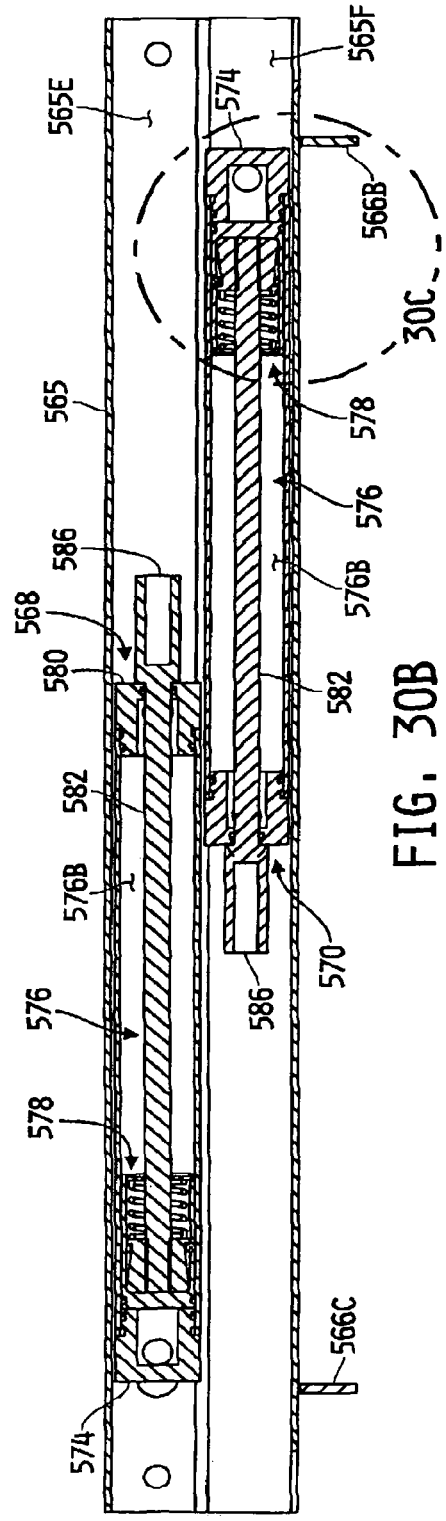
FIG. 30A
FIG. 30B

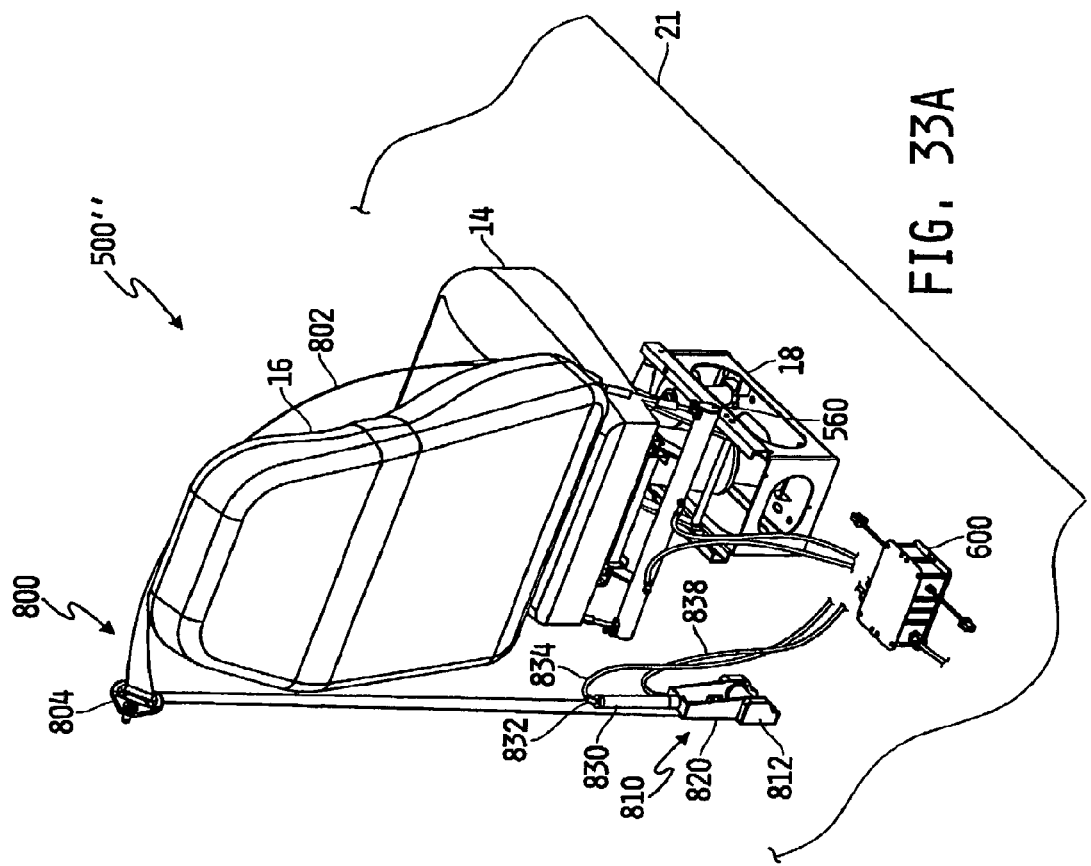
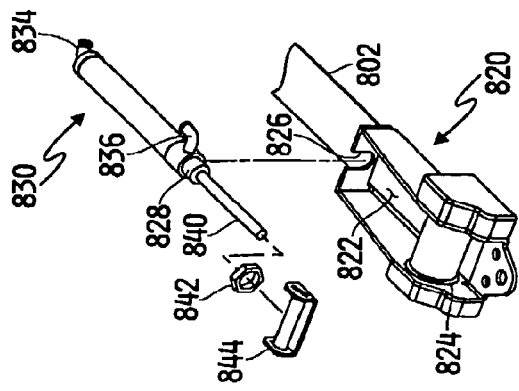

US 7,976,092 B2

VEHICLE SAFETY SEAT

CROSS-REFERENCE TO RELATED U.S. PATENT APPLICATION

This is a divisional of U.S. application Ser. No. 11/665,690, filed Apr. 29, 2007, now abandoned which is a U.S. national counterpart application under 37 C.F.R. §371(b) of PCT international application serial No. PCT/US2005/037535 filed Oct. 19, 2005, which claims priority to and the benefit under 35 U.S.C. §119(e) of U.S. Provisional Patent Application Ser. No. 60/620,407, filed Oct. 19, 2004 and entitled VEHICLE SAFETY SEAT, U.S. Provisional Patent Application Ser. No. 60/645,298, filed Jan. 20, 2005 and entitled SAFETY SEAT FOR A VEHICLE, and U.S. Provisional Patent Application Ser. No. 60/672,339, filed Apr. 18, 2005 and entitled RESETTABLE WEB PRE-TENSIONING DEVICE AND SYSTEM, the disclosures of which are each incorporated herein by reference.

FIELD OF THE INVENTION

The present invention relates generally to occupant seats for motor vehicles, and more specifically to suspension-type vehicle seats including one or more integrated safety features.

BACKGROUND

Alert sensors and/or systems are commonplace in motor vehicles. Such sensors and/or systems are generally operable to produce one or more signals that are indicative of one or more vehicle and/or driver safety compromising events. A number of safety restraint and occupant protection devices and systems can be triggered by such alert sensors and/or systems, and it is desirable to integrate one or more such safety restraint and/or occupant protection devices into a vehicle safety seat generally, and into a suspension-type vehicle seat in particular.

SUMMARY

The present invention may comprise one or more of the features recited in the attached claims, and/or one or more of the following features and combinations thereof. A vehicle safety seat may comprise a suspension seat having a seat base configured to be mounted to a support surface of a motor vehicle, and a roll sensor mounted to the seat base. The roll sensor may include a signal output electrically connected to a signal processor. The signal processor may process a roll sensor signal produced by the roll sensor at the signal output to determine whether a vehicle roll over event is occurring.

The suspension seat may further include an occupant seat mounted to the seat base by a suspension mechanism. The suspension seat may further include an actuator responsive to a seat actuation signal to draw the occupant seat toward the seat base to a locked position relative to the seat base. The signal processor may be configured to produce the seat actuation signal when the signal processor determines that the vehicle roll over event is occurring.

In one embodiment, the vehicle safety seat may further include a number of attachment members for securely mounting the seat base to the support surface of the vehicle. The vehicle safety seat may further include an electrical connector configured for electrical connection to the roll sensor. The vehicle safety seat may further include a safety member inhibiting access to and removal of at least one of the number of attachment members. The electrical connector may inhibit access to the safety member when electrically connected to the roll sensor. The electrical connector may be a voltage supply electrical connector configured to supply an operating voltage to the roll sensor. Alternatively the electrical connector may be a signal connector configured to provide a roll sensor signal produced by the roll sensor to a signal processor.

The number of attachment members may include at least a first bolt configured to extend through the seat base and engage the support surface of the vehicle. The safety member may include a second bolt extending into the seat base and over the first bolt, wherein the second bolt inhibits access to the first bolt when extended through the seat base and over the first bolt. The seat base may include an engaging member configured to receive the second bolt, wherein the second bolt is configured to extend into the seat base and into engagement with the engaging member. The roll sensor may be positioned relative to the seat base so that the electrical connector inhibits access to the second bolt when the electrical connector is electrically connected to the roll sensor.

In one alternative embodiment, the electrical connector may inhibit movement of the safety member relative to the seat base when electrically connected to the roll sensor. In this embodiment, the electrical connector may be or include either of a voltage supply electrical connector configured to supply an operating voltage to the roll sensor and a signal connector configured to provide a roll sensor signal produced by the roll sensor to a signal processor. The safety member may include a safety plate mounted to the seat base, and the safety plate may be positioned relative to the seat base to inhibit access to the first bolt. A portion of the safety plate may be positioned between the electrical connector and the roll sensor, wherein the electrical connector inhibits movement of the safety plate relative to the seat base when electrically connected to the roll sensor. A sensor mounting bracket may have the roll sensor mounted thereto, with the sensor mounting bracket mounted to the seat base via a plurality of mounting elements. Another portion of the safety plate may extend over at least one of the plurality of mounting elements to inhibit access thereto and thereby inhibit removal of the sensor mounting bracket. The sensor mounting bracket may include at least one anti-rotation tab extending over a portion of the seat base. The at least one anti-rotation tab may engage the seat base and prevent rotation of the sensor mounting bracket relative to the seat base when enough of the plurality of mounting elements have been removed to otherwise permit rotation of the sensor mounting bracket relative to the seat base.

In another alternative embodiment, the vehicle safety seat may further include a vehicle seat mounting plate having a bottom plate member configured to be attached to the support surface of any of a number of different vehicles and a top plate configured to be attached to the seat base and to the bottom plate member to thereby mount the seat base to the support surface of the vehicle. The vehicle safety seat may further include at least one electrical wire that is electrically connected to the roll sensor and that is required for operation of the roll sensor. The vehicle safety seat may further include a contact switch mounted to one of the top and the bottom plate members. The contact switch may be closed by the other of the top and bottom plate members when contacted thereby, and the contact switch may be opened when the top and bottom plate members are moved sufficiently away from each other. The contact switch may be interposed in-line with the at least one electrical wire such that the roll sensor is operable when the contact switch is closed and the roll sensor is inoperable when the contact switch is open. The at least one electrical wire may be one of a ground wire connecting a voltage supply to the roll sensor and a signal wire connecting the roll sensor to a signal processor.

A vehicle safety seat may comprise a vehicle seat for a motor vehicle, a restraint harness for restraining movement of an occupant relative to the vehicle seat, and a restraint harness actuator mounted to the restraint harness. A collision alert system may produce a collision alert signal indicative of an impending collision with an object in the path of the motor vehicle. A first decision-making circuit may be responsive to the collision alert signal to control the restraint harness actuator to move the restraint harness and thereby provide the occupant with a tactile indicator of the impending collision with the object.

The vehicle seat may be a suspension seat coupled to a seat base that is mounted to a support surface of the vehicle. The restraint harness actuator may be mounted to the seat base. The first decision-making circuit may be responsive to the collision alert signal to control the restraint harness actuator to tighten the restraint harness about the occupant.

The vehicle safety seat may further include a roll sensor module mounted to the seat base. The roll sensor module may include a roll sensor producing a roll signal upon detection of a vehicle roll over event and a second decision-making circuit responsive to the roll signal to control the restraint harness actuator to pull the suspension seat toward the seat base. The vehicle safety seat may further include an impact sensor module mounted to the seat base. The impact sensor module may include an impact sensor producing an impact signal upon detection of an impact of the vehicle of sufficient severity and a third decision-making circuit responsive to the impact signal to pull the suspension seat toward the seat base.

The vehicle safety seat may further including an inflatable restraint carried within the vehicle seat. The second decision-making circuit may be responsive to the roll signal to control the restraint harness actuator to deploy the inflatable restraint. The vehicle safety seat may further include an impact sensor module mounted to the seat base. The impact sensor module may include an impact sensor producing an impact signal upon detection of an impact of the vehicle of sufficient severity and a third decision-making circuit responsive to the impact signal to pull the suspension seat toward the seat base. The third decision-making circuit may be responsive to the impact signal to deploy the inflatable restraint.

The vehicle safety seat may further include a resettable restraint cushion carried by the vehicle seat. The second decision-making circuit may be responsive to the roll signal to control the restraint harness actuator to deploy the resettable restraint cushion. The vehicle safety seat may further include an impact sensor module mounted to the seat base, the impact sensor module including an impact sensor producing an impact signal upon detection of an impact of the vehicle of sufficient severity and a third decision-making circuit responsive to the impact signal to pull the suspension seat toward the seat base. The third decision-making circuit may be responsive to the impact signal to deploy the resettable restraint cushion.

The vehicle safety seat may further include at least one electrical connector electrically connectable to the roll sensor module, and at least one attachment member for mounting the roll sensor module to the seat base. The at least one electrical connector may block access to the at least one attachment member when the at least one electrical connector is electrically connected to the roll sensor module. The at least one attachment member may be accessible to thereby detach the roll sensor module from the seat base only if the at least one electrical connector is electrically disconnected from the roll sensor module.

The vehicle safety seat may further include an inflatable restraint carried within the vehicle seat, and a roll sensor module mounted to the seat base. The roll sensor module may include a roll sensor producing a roll signal upon detection of a vehicle roll over event and a second decision-making circuit responsive to the roll signal to deploy the inflatable restraint.

The vehicle safety seat may further include a resettable restraint cushion carried by the vehicle seat, and a roll sensor module mounted to the seat base. The roll sensor module may include a roll sensor producing a roll signal upon detection of a vehicle roll over event and a second decision-making circuit responsive to the roll signal to deploy the resettable restraint cushion.

The vehicle safety seat may further include an inflatable restraint carried within the vehicle seat, and an impact sensor module mounted to the seat base. The impact sensor module may include an impact sensor producing an impact signal upon detection of an impact of the vehicle of sufficient severity and a second decision-making circuit responsive to the impact signal to deploy the inflatable restraint.

The vehicle safety seat may further include an impact sensor module mounted to the seat base. The impact sensor module may include an impact sensor producing an impact signal upon detection of a vehicle impact of sufficient severity and a second decision-making circuit responsive to the impact signal to control the restraint harness actuator to pull the suspension seat toward the seat base.

A vehicle safety seat may comprise a suspension seat coupled to a seat base mounted to a support surface of a motor vehicle. A roll sensor module may be mounted to the seat base. The roll sensor module may include a roll sensor and a first decision-making circuit producing a roll signal upon detection by the roll sensor of a vehicle roll over event. An impact sensor module may be mounted to the seat base. The impact sensor module may include an impact sensor and a second decision-making circuit producing an impact signal upon detection by the impact sensor of an impact of the vehicle of sufficient severity. A seat actuator may be responsive to the roll signal or the impact signal to pull the suspension seat toward the seat base.

The vehicle safety seat may further include a restraint harness for restraining an occupant of the suspension seat. The restraint harness may be mounted to the seat actuator. The seat actuator may be configured to pull the suspension seat toward the seat base by pulling the restraint harness toward the seat base.

The vehicle safety seat may further include an inflatable restraint carried within the vehicle seat, and an inflator responsive to the roll signal or the impact signal to deploy the inflatable restraint. The inflatable restraint may include a first inflatable bladder carried within a seat back portion of the suspension seat. The first inflatable bladder may be configured to deploy adjacent to one side of the seat back portion about a head region of the occupant to thereby provide a cushion for one side of the occupant's head. The inflatable restraint may include a second inflatable bladder carried within the suspension seat. The second inflatable bladder may be configured to deploy adjacent to one side of the vehicle seat. The second inflatable bladder may extend in its deployed state between a seat back portion of the vehicle seat and a seat portion of the vehicle seat to thereby provide a cushioned restraint adjacent to the one side of the vehicle seat. The first and second inflatable bladders may be integrated into a single inflatable bladder.

A vehicle safety seat may comprise a vehicle seat including a seat portion mounted to a motor vehicle and a seat back portion extending away from the seat portion. A sensor module may include a sensor and a decision-making circuit producing an activation signal upon detection by the sensor of a condition of the motor vehicle. An inflatable restraint may be carried within the vehicle seat and responsive to the activation signal to deploy an inflatable bladder from the vehicle seat. The inflatable bladder may include a first bladder portion configured to deploy adjacent to one side of the seat back portion about a head region of an occupant of the vehicle seat to thereby provide a cushion for one side of the occupant's head upon impact of the vehicle of sufficient severity. The inflatable bladder may include a second bladder portion integral with the first bladder portion and configured to deploy adjacent to the one side of the vehicle seat upon impact of the vehicle of sufficient severity, the second bladder portion extending in its deployed state between the seat back portion of the vehicle seat and the seat portion of the vehicle seat to thereby provide a cushioned restraint adjacent to the one side of the vehicle seat. The sensor module may be a roll sensor module, the sensor is a roll sensor and the decision-making circuit is configured to produce the activation signal upon detection by the roll sensor of a vehicle roll over condition. The sensor module may alternatively be an impact sensor module, the sensor is an impact sensor and the decision-making circuit is configured to produce the activation signal upon detection by the impact sensor of a vehicle impact of sufficient severity. The vehicle seat may be a suspension seat coupled to a seat base that is mounted to the support surface of the vehicle. The sensor module may be mounted to the seat base.

A vehicle safety seat may comprise a vehicle seat including a seat portion mounted to a motor vehicle and a seat back portion extending away from the seat portion. At least one sensor may produce an occupant signal indicative of whether or not the vehicle seat is occupied. At least one safety mechanism may be carried by the vehicle seat. The at least one safety mechanism may be configured to be activated upon detection of a vehicle safety related event. A decision making circuit may be configured to inhibit activation of the at least one safety mechanism if the occupant signal indicates that the vehicle seat is not occupied. The vehicle seat may be a suspension seat. The at least one safety mechanism may include any of a seat pull down mechanism, one or more inflatable restraints and one or more deployable cushion restraints.

A vehicle safety seat may comprise a vehicle seat including a seat portion mounted to a motor vehicle and a seat back portion extending away from the seat portion. A vehicle safety event detection system may be mounted to the vehicle seat and configured to produce an event signal upon detection of a vehicle safety related event. A notification system may be mounted to the vehicle seat. The notification system may be responsive to the event signal to transmit a notification signal to a remote location.

The vehicle safety event detection system may include a roll sensor configured to produce the event signal upon detection of a vehicle roll over event. Alternatively or additionally, the vehicle safety event detection system may include an impact sensor configured to produce the event signal upon detection of a vehicle impact of sufficient severity. Alternatively or additionally, the vehicle safety event detection system may include a medical condition monitor configured to produce the event signal upon detection of a predefined medical condition of a driver of the vehicle. The medical condition monitor may be, for example, a blood alcohol monitor. The blood alcohol monitor may be configured to produce the event signal upon detection of a blood alcohol content of the driver that is above a predefined blood alcohol level. Alternatively or additionally, the vehicle safety event detection system may include a vehicle operation monitor configured to produce the event signal upon detection of either of inoperability and compromised operability of the vehicle.

The notification system may include a cellular telephone system configured to transmit the notification signal by placing a call to the remote location. Alternatively or additionally, the notification system may include a satellite transmission system configured to transmit the notification signal via satellite transmission. Alternatively or additionally, the notification system may include a global positioning system configured to determine a geographical location of the vehicle. The event signal, in this case, may include information relating to the geographical location of the vehicle.

A resettable web pre-tensioning device may comprise a housing, a guide member and a linear actuator. The housing may define a channel therein. The guide member may have one end extending into the channel and an opposite end extending out of the channel and configured to be secured to the web. The linear actuator may be disposed within the channel and may be mounted to the one end of the guide member. The linear actuator and guide member may together be movable along the channel between a web pre-tensioning position and a web reset position.

The linear actuator may include a piston assembly. The device may further comprise a first space defined between the piston assembly and one end of the channel, and a second space defined between the piston assembly and an opposite end of the channel. The piston assembly may be movable between the web pre-tensioning and web reset positions as a function of pressure levels within the first and second spaces. The piston assembly may be responsive to a first set of pressure levels within the first and second spaces to assume the web reset position relative to the channel such that the opposite end of the guide member extends a first distance from the one end of the channel. The piston assembly may be responsive to a second set of pressure levels within the first and second spaces to assume the web pre-tensioning position relative to the channel such that the opposite end of the guide member extends a second distance, less than the first distance, from the one end of the channel.

The piston assembly may comprise a load member secured to the one end of the guide member, and a locking member associated with the load member. The load member may cause the locking member to lock the piston assembly to the housing when sufficient force is applied to the guide member in a direction away from the channel. The piston assembly may further comprise a retaining member positioned over the guide member, and a spring member positioned between the retaining member and the load member. The load member may move toward the retaining member and compresses the spring member against the retaining member when the sufficient force is applied to the guide member in a direction away from the channel. The movement of the load member toward the retaining member may force the locking member into locking engagement between the load member and the housing. The piston assembly further includes a piston receiving therein the load member, the locking member and the spring member with the retaining member engaging an open end of the piston. The locking member may be positioned between the load member and the piston. The movement of the load member toward the retaining member may force the locking member into locking engagement with the housing with the piston positioned therebetween. The piston may define a sidewall extending between the open end of the piston and a closed end of the piston. The load member may be positioned between the closed end of the piston and the spring member. The load member may define an outer surface, at least a portion of which slopes away from the sidewall of the piston in a direction away from the closed end of the piston. The movement of the load member toward the retaining member may force the locking member along the sloped outer surface of the load member and into locking engagement with the housing with the sidewall of the piston positioned therebetween. The sidewall of the piston may define a deformable portion. The movement of the load member toward the retaining member may force the locking member along the sloped outer surface of the load member and into engagement with the deformable portion of the sidewall of the piston. The locking member may deform the deformable portion of the sidewall of the piston and lockingly engaging the housing with the deformable portion of the sidewall of the piston positioned therebetween. The locking member may comprise a plurality of bead members at least partially circumscribing the load member.

Alternatively, the linear actuator may comprise a fluidic muscle actuator responsive to pressurized air to move to the web pre-tensioning position and to the absence of air pressure to move to the web reset position.

The resettable web pre-tensioning device may include two sets of housings, guide members and linear actuators, wherein the opposite end of one guide member is configured to be secured to one end of the web and the opposite end of the remaining guide member is configured to be secured to an opposite end of the web. The device may further including a carrier carrying the two sets of housings, guide members and linear actuators therein. The carrier may be configured to be mounted to a seat of a motor vehicle. Alternatively, the housing may be mounted to a floor of the vehicle.

The web may comprise at least part of a restraint harness coupled to a seat for a motor vehicle. The seat may be a suspension seat for a motor vehicle. The restraint harness may be a multiple-point restraint harness.

A resettable web pre-tensioning system may comprise a housing, a linear actuator, a guide member, means for producing a pre-tension signal, and a decision making circuit. The housing may define a channel therein. The linear actuator may be disposed within the channel and may be movable longitudinally along the channel. The guide member may have one end secured to the linear actuator and an opposite end configured to be secured to the web. The decision making circuit may be responsive to the pre-tension signal to control movement of the linear actuator relative to the channel in a manner that moves the guide member to a web pre-tension position. The decision making circuit may be responsive to a reset signal to control the linear actuator in a manner that moves the guide member to a web reset position. The means for producing the pre-tension signal may further include means for producing the reset signal. Alternatively or additionally, the decision making circuit may be operable to produce the reset signal after a predetermined time period has elapsed since production of the pre-tension signal.

The linear actuator may comprise a piston assembly. The housing may define a first space between the piston assembly and one end of the channel, and a second space between the piston assembly and an opposite end of the channel. The decision making circuit may be operable to control movement of the piston assembly between the web pre-tensioning and web reset positions by controlling pressure levels within the first and second spaces. The piston assembly may be responsive to a first set of pressure levels within the first and second spaces to assume the web reset position relative to the channel such that the opposite end of the guide member extends a first distance from the one end of the channel. The piston assembly may be responsive to a second set of pressure levels within the first and second spaces to assume the web pre-tensioning position relative to the channel such that the opposite end of the guide member extends a second distance, less than the first distance, from the one end of the channel.

The system may further including an air control unit having an inlet configured to receive pressurized air from a source of pressurized air, at least a first outlet in fluid communication with the first space and at least a second outlet in fluid communication with the second space. The decision making circuit may be responsive to the pre-tension signal to control the air control unit to establish the second set of pressure levels within the first and second spaces. The decision making circuit may be responsive to the reset signal to control the air control unit to establish the first set of pressure levels within the first and second spaces. The source of pressurized air may be a pressurized air tank carried by a motor vehicle.

The system may include two sets of housings, guide members and linear actuators. The opposite end of one guide member may be configured to be secured to one end of the web and the opposite end of the remaining guide member may be configured to be secured to an opposite end of the web. The system may further include a carrier carrying the two sets of housings, guide members and linear actuators therein. The carrier may be configured to be mounted to a seat of a motor vehicle. The seat may be a suspension seat. The web may comprise at least part of a restraint harness coupled to the seat. The restraint harness may be a multiple-point restraint harness.

A method for controlling a web pre-tensioning device coupled to a vehicle seat may comprise moving the web from a reset position relative to the vehicle seat to a pre-tension position relative to the vehicle seat in response to a pre-tension control signal, and moving the web from the pre-tension position to the reset position in response to a reset signal.

The method may further include monitoring a web pre-tension indicator device for production of the pre-tension control signal. The method may additionally or alternatively further include monitoring the web pre-tension indicator device for production of the reset signal.

A restraint system may comprise a vehicle suspension seat and at least one web. The vehicle suspension seat may have a seat base configured to be mounted to a support structure of a vehicle, a seat bottom and a suspension mechanism positioned between the support structure and the seat bottom. The at least one web may have a first end configured to be secured to the support structure and a second end attached to the seat bottom. The at least one web may restrain forward movement of the vehicle suspension seat. The at least one web may include a plurality of webs. The restraint system may further include at least one locking retractor mounted to the seat bottom. The second end of the at least one web may be attached to the at least one retractor.

A vehicle safety seat may comprise a vehicle seat including a seat portion mounted to a motor vehicle and a seat back portion extending away from the seat portion. A control system may be mounted to the vehicle seat. The control system may be responsive to a vehicle warning condition to produce an activation signal. A warning device may be mounted to the seat. The warning device may be responsive to the activation signal to provide either of an audible and a tactile indicator to a driver of the vehicle to alert the driver to the vehicle warning condition.

BRIEF DESCRIPTION OF THE DRAWINGS

FIG. 12 is a rear perspective view showing one embodiment of a vehicle safety seat including a suspension seat coupled to a seat base that is mounted to a support surface of a motor vehicle.

FIG. 13 is a front perspective view of the vehicle safety seat of FIG. 12.

FIG. 20 is a rear perspective view showing yet another embodiment of a vehicle safety seat including a suspension seat coupled to a seat base that is mounted to a support surface of a motor vehicle.

FIG. 21 is a front perspective view of the vehicle safety seat of FIG. 20.

FIGS. 30A and 30B are cross-sectional views of the resettable web pre-tensioning device of FIGS. 26-29, viewed along section lines 30A, B-30A, B of FIG. 29, illustrating the device in web reset and web pre-tensioning states respectively.

FIG. 33A is a rear perspective view of a vehicle suspension seat showing another illustrative embodiment of a resettable web pre-tensioning device and system.

FIG. 33B is an exploded view of the resettable web pre-tensioning device of FIG. 33A.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
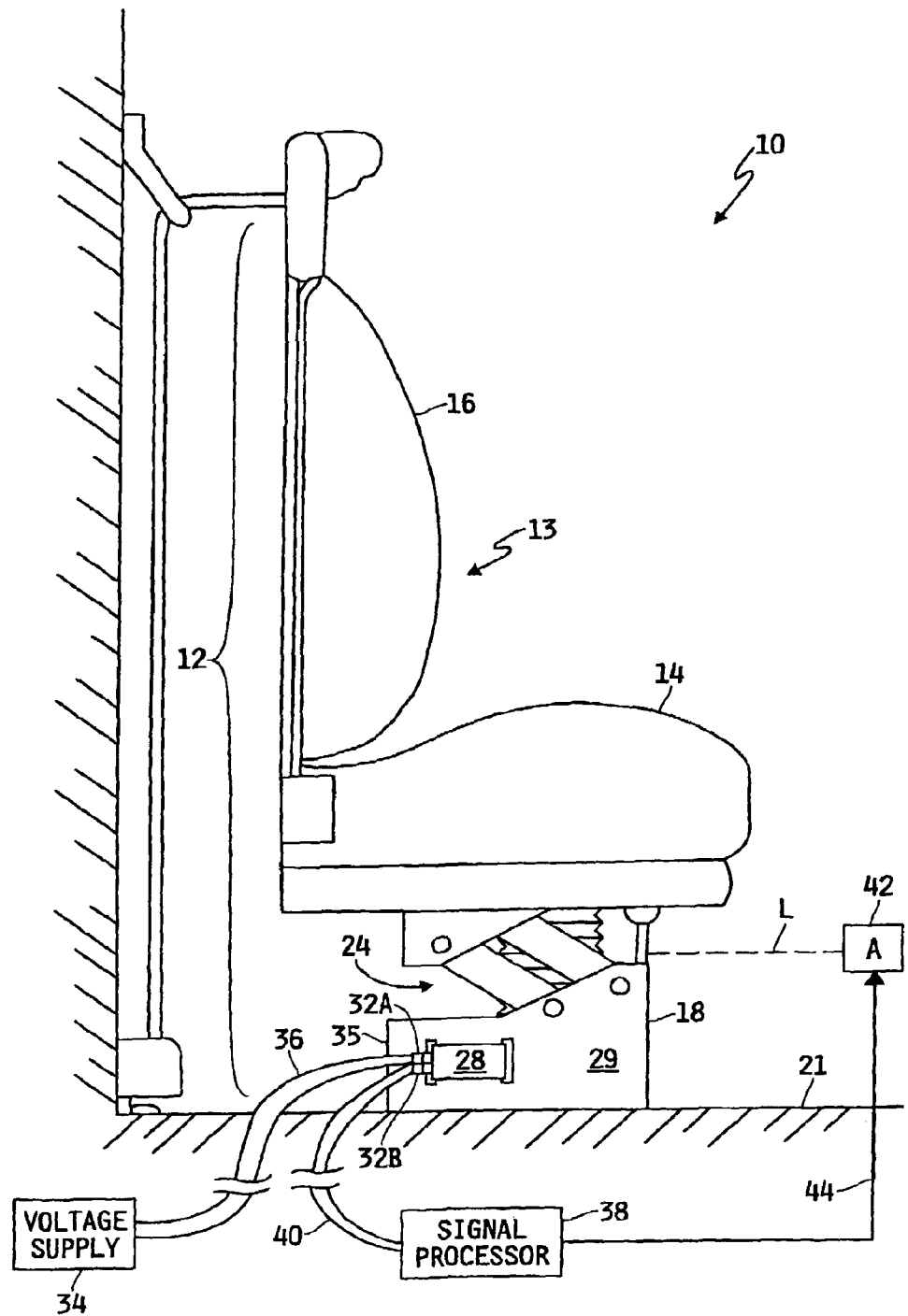
FIG. 1 is a side elevation view showing one embodiment of a vehicle safety seat including a seat base mounted to a support surface of a motor vehicle, and a roll sensor mounted to the seat base.

Referring to FIG. 1, a vehicle safety seat 10 is shown and includes a suspension seat 12 having a seat base 18 mounted to a support surface 21 of the vehicle in a conventional manner via a number of attachment members (not shown in FIG. 1). The number of attachment members may be or include, but are not limited to, conventional threaded bolts configured to engage complementarily threaded bores defined in the support surface 21 of the vehicle.

The suspension seat 12 includes an occupant seat 13 mounted to the seat base 18 via a suspension mechanism 24. In the illustrated embodiment, the suspension mechanism 24 is a conventional pneumatic suspension mechanism, although the suspension mechanism 24 may alternatively be strictly mechanical, electro-mechanical, hydraulic, electro-hydraulic, electro-pneumatic, or the like. In any case, the suspension mechanism 24 is operable in a known manner to suspend the occupant seat 13 above the seat base 18 and at least somewhat isolate the seat 13 from vibrations, road noise and the like that are impressed upon the support surface 21 of the vehicle during normal vehicle operation. The occupant seat 13 itself includes a seat bottom 14 mounted to the suspension mechanism 24 and a seat back 16 extending upwardly and away from the seat portion 14.

A conventional roll sensor 28 is mounted to the seat base 18, and is operable in a conventional manner to produce a roll sensor signal indicative of the orientation of the vehicle relative to a roll over condition. In the illustrated embodiment, the roll sensor 28 is mounted to the right wall 29 of the seat base 18, relative to a forward-facing occupant of the seat 13, and near an interface of the right wall 29 with a rear wall 35 of the seat base 18. It will be understood, however, that the roll sensor 28 may alternatively be mounted at any desired position about the periphery of, within or atop the seat base 28. In any case, the roll sensor 28 has a first roll sensor system electrical connector 32A electrically connected thereto. The electrical connector 32A is also electrically connected to a voltage supply 34 via one or more signal paths 36. A second roll sensor system electrical connector 32B is electrically connected to the roll sensor 28, and is also electrically connected to a signal processor 38 via one or more signal paths 40. In the illustrated embodiment, the first electrical connector 32A is positioned between the second electrical connector 32B and the suspension mechanism 24. Alternatively, the positions of the electrical connectors 32A and 32B may be reversed so that the second electrical connector 32B is positioned between the first electrical connector 32A and the suspension mechanism 24.

The signal processor 38 is also electrically connected to a conventional seat actuator 42 via one or more signal paths 44. The seat actuator 42 is a conventional actuator and is mechanically coupled to the suspension mechanism 24 via a conventional mechanical linkage, L, or other conventional mechanical interface. The signal processor 38 is responsive in a conventional manner to the roll sensor signal produced by the roll sensor 28 to produce a seat actuation signal on the one or more signal paths 44 when the roll sensor signal indicates that a vehicle roll over event is occurring. The seat actuator 42 is responsive in a conventional manner to the seat actuation signal to draw the occupant seat 13 downwardly toward the seat base 18 to a locked position relative to the seat base 18. Thus, during a vehicle roll over event, the occupant seat 13 is drawn downwardly into a locked position relative to the seat base 18 to protect the occupant of the seat 13 during the roll over event.

The signal processor 38 is, in one embodiment, microprocessor-based and operable to execute one or more software algorithms for controlling actuation of the occupant seat 13 as just described. Alternatively, the signal processor 38 may be any general or application specific signal processor circuit configured to control actuation of the occupant seat 13 as just described. In any case, the signal processor 38 may alternatively or additionally be configured to be responsive to the roll sensor signal produced by the roll sensor 28 to actuate one or more other safety features associated or integral with the vehicle safety seat 10 during a vehicle roll over event. Examples of such one or more other safety features include, but are not limited to, one or more inflatable restraints mounted to or integral with the occupant seat 13, one or more actuatable web or belt tightening systems, and the like. Alternatively or additionally still, one or more other sensors may be mounted to or within the seat base 18, or to or within the seat 13, for monitoring other conditions, and the signal processor 38 may be configured in such embodiments to be responsive to the signals produced by the one or more other sensors to actuate any one or more of the foregoing vehicle seat safety features. Examples of such one or more other sensors include, but are not limited to, one or more vehicle impact sensors, or the like.

Figure 2:
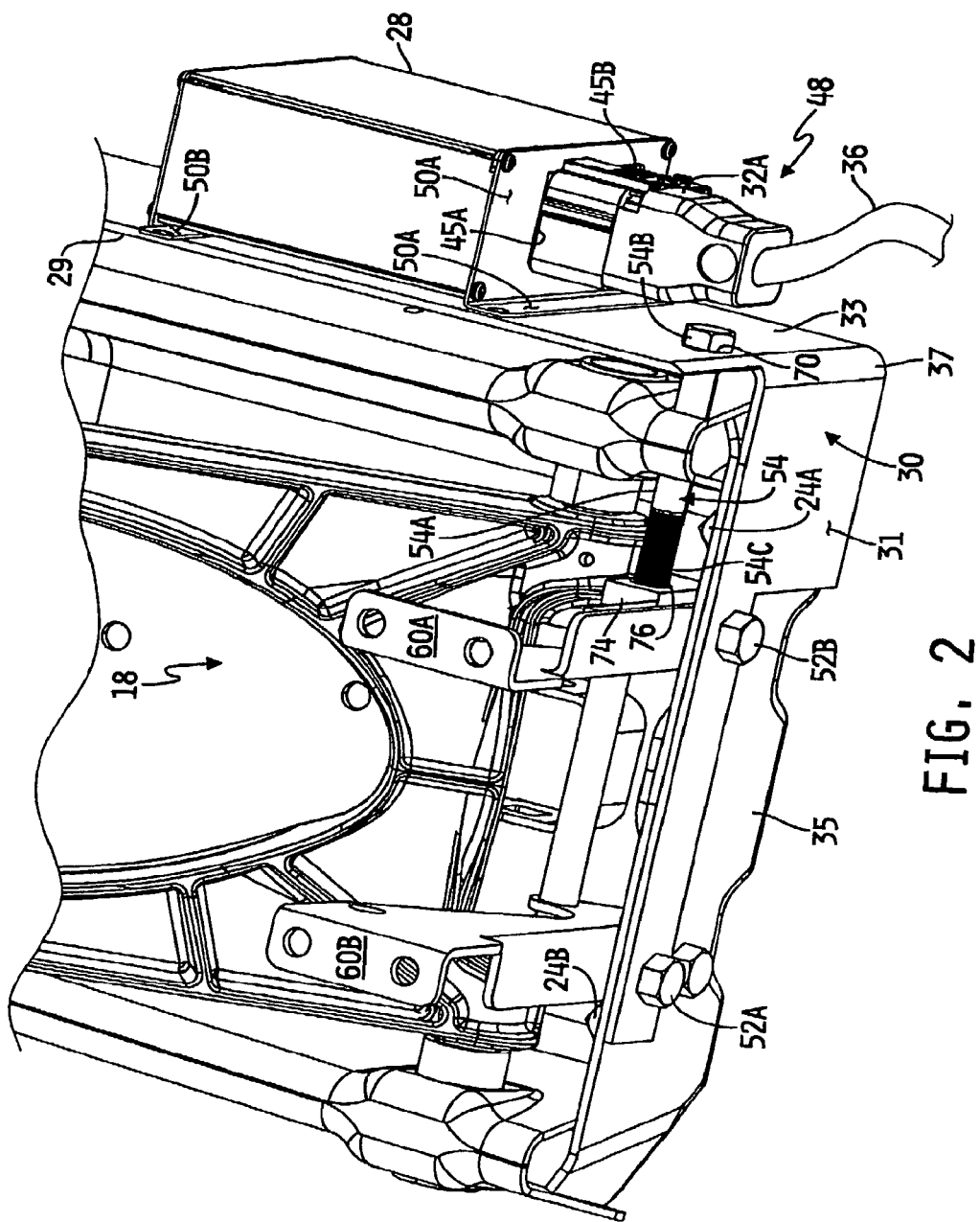
FIG. 2 is a top perspective view of the seat base of FIG. 1, with portions broken away, showing the roll sensor, a safety member inhibiting removal of at least one of the number of attachment members, and an electrical connector connected to the sensor and inhibiting access to the safety member.
Figure 3:
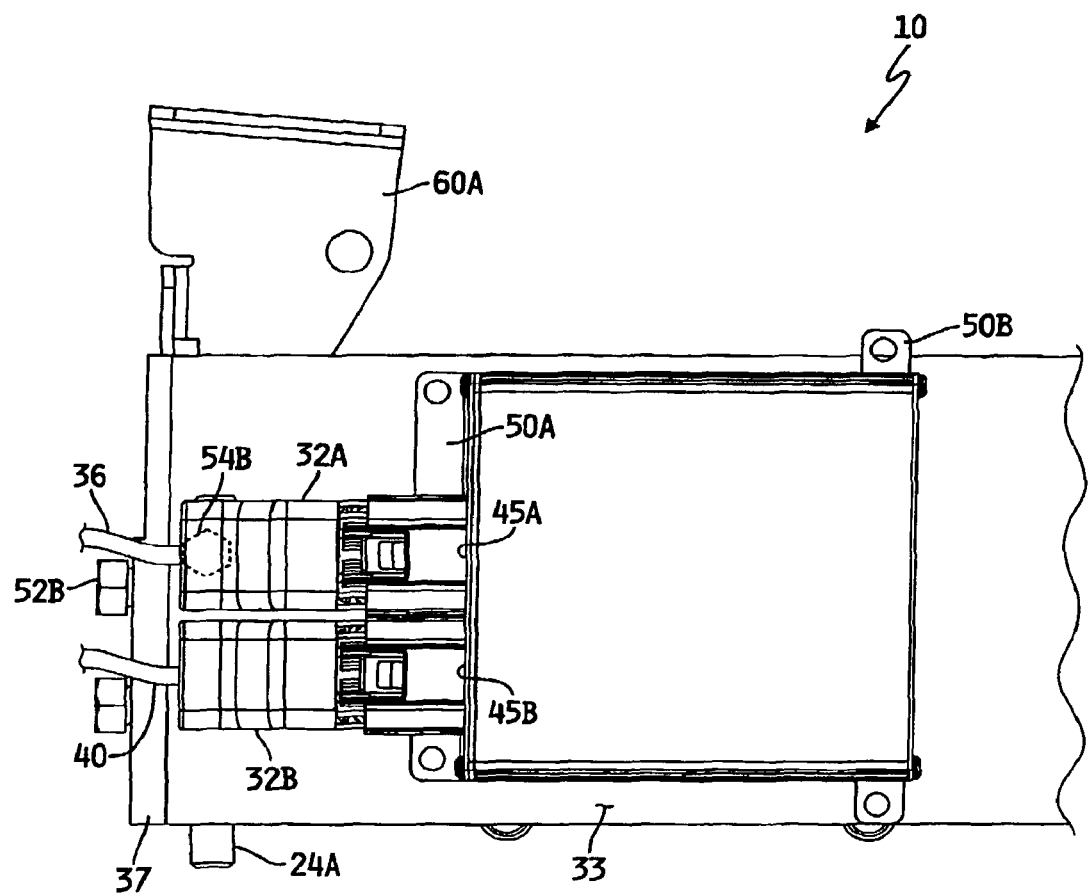
FIG. 3 is a side elevation view of the seat base of FIG. 1, with portions broken away, showing the electrical connector connected to the roll sensor and inhibiting access to the safety member.
Figure 4:
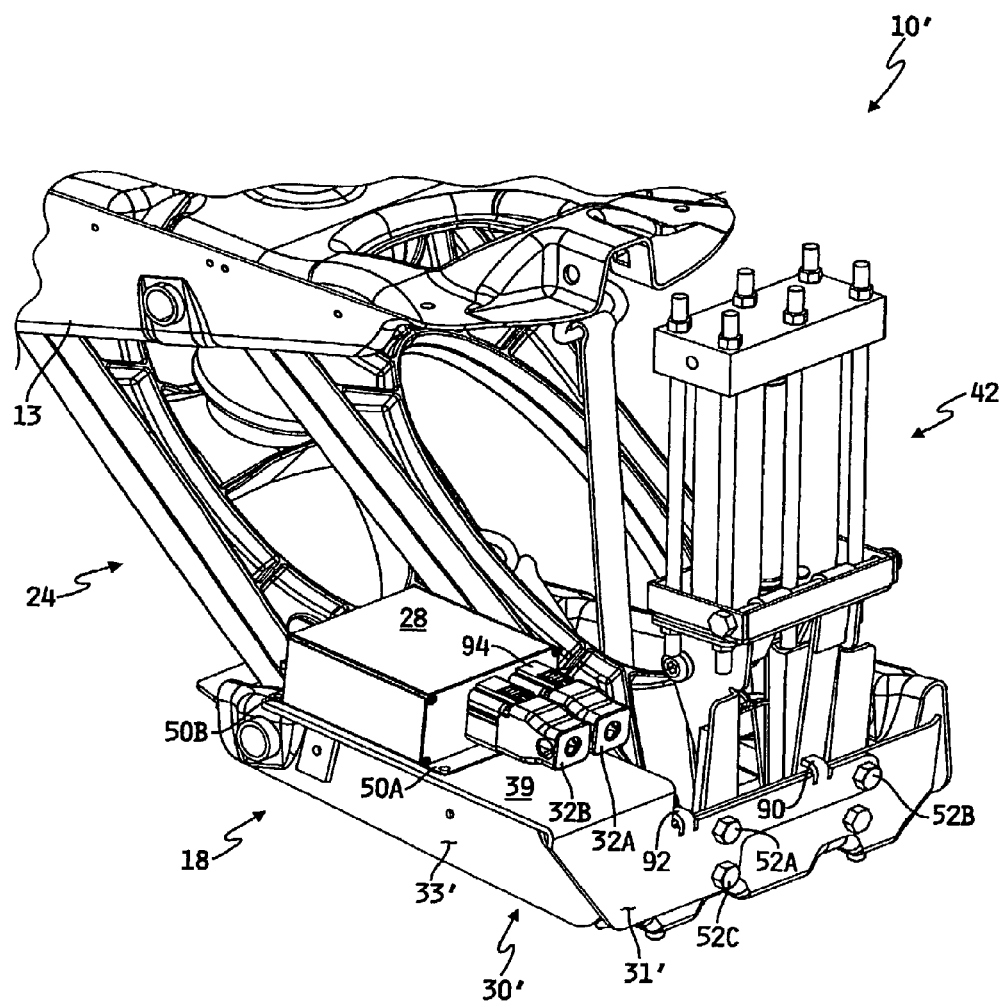
FIG. 4 is a rear perspective view of another embodiment of a vehicle safety seat including a seat base mounted to a support surface of a motor vehicle, and a roll sensor mounted to the seat base.

Referring now to FIGS. 2 and 3, the roll sensor 28 is mounted to a generally L-shaped bracket 30 via a pair of end brackets 50A and 50B. The end brackets 50A and 50B may be removably or non-removably mounted to the roll sensor 28 and/or to the L-shaped bracket 30 via one or more conventional attachment structures and/or techniques. In the illustrated embodiment, the L-shaped bracket includes a first portion 31 mounted to the rear wall 35 of the seat base 18 via a number of attachment members 52A and 52B, and a second portion 33 mounted to the right wall 29 of the seat base via another number of attachment members (only one such attachment member 54 shown in FIGS. 2 and 3). The first and second portions 31 and 33 are coupled together along opposing edges to form a corner portion 37.

Two seat base attachment members 24A and 24B are illustrated in FIG. 2 in the form of threaded bolts extending through the seat base 18 and into engagement with correspondingly threaded bores (not shown) defined in the support surface 21 of the vehicle. It will be understood that the seat base 18 will typically include more seat base attachment members than the two illustrated in FIG. 2, and/or that any one or more of the number of attachment members may alternatively or additionally be provided in the form of other conventional attachment structures. Two upstanding brackets 60A and 60B extend from the seat base 18 and are mounted via conventional attachment structures to the suspension mechanism 24. It will be understood that while two such upstanding brackets 60A and 60B are illustrated in FIG. 2, the seat base 18 may alternatively include more or fewer such upstanding brackets for attachment to the suspension mechanism 24.

Figure 8:
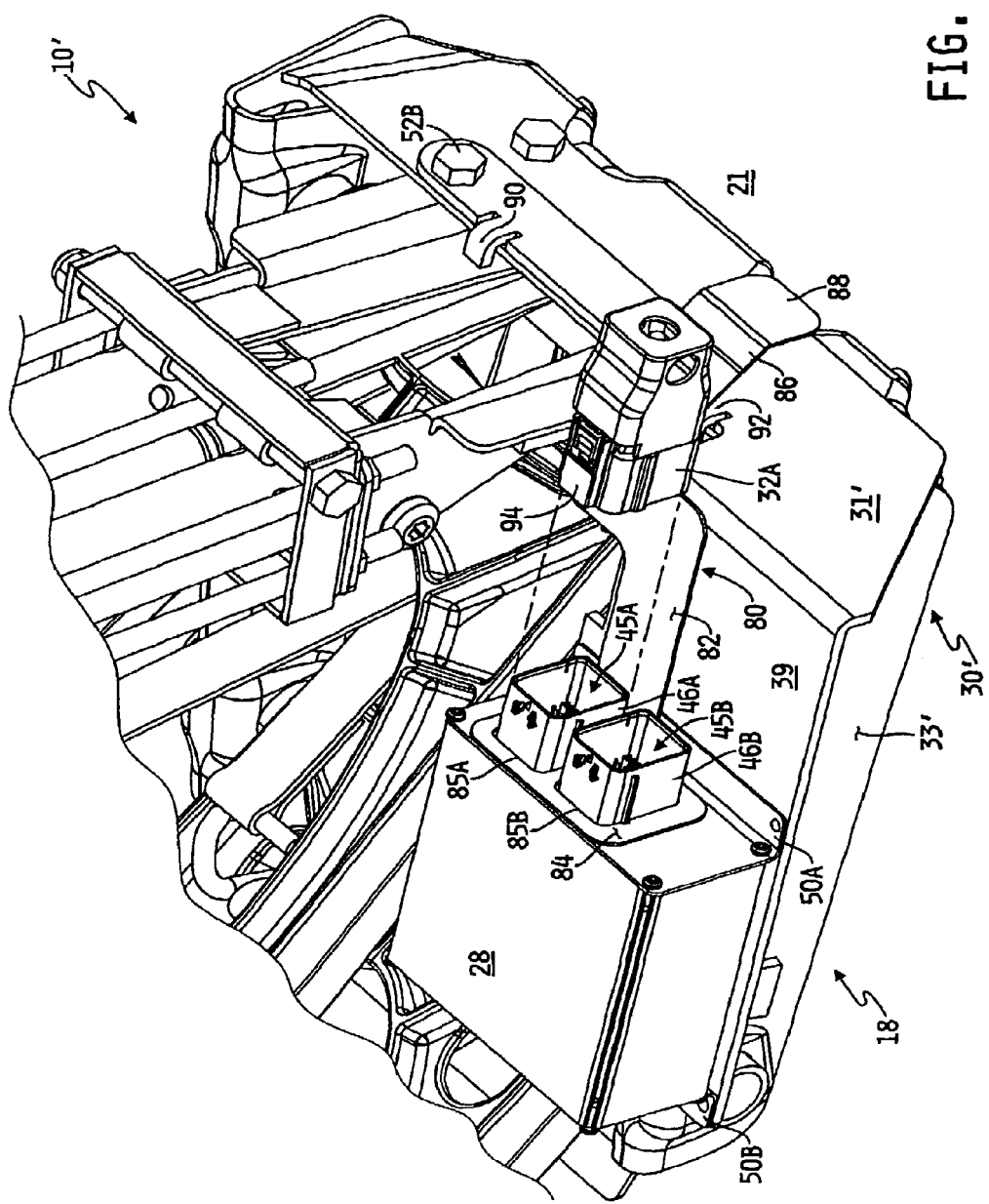
FIG. 8 is another rear perspective view of the seat base of the vehicle safety seat of FIG. 4 illustrating mounting of the safety plate over the electrical connectors associated with the roll sensor.
Figure 9:
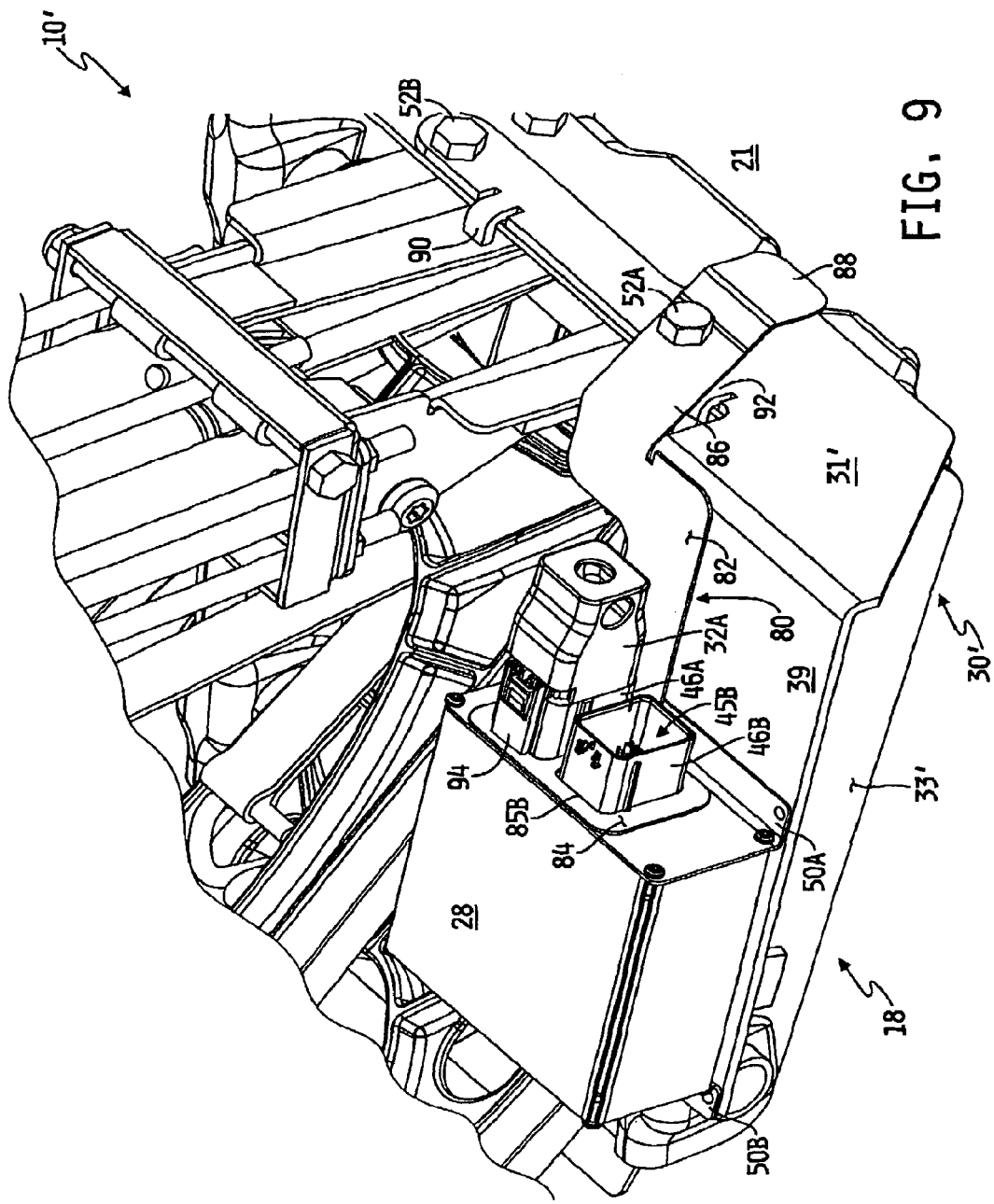
FIG. 9 is a rear perspective view similar to FIG. 8 showing one of the roll sensor system electrical connectors received over one of the electrical connectors associated with the roll sensor to trap the safety plate therebetween.

The roll sensor 28 has a first electrical port 45A electrically connected to a first roll sensor electrical connector 46A (most clearly shown in the embodiment illustrated in FIG. 8) configured for electrical connection with the roll sensor system electrical connector 32A. The first input port 45A is a voltage supply and ground reference port, and the roll sensor receives a corresponding supply voltage and a ground reference from the voltage supply 34 when the first roll sensor system electrical connector 32A is electrically connected to the first roll sensor electrical connector 46A. The roll sensor 28 also has a second electrical port 45B electrically connected to a second roll sensor electrical connector 46B (most clearly shown in the embodiment illustrated in FIG. 8) configured for electrical connection with the roll sensor system electrical connector 32B (not shown in FIG. 2). The second input port 45B is a sensor signal port, and the roll sensor 28 supplies the roll sensor signal to the signal processor 38 when the roll sensor system electrical connector 32B is electrically connected to the roll sensor electrical connector 46B.

The seat base 18 further includes a seat base removal safety feature that requires at least one of the electrical connectors 32A and 32B to be disconnected from the roll sensor 28 before the seat base 18 may be completely disconnected from the support surface 21 of the vehicle. This feature thus disables operation of the roll sensor 28 and/or inhibits the roll sensor signal from reaching the signal processor 38 so that, in either case, the signal processor 38 will not activate the actuator 42 and lock the occupant seat 13 to, or adjacent to, the seat base 18 when installing, replacing or otherwise moving the seat base 18. Referring to FIGS. 2 and 3, one illustrative example of such a seat base removal feature is shown in the form of a safety member 54 that is positioned relative to the seat base 18 to inhibit removal of the seat base attachment member 24A. The seat base 18 and roll sensor mounting configuration may alternatively be structured so that the safety member 54 is positioned over the seat base attachment member 24B, or any additional seat base attachment member.

In the illustrated embodiment, the safety member 54 is provided in the form of a bolt having a shaft 54A defining a head 54B at one end and a threaded portion 54C at an opposite end. The bolt 54 extends through a bore 70 defined through the second portion of the mounting bracket 33 and seat base 18 adjacent to the first roll sensor system electrical connector 32A. The bore 70 is positioned relative to the seat base 18 so that the first roll sensor system electrical connector 32A inhibits or blocks access to the head 54B when the first roll sensor system electrical connector 32A is connected to the mating roll sensor electrical connector 46A. Alternatively, the bore 70 may be positioned relative to the seat base 18 so that the second roll sensor system electrical connector 32B inhibits or blocks access to the head 54B when the second roll sensor system electrical connector 32B is connected to the mating roll sensor electrical connector 46B. In either case, access to the head 54B for movement of the bolt 54 may only be had when the appropriate one of the roll sensor system electrical connectors 32A or 32B is disconnected from its corresponding roll sensor electrical connector 46A or 46B. It is desirable to configure the electrical connectors 32A, 46A or 32B, 46B, the roll sensor 28 and/or the signal processor 38 so that the signal provided to the signal processor 38 by the roll sensor 28 when the roll sensor system electrical connector 32A or 32B is not connected to its corresponding roll sensor electrical connector 46A or 46B is well outside a signal range indicative of a roll over event to thereby avoid triggering activation of the actuator 42 when the roll sensor system electrical connector 32A or 32B is disconnected from its corresponding roll sensor electrical connector 46A or 46B.

The seat base 18 further includes an engaging member 74 defining a bore 76 therethrough that is aligned with the bore 70 and that is threaded in a manner that provides for engagement with the threaded portion 54C of the bolt 54. In the illustrated embodiment, the threaded portion 54C of the bolt 54 is received within the bore 76 so that the bolt 54 engages the engaging member 74 when the bolt 54 fully extends into the seat base 18 with the head 54B in contact with the second portion 33 of the sensor mounting bracket 30. With the bolt 54 in this position, the bolt 54 extends over the attachment member 24A and thereby inhibits access to, and removal of, the attachment member 24A. With the head 54B in contact with, or sufficiently near, the second portion 33 of the sensor mounting bracket 30, the first roll sensor system electrical connector 32A may be electrically connected to the roll sensor electrical connector 46A as illustrated in FIGS. 2 and 3. The first roll sensor system electrical connector 32A must be disconnected from the roll sensor electrical connector 46A to allow access to, and loosening of, the bolt 54. The bolt 54 may then be sufficiently loosened and moved to allow access to, and removal of, the attachment member 24A to thereby allow removal or movement of the seat base 18 relative to the support surface 21 of the vehicle. It may be desirable to configure the bolt 54 and/or the seat base 18 so that the bolt 54 cannot be completely removed from the bore 70 to thereby require engagement of the bolt 54 with the engaging member 74 before connecting the first roll sensor system electrical connector 32A to the roll sensor electrical connector 46A. It may further be desirable to configured the bolt 54, the seat base 18 and/or the second portion 33 of the sensor mounting bracket 30 so that the bolt 54 extends sufficiently outwardly from the seat base 18 to block or inhibit connection of the first roll sensor system electrical connector 32A to the roll sensor electrical connector 46A when the bolt 54 is disengaged from the engagement member 74.

Referring now to FIGS. 4-9, an alternate embodiment of a vehicle safety seat 10' is shown. The embodiment 10' is identical in many respects to the vehicle safety seat 10 illustrated and described with respect to FIGS. 1-3, and like numbers are therefore used to identify like structures and features. In this embodiment, the roll sensor 28 is mounted, via roll sensor mounting bracket 30', atop the seat base 18. The roll sensor mounting bracket 30' includes a first portion 33' mounted to a sidewall of the seat base 18, a second portion 31' mounted to the rear wall of the seat base 18 via a number of attachment members 52A-52C, and a third portion 39 mounted to the top of the seat base 18 as most clearly shown in FIG. 4. Any one or more of the first, second and third portions 33', 31' and 39 may be integral, or may instead be attached to each other via suitable attachment mechanisms. The roll sensor 28 is, in this embodiment, attached to the third portion 39 of the roll sensor mounting bracket 30' via a pair of end brackets 50A and 50B. The end brackets 50A and 50B may be removably or non-removably mounted to the roll sensor 28 and/or to the roll sensor mounting bracket 30' via one or more conventional attachment structures and/or techniques.

Figure 5:
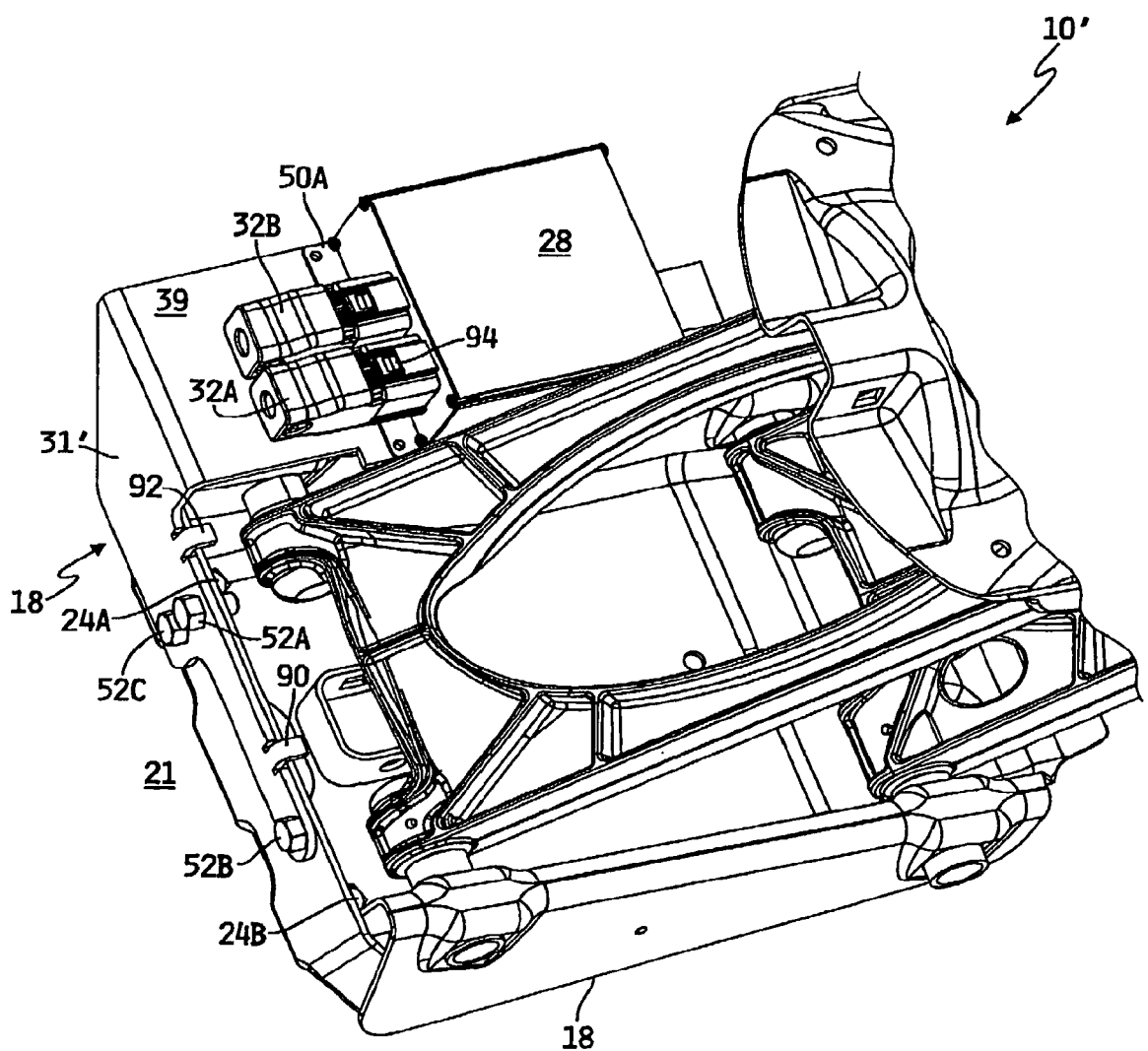
FIG. 5 is another rear perspective view of the vehicle safety seat of FIG. 4 showing the locations of two of the seat base mounting members.
Figure 6:
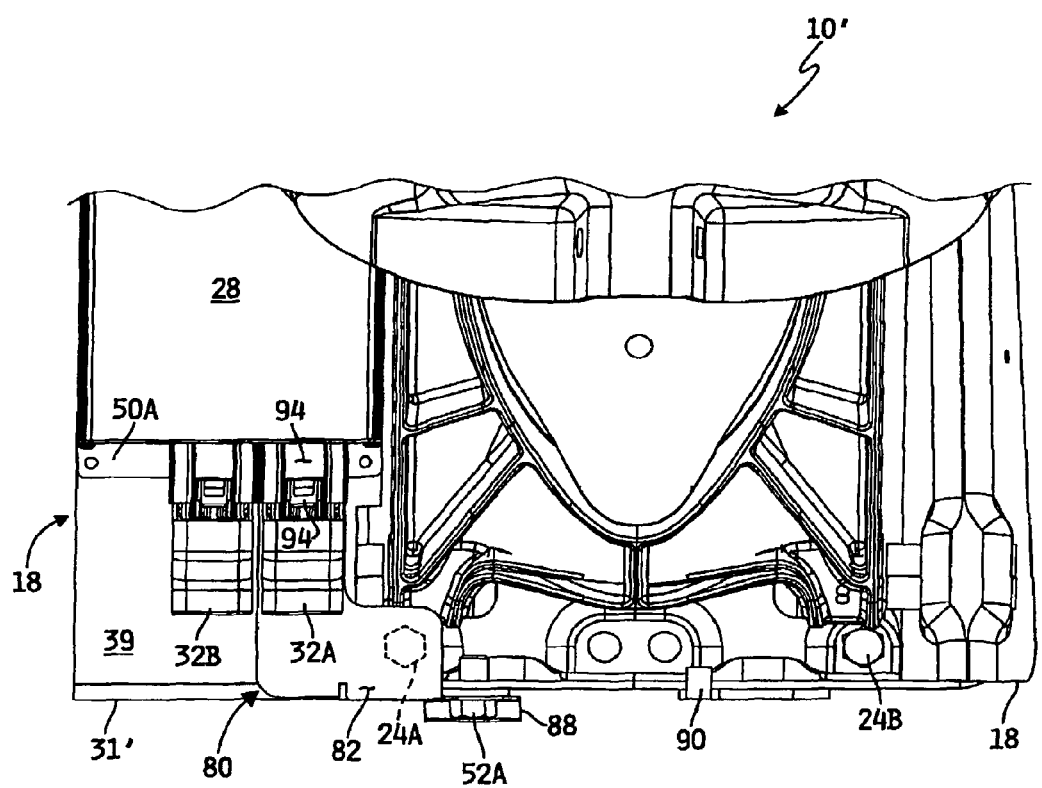
FIG. 6 is a top plan view of the seat base of the vehicle safety seat of FIG. 4 illustrating a safety plate mounted thereto to inhibit access to one of the seat base mounting members.
Figure 7:
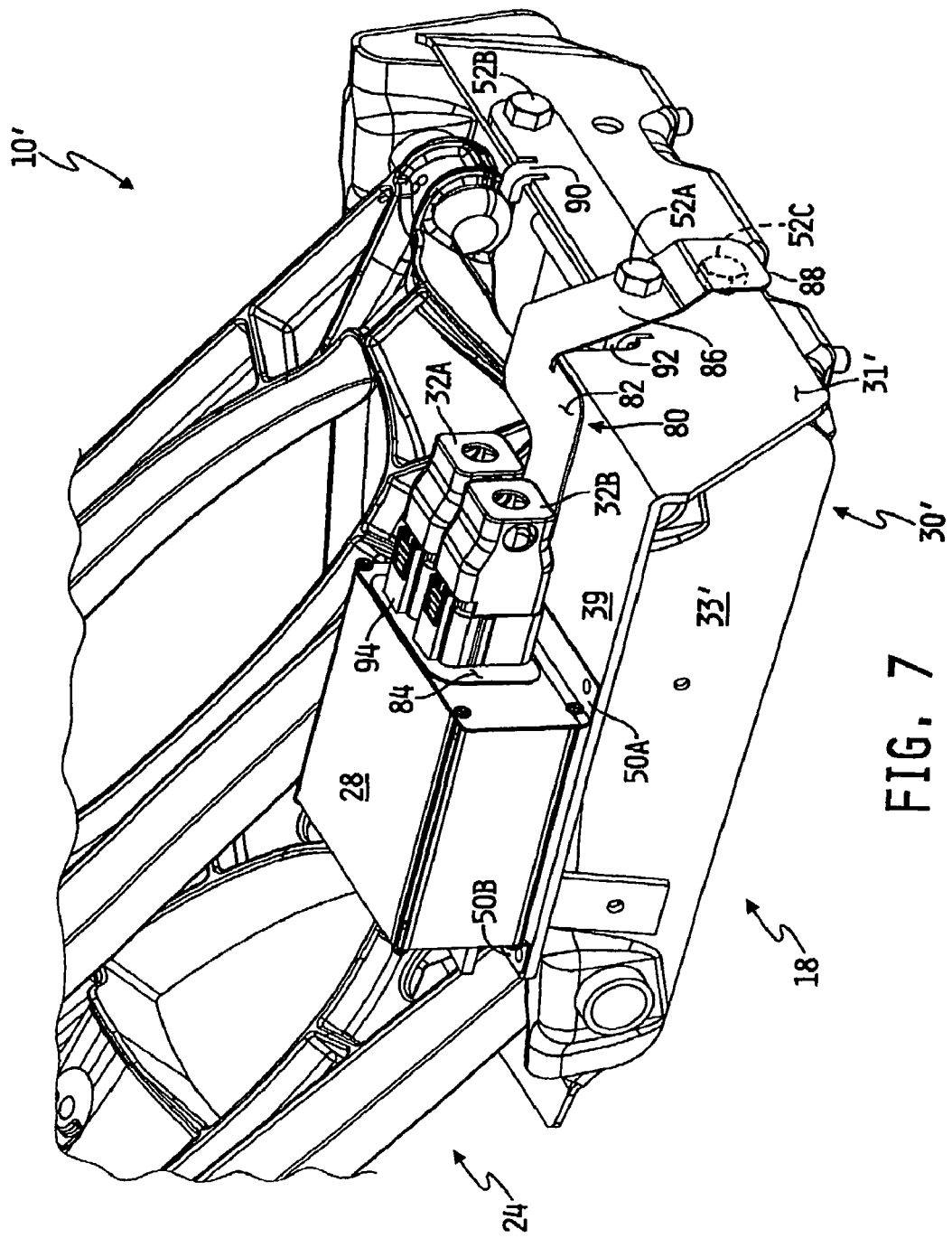
FIG. 7 is another rear perspective view of the vehicle safety seat of FIG. 4 illustrating some of the structural details of the safety plate mounted to the seat base.

As with the embodiment 10 illustrated in FIGS. 1-3, two seat base attachment members 24A and 24B are illustrated in FIGS. 5 and 6 in the form of threaded bolts extending through the seat base 18 and into engagement with correspondingly threaded bores (not shown) defined in the support surface 21 of the vehicle. It will be understood that the seat base 18 will typically include more seat base attachment members than the two illustrated in FIGS. 5 and 6, and/or that any one or more of the number of attachment members may alternatively or additionally be provided in the form of other conventional attachment structures. The roll sensor 28 has a first electrical port 45A electrically connected to a first roll sensor electrical connector 46A (most clearly shown in FIG. 8) configured for electrical connection with the roll sensor system electrical connector 32A. The first input port 45A is a voltage supply and ground reference port, and the roll sensor receives a corresponding supply voltage and a ground reference from the voltage supply 34 when the first roll sensor system electrical connector 32A is electrically connected to the first roll sensor electrical connector 46A. The roll sensor 28 also has a second electrical port 45B electrically connected to a second roll sensor electrical connector 46B (most clearly shown in FIG. 8) configured for electrical connection with the roll sensor system electrical connector 32B (not shown in FIG. 2). The second input port 45B is a sensor signal port, and the roll sensor 28 supplies the roll sensor signal to the signal processor 38 when the roll sensor system electrical connector 32B is electrically connected to the roll sensor electrical connector 46B. It will be understood that, like the embodiment 10 illustrated in FIGS. 1-3, the embodiment 10' illustrated in FIGS. 4-9 includes the voltage supply 34, signal processor 38, actuator 42 and supporting signal paths, linkages and the like, although these features are not specifically illustrated in FIGS. 4-9.

As with the embodiment 10 illustrated in FIGS. 1-3, the embodiment 10' further includes a seat base removal safety feature that requires at least one of the electrical connectors 32A and 32B, or both, to be disconnected from the roll sensor 28 before the seat base 18 may be completely disconnected from the support surface 21 of the vehicle. This feature thus disables operation of the roll sensor 28 and/or inhibits the roll sensor signal from reaching the signal processor 38 so that, in any case, the signal processor 38 will not activate the actuator 42 and lock the occupant seat 13 to, or adjacent to, the seat base 18 when installing, replacing or otherwise moving the seat base 18. Referring to FIGS. 6-9, the seat base removal safety feature in this embodiment is shown in the form of a safety plate 80 that is mounted to, and positioned relative to, the seat base 18 to inhibit removal of the seat base attachment member 24A. The seat base 18 and roll sensor mounting configuration may alternatively be structured so that the safety plate 80 is positioned over the seat base attachment member 24B, or any additional seat base attachment member.

In the illustrated embodiment, the safety plate 80 includes a first portion 82 that extends over and in contact with the third portion 39 of the roll sensor mounting bracket 30'. The first portion 82 of the safety plate is sized and configured to cover the seat base attachment member 24A, as most clearly illustrated in FIG. 6, to thereby prevent access to, and removal of, the seat base attachment member 24A as long as the plate 80 is mounted to the seat base 18. The safety plate 80 further includes a second portion 84 defining a pair of passageways 85A and 85B therethrough. The passageways 85A and 85B are sized to receive the roll sensor electrical connectors 46A and 46B respectively therethrough so that the second portion 84 of the safety plate 80 is positioned adjacent to and in contact with the roll sensor 28 as most clearly illustrated in FIG. 8. In the illustrated embodiment, the passageways 85A and 85B and the roll sensor system electrical connectors 32A and 32B are sized so that the second portion 84 of the safety plate 80 is trapped between the roll sensor 28 and the roll sensor system electrical connectors 32A and 32B, as most clearly shown in FIG. 9 with respect to the roll sensor system electrical connector 32A. Either one or both of the roll sensor system electrical connectors 32A and 32B may be further provided with one or more projections to facilitate trapping of the second portion 84 of the safety plate 80 between the roll sensor 28 and either electrical connector 32A and 32B. An example of one such projection 94 extending from the roll sensor system electrical connector 32A is illustrated in FIGS. 6-9. The projection 94 extends beyond the passageway 85A defined through the second portion 84 of the safety plate 80, and into contact with the second portion 84, thereby facilitating trapping of the second portion 84 of the safety plate 82 between the roll sensor 28 and the roll sensor system electrical connector 32A.

In the illustrated embodiment, both of the roll sensor system electrical connectors 32A and 32B, as well as the corresponding passageways 85A and 85B defined through the second portion 84 of the safety plate 80, have been described as being sized to trap the second portion 84 of the safety plate 80 between the roll sensor 28 and the corresponding connector 32A and 32B when the connectors 32A and 32B are electrically connected to the corresponding roll sensor electrical connectors 46A and 46B. Alternatively, only one electrical connector/passageway pair 32A, 85A or 32B, 85B may be sized to trap the second portion trap the second portion 84 of the safety plate 80 between the roll sensor 28 and the corresponding connector 32A or 32B when the connector 32A or 32B is electrically connected to the corresponding roll sensor electrical connector 46A or 46B. In this alternative embodiment, the remaining passageway 85A or 85B may be sized to receive the corresponding roll sensor system electrical connector 32A or 32B therethrough. Alternatively, the remaining passageway 85A or 85B may be omitted from the second portion 84 of the safety plate 80. In any case, the second portion 84 of the safety plate 80 is configured so that either or both of the roll sensor system electrical connectors 32A and 32B inhibit movement of the safety plate 80 relative to the seat base 18 when electrically connected to the corresponding roll sensor electrical connectors 46A and 46B. Accordingly, the seat mounting bolt 24A cannot be accessed for removal until the safety plate 80 is removed, and the safety plate 80 cannot be moved relative to the seat base 18 until one or both of the roll sensor system electrical connectors 32A and 32B is/are disconnected from the corresponding roll sensor electrical connectors 46A and/or 46B.

The safety plate 80 further includes a third portion 86 that extends downwardly from the first portion 82 and adjacent to the second portion 31' of the roll sensor mounting bracket 30. The third portion 86 of the safety plate defines a bore therethrough sized to receive the attachment member 52A therethrough. The attachment member 52A extends through the third portion 86 of the safety plate 80, through the second portion 31' of the roll sensor mounting bracket 30' and into engagement with the seat base 18 to thereby attach the third portion 86 of the safety plate 80 and the second portion 31' of the roll sensor mounting bracket 30' to the seat base 18. The third portion 86 of the safety plate 80 has a fourth portion 88 in the form of a tab or flange extending therefrom. The tab or flange 88 is configured to extend over and cover the attachment member 52C when the attachment member 52A is received through the third portion 86 of the safety plate 80 and through the second portion 31' of the roll sensor mounting bracket 30', thereby inhibiting access to the attachment member 52C when the safety plate 80 is mounted to the seat base 80, as most clearly illustrated in FIG. 7. This feature inhibits complete removal of the roll sensor mounting bracket 30' from the seat base 18 until the safety plate 80 is removed as described hereinabove. Removal of the safety plate 80 requires disconnection of either or both of the roll sensor system electrical connectors 32A and 32B, as described hereinabove, thus ensuring that the roll sensor mounting plate 30' cannot be completely removed from the seat base 18 unless either or both of the roll sensor system electrical connectors 32A and 32B are disconnected from the roll sensor 28.

It will be observed that two of the three attachment members 52A and 52B may be removed without removing the safety bracket 80. A number of anti-rotation tabs are defined by the roll sensor mounting bracket 30' and engage the seat base 18 to prevent rotation of the roll sensor mounting bracket 30' relative to the seat base 18 when the roll sensor mounting bracket 30' may otherwise be permitted to move or rotate relative to the seat base 18 such as when the attachment members 52A and 52B are removed. In the embodiment illustrated in FIGS. 6-9, for example, two such anti-rotation tabs 90 and 92 are defined by the second portion 31' of the sensor mounting bracket 30', and the tabs 90 and 92 are positioned relative to the seat base 18 to prevent rotation of the sensor mounting bracket 30' when the attachment members 52A and 52B. It will be appreciated that more or fewer such anti-rotation tabs may alternatively be provided.

Figure 10:
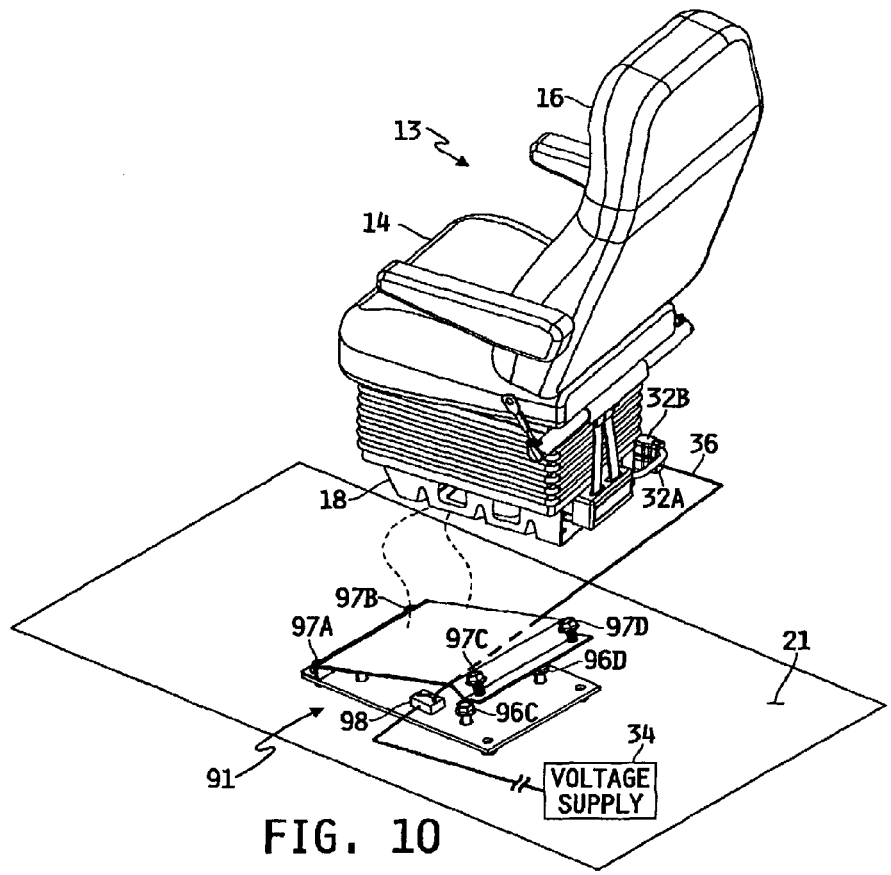
FIG. 10 is an assembly view of one embodiment of a seat mounting system that disables a sensor mounted to the vehicle seat.
Figure 11:
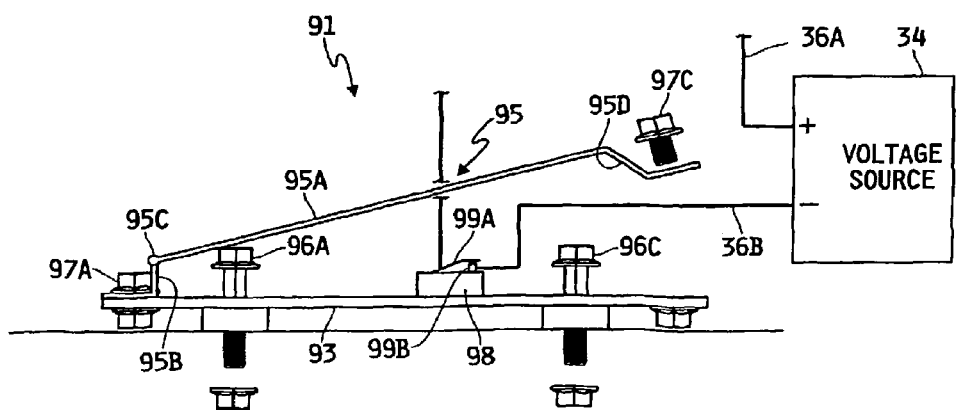
FIG. 11 is a side elevational view of the seat mounting system of FIG. 10.

Referring now to FIGS. 10 and 11, a vehicle seat mounting plate 91 may be provided to mount the base 18 of the vehicle seat 13 to the support surface 21. The mounting plate 91 includes a bottom plate 93 and a top plate 95. The bottom plate 93 defines a number of bores therethrough, and a plurality of attachment members may extend through at least some of the bores and into engagement with the support surface 21 in a conventional manner. In the illustrated embodiment, four such bores are shown, and four attachment members 96A-96D (96B not shown) are provided, each of which extends through a corresponding bore in the bottom plate 93 and into engagement with the support surface 21. It will be understood that the bottom plate 93 may alternatively define any number of bores therethrough, some of which align with corresponding bores in the vehicle floor 21 of one or more vehicle manufacturers and some of which align with corresponding bores in the vehicle floor 21 of other vehicle manufacturers. In this embodiment, the vehicle seat mounting plate 91 is accordingly intended to act as a universal seat mounting plate that is configured to be mountable to the vehicle floor 21 of vehicles manufactured by any of a number of different vehicle manufacturers.

The top plate 95 of the vehicle seat mounting plate 91 likewise defines a number of bores therethrough that align with corresponding bores in the bottom plate 93. These bores also align with corresponding bores defined in the base 18 of the seat 13, and attachment members extend through all aligned bores to mount the seat 13 to the top 95 and bottom 93 plates of the vehicle seat mounting plate 91. In the illustrated example, four such bores are defined, and four corresponding threaded attachment members 97A-97D extend through the seat base 18, through the top plate 95, through the bottom plate 93 and into engagement with four associated threaded nuts to mount the vehicle seat 13 to the mounting plate 91. In the illustrated embodiment, the top plate 95 includes a planar portion 95A mounted at one end by a hinge 95C to a stepped portion 95B, and formed at its opposite end into another stepped portion 95D. The four attachment members 97A-97D extend through the stepped portions 95C and 95D. The resulting raised top plate design allows for clearance of the bottom plate attachment members 96A-96D relative to the top plate 95, and the hinge design also requires removal of only two of the four attachment members 97A-97D in order to access all four of the bottom plate attachment members 96A-96D.

The vehicle seat mounting plate 91 may further include another embodiment of a seat base removal safety feature that automatically open circuits at least one of the wires leading to at least one of the electrical connectors 32A and 32B when the top plate 95 is drawn away from the bottom plate 93. In this embodiment, a contact switch 98 is mounted to the bottom plate 93, and the switch 98 is interposed in-line with one of the wires leading to one of the electrical connectors 32A and 32B. When the vehicle seat 13 is mounted to the vehicle seat mounting plate 91 as just described, the top plate 95 is juxtaposed over the bottom plate 93 and the top plate 95 contacts the switch 98 and maintains the switch 98 in its closed position. Electrical connection to the electrical connector 32A or 32B is thus maintained through the switch 98 as long as the vehicle seat 13 is mounted to the vehicle seat mounting plate 91. When the top plate 95 is moved away from the bottom plate 93, such as when the attachment members 97C and 97D are removed and the top plate portion 95A is rotated away from the bottom plate 93 via the hinge 95C, contact between the top plate 95 and the switch 98 is lost, thereby causing the switch 98 to open. When this occurs, the wire connected to the switch 98 is open-circuited, and electrical connection to the electrical connector 32A or 32B through that wire is therefore lost. This then disables operation of the roll sensor 28 and/or inhibits the roll sensor signal from reaching the signal processor 38 so that, in either case, the signal processor 38 will not activate the actuator 42 and lock the occupant seat 13 to, or adjacent to, the seat base 18 when installing, replacing or otherwise moving the seat base 18. It will be understood that the design of the vehicle mounting plate 91 is such that access to at least one of the attachment members 96A-96B is inhibited by the position of the top plate 95 relative to the bottom plate, and that access to all four of the attachment members 96A-96D cannot be had at least until the top plate 95 is moved sufficiently away from the bottom plate 93 to cause the switch 98 to open, thereby disabling the roll sensor 28. This feature thus ensures that the vehicle seat mounting plate 91 cannot be removed from the vehicle floor 21 without disabling the roll sensor 28.

In the embodiment illustrated by example in FIGS. 10 and 11, the switch 98 is shown as being interposed in-line with the ground wire 36B of the voltage source 34. More specifically, one terminal 99A of the contact switch 98 is electrically connected to the ground wire 36B leading to the electrical connector 32A, and the other terminal 99B of the contact switch 98 is electrically connected to the ground wire 36B leading to the voltage source 34. The positive wire 36A of the voltage source 34 is connected directly to the electrical connector 32A as before. The terminals 99A and 99B of the contact switch 98 are positioned relative to the top plate 95 so that when the top plate 95 is juxtaposed over the bottom plate 93 when the seat base 18 is mounted to the vehicle seat mounting plate 91, the top plate 95 forces the terminal 99A into contact with the terminal 99B to complete the circuit. In contrast, when the top plate 95 is moved sufficiently away from the bottom plate 93, as illustrated in FIGS. 10 and 11, the terminal 99A of the contact switch 98 moves away from the terminal 99B, thereby causing an open circuit in the voltage supply line 36. It will be understood that the switch 98 may alternatively be interposed in one of the signal lines 40 between the roll sensor 28 and the signal processor 38, or that more than one such switch 98 may be used in one of the voltage supply lines 36 and/or signal lines 40. It will also be understood that the switch 98 may alternatively be mounted to the top plate member 95, and in this embodiment the switch 98 will be activated and deactivated via contact with the bottom plate member 93.

Referring now to FIGS. 12 and 13, a vehicle safety seat 100 is shown and includes a vehicle seat in the form of a suspension seat 12 having a seat base 18 mounted to a support surface 21 of a motor vehicle as described hereinabove. The suspension seat 12 is mounted to the seat base 18 via a conventional suspension mechanism (not shown). In the illustrated embodiment, the suspension mechanism is covered by a suitable cover or wrap 25, although such a cover or wrap 25 need not be related to the functionality of the suspension mechanism. The suspension mechanism may illustratively be a conventional pneumatic suspension mechanism, although the suspension mechanism may alternatively be a strictly mechanical, electro-mechanical, hydraulic, electro-hydraulic, electro-pneumatic, or like mechanism, or any combination thereof. In any case, the suspension mechanism is operable in a known manner to suspend the occupant seat 12 above the seat base 18 and at least somewhat isolate the seat 12 from vibrations, road noise and the like that are impressed upon the support surface 21 of the vehicle during normal vehicle operation. The occupant seat 12 itself includes a seat bottom 14 mounted to the suspension mechanism and a seat back 16 extending upwardly and away from the seat portion 14.

Figure 18:
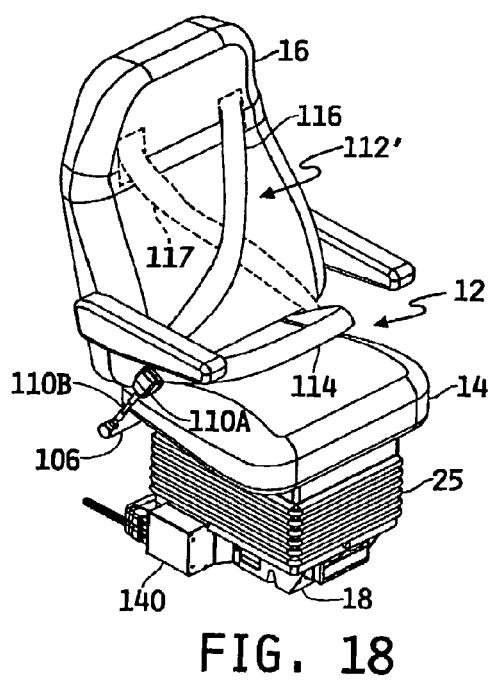
FIG. 18 is a front elevational view of a vehicle safety seat similar to that of FIG. 13 illustrating a three or four-point restraint harness having shoulder portions extending through the seat back.

A suspension seat actuator 102 is mounted to the seat base 18, and in the illustrated embodiment the actuator 102 is coupled to a tube 106 that is transversely mounted to a rear portion of the vehicle seat 14. A pair of actuator arms 104A and 104B extend between the actuator 102 and the tube 106. The tube 106 is, in the illustrated embodiment, at least partially hollow and carries a pair of cables or other suitable linkage members, with one such cable or linkage 108B connected between one of the actuator arms 104B and a restraint harness mount 108A and the other such cable or linkage 110B connected between the other actuator arm 104A and another restraint harness mount 110A. In the illustrated embodiment, a conventional three-point restraint harness 112 is mounted to the vehicle seat 12, and includes a belt or web having a lap portion 114 and a shoulder portion 116. One end of the lap portion 114 is secured to the restraint harness mount 108A. Although not specifically shown in the figures, the opposite end of the shoulder portion 116 is secured to another anchor point which may or may not be affixed to the seat 12. The harness mount 110A is, in the illustrated embodiment, provided in the form of a conventional buckle member, and a mating tongue member 110C is configured to slidably receive the web or belt therethrough in a conventional manner to define the lap and shoulder portions 114 and 116 respectively therebetween. The tongue member 110C is configured for releasable attachment to the buckle member 110A so that the buckle and tongue members 110A and 110C respectively may be lockingly engaged. Those skilled in the art will recognize that the buckle and tongue members may alternatively be reversed so that the tongue member 110C is attached to the cable or linkage 110B and the buckle member 110C is configured to slidingly receive the belt or web 114, 116 therethrough. In any case, the belt or web 114, 116, tongue member 110C, harness mounts 108A and 110A and the shoulder portion anchor point (not shown) together form a conventional three-point vehicle restraint harness. It will be understood, however, that for purposes of this document the vehicle restraint harness may include more or fewer harness attachment anchor points so that the restraint harness may be, for example, a two-point restraint harness (e.g., lap belt only), a four-point restraint harness (e.g., including two shoulder belts), a five-point restraint harness (e.g., including two shoulder belts and an anchor point between the occupant's legs), or other multi-point restraint harness. For example, as illustrated in FIG. 18, the vehicle seat 100 may alternatively include a four-point restraint harness 112' having each of the webs and other structures just described, and also having an additional web 117, as shown in phantom. The ends of the shoulder webs 116 and 117, in this embodiment, extend through the fabric of the seat back 16 and may be attached to the frame of the seat 100 (not shown), or may alternatively extend through the seat back 16 and attach to one or more structures separate from the seat back 16.

A conventional collision alert system 120 includes, among other components, a decision-making circuit (DC) 121 electrically connected to the suspension seat actuator 102 via a signal path 122. In one embodiment, the decision-making circuit 121 includes a conventional microprocessor or other processor circuit operable to execute instructions in the form of one or more software algorithms stored in memory. Alternatively, the decision-making circuit may include other conventional circuitry configured to perform decision logic functions.

In one embodiment, for example, the collision alert system 120 further includes at least one radar antenna suitably mounted to the vehicle and signal processing circuitry configured to discern whether an object is in the path of the vehicle and whether a collision with the object is likely to occur under present operating conditions. Such a collision alert system 120 may further be configured to provide an estimate of the time to impact with such an object. An example of one such a collision alert system is the VORAD® collision warning system produced by Eaton Corporation based in Cleveland, Ohio. Those skilled in the art will recognize, however, that other conventional collision warning or alert systems may be used. In any case, the decision-making circuit 121 is operable to produce a collision alert signal upon detection of an impending collision with an object in the path of the vehicle carrying the safety seat 100.

With the embodiment illustrated in FIGS. 12 and 13, the suspension seat actuator 102 is responsive to the collision alert signal produced by decision-making circuit 121 of the collision alert system 120 to move the vehicle restraint harness 114, 116 in a manner that provides a tactile indicator to the occupant of the safety seat 100 of the impending collision with the object. In the illustrated embodiment, for example, the suspension seat actuator 102 is responsive to the collision alert signal produced by the decision-making circuit 121 to retract the cables or linkages 108B and 110B, via actuation of the actuator legs 104A and 1048, and thereby tighten the lap portion 114 of the web or belt 114, 116 about the occupant of the seat 12. Alternatively, the safety seat 100 may include one or more alternate restraint harness actuator structures, and the actuator 102 may be similarly responsive to the collision alert signal produced by the decision-making circuitry 121 of the collision alert system 120 to control such one or more alternate restraint harness actuator structures to tighten the lap portion 14 of the restraint harness 114, 116 about the occupant. Examples of some such alternate restraint harness actuator structures are described in U.S. Pat. No. 6,582,015, the disclosure of which is incorporated herein by reference. Other alternate restraint harness structures will occur to those skilled in the art, and the present disclosure contemplates the implementation of one or more of any such alternate restraint harness actuator structures into the vehicle safety seat 100.

The collision alert system 120 may further include alert notification circuitry 123 configured to notify a remote person, business or other entity in the event of a collision event. Such circuitry 123 may be conventional and may include, but should not be limited to, a cellular telephone system, a satellite transmission system, or the like, including suitable signal transmission hardware, antenna(s) and the like. The notification details may be include only information that the collision event has occurred, may include any information relating to the collision event, and may further include other relevant information such as vehicle location information, vehicle or person diagnostic information, or the like. In such cases, the circuitry 123 will include additional appropriate circuits and/or systems such as, for example, but not limited to, a global positioning system (GPS), one or more vehicle diagnostic algorithms, one or more conventional sensors or sensing systems configured to determine and report a medical condition of the vehicle operator, or the like.

It is further contemplated that the actuator 102 may be configured to move the vehicle restraint harness 112, in response to the collision alert signal, in ways other than that just described to thereby provide a tactile indication to the occupant of the impending collision with the object. In one alternate embodiment, for example, the tube 106 may be rotatably mounted to the back portion of the seat bottom 14, and the actuator 102 may be configured to move the vehicle restraint harness 112 by controllably rotating the tube 106 in either of the illustrated directions 124 or 126. Alternatively still, the tube 106 may be configured for linear movement in either direction along its longitudinal or transverse axis, and the actuator 102 may be configured to move the vehicle restraint harness 112 my controllably moving the tube 106 in either of its longitudinal or transverse directions. Those skilled in the art will recognize other techniques and structures for moving the vehicle restraint harness 112 relative to the vehicle seat 112, such as by moving either one or both of the lap portion 114 and the shoulder portion 116, in response to the collision alert signal to thereby provide a tactile indication to the occupant of the impending collision with the object, and the present disclosure contemplates any such alternate structures and techniques. Additionally, it should be understood that for purposes of the feature just described, the vehicle seat 12 need not be a suspension seat, and may instead by any conventional seat configured to support and restrain one or more occupants of a motor vehicle.

Referring now to FIGS. 14A-16, another embodiment of a vehicle safety seat 200 is shown and again includes a vehicle seat in the form of a suspension seat 12 having a seat base 18 mounted to a support surface 21 of a motor vehicle in a conventional manner via a number of attachment members (not shown). The vehicle safety seat 200 includes many of the same structural components as the vehicle safety seat of FIGS. 12 and 13, and like numbers are accordingly used to identify like components. It will be understood, however, that the above described feature of the actuator 102 being responsive to a collision alert signal produced by a collision alert system 120 to move the vehicle restraint harness 112 is optional in this embodiment, and the collision alert system 120 and connecting signal path 122 are accordingly shown in FIG. 14A in dashed-line form. The actuator 102, decision-making circuitry and actuatable components 104A, 104B, 108B and 110B, however, are included as shown. It will further be understood that the vehicle safety seat 200 includes a vehicle restraint harness, such as the vehicle restraint harness 112 illustrated in FIGS. 12 and 13, although such a restraint harness is omitted from FIGS. 14A-16 for brevity and ease of illustration.

In the illustrated embodiment, the vehicle safety seat 200 includes a roll sensor module 140 mounted to the seat base 18 as shown. A first electrical connector 142 is electrically connected to one end of a voltage signal line 144 that is electrically connected at its opposite end to a suitable voltage source (not shown), and is configured for electrical connection to a matingly configured electrical connector of the roll sensor module 140. A second electrical connector 146 is electrically connected to one end of a roll sensor signal line 148 that is connected at its opposite end to the actuator 102, and is configured for electrical connection to a matingly configured electrical connector of the roll sensor module 140. In one embodiment, as shown in FIG. 4B, the roll sensor module 140 includes a conventional roll sensor, RS, electrically connected to a decision-making circuit (DC) 141. The roll sensor, RS, and decision-making circuit 141 are each connected to the voltage supply line 144 for receiving an operating supply voltage. The roll sensor signal line 148 is connected to a signal output of the decision-making circuit 141.

In one embodiment, the decision-making circuit 141 includes a conventional microprocessor or other processor circuit operable to execute instructions in the form of one or more software algorithms stored in memory. Alternatively, the decision-making circuit may include other conventional circuitry configured to perform decision logic functions. In any case, the decision-making circuit 141 is configured to process the roll sensor signal produced by the roll sensor, RS, and produce a roll sensor signal on the signal path 148 upon detection of a vehicle roll-over condition. The roll sensor module 140 may further include alert notification circuitry 123 configured to notify a person, business or other entity in the event of a roll over event. Such circuitry 123 may be similar to or identical to the alert notification system 123 described hereinabove.

In the illustrated embodiment, the actuator 102 is configured to be responsive to the roll signal produced by the roll sensor module 140 on the signal path 148 to pull the suspension seat 12 toward the seat base 18 and hold the seat 12 in its lowest position adjacent to or in contact with the seat base 18. Prior to this function, the actuator 102 may additionally be configured to first take any slack out of the vehicle restraint harness (112 of FIGS. 12-13) by controlling the cables 108A and 110A in a manner that tightens at least the lap portion 114 of the restraint harness 112 about the occupant as described hereinabove. This "pre-tensioning" step may be used to first secure the occupant to seat 12 prior to securing the seat 12 to or near the seat base 18. Further details relating to either of these techniques are described in U.S. Pat. No. 6,582,015, the disclosure of which has been incorporated herein by reference. It will be appreciated that the embodiment 100 of the vehicle safety seat illustrated and described with respect to FIGS. 1 and 2 may optionally include the roll sensor module 140 and accompanying operational features just described.

Figure 16:
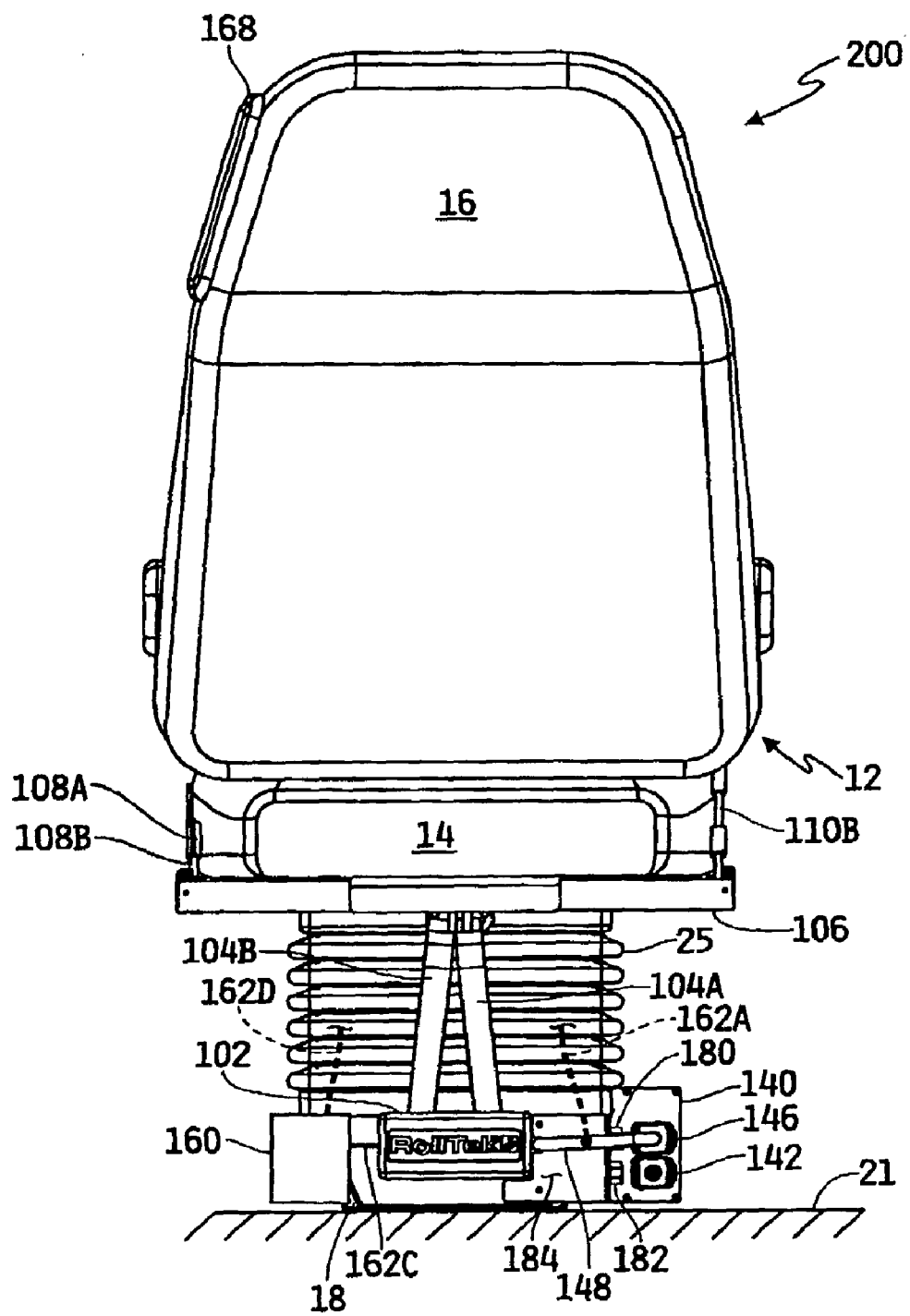
FIG. 16 is a rear elevational view of the vehicle safety seats of FIGS. 14A and 15A.

As most clearly shown in FIG. 16, the roll sensor module 140 includes a housing 184 that is attached to the seat base 18 in a manner that requires disconnection of the two electrical connectors 142 and 146 before detaching the roll sensor module 140 from the seat base 18. This feature disallows activation of the actuator 102 when detaching the roll sensor module 140 from the seat base 18. In the illustrated embodiment, a pair of attachment members 180 and 182, e.g., threaded screws or bolts, extend through the housing 148 and into the seat base 18 to at least partially mount the roll sensor module 140 to the seat base 18. The attachment members 180 and 182 are positioned so that the electrical connectors 146 and 142 respectively block access to the attachment members 180 and 182 when electrically connected to the roll sensor module 140 as shown. Access to the attachment members 180 and 182 may be had only by first disconnecting both electrical connectors 146 and 142 respectively. In this manner, the supply voltage to the roll sensor module 140 and the roll sensor signal produced by the roll sensor module 140 must both be disconnected prior to detaching the roll sensor module 140 from the seat base 18. In an alternative embodiment, only one such attachment member 180, 182 is provided, so that only a corresponding one of the electrical connectors 146 and 142 need be disconnected from the roll sensor module 140 before detaching the roll sensor module 140 from the seat base 18. Additionally or alternatively, the vehicle seat 200 may be mounted to the vehicle support surface 21 via a vehicle seat mounting plate of the type described hereinabove with respect to FIGS. 10 and 11, and such a seat mounting plate may include a roll sensor deactivation feature as described hereinabove. Those skilled in the art will recognize other structures and techniques for requiring disconnection of the supply voltage and/or sensor signal prior to detaching the roll sensor module 140 from the seat base 18, and any such other structures and techniques are contemplated by this disclosure. Examples of some such alternate structures for requiring disconnection of the supply voltage and/or sensor signal prior to detaching the roll sensor module 140 from the seat base 18 include, but are not limited to, those illustrated and described in U.S. provisional patent application Ser. No. 60/620,407, entitled VEHICLE SAFETY SEAT, the disclosure of which is incorporated herein by reference.

Figure 17:
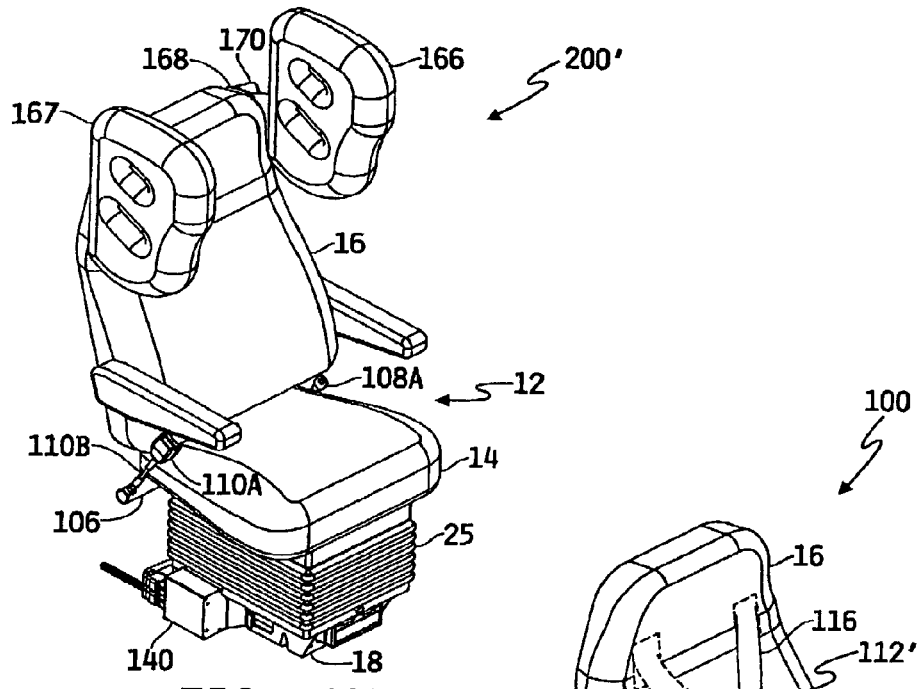
FIG. 17 is a front elevational view of a vehicle safety seat similar to that of FIG. 14A, including an inflatable restraint integrated into each side of the seat.

In addition to the integral components just described, the vehicle safety seat 200 of FIGS. 14A-16 further includes a deployable restraint system. In the illustrated embodiment, the deployable restraint system includes a pyrotechnic or other suitable pressurized air inflator 164 electrically connected via a signal path 162A to the roll sensor signal output line 148 of the decision-making circuit 121 included within the roll sensor module 140. The inflator 164 is fluidly coupled to an inflatable air bladder 166. The air bladder 166 is, in its non-deployed state, carried within the upper portion of the seat back 16 adjacent to one side (e.g., the door side) of the seat 12. A port 168 is provided with a cover 170 that is forced open during deployment the air bladder 166. In the illustrated embodiment, the inflator device 164 is responsive to the roll sensor signal produced by the decision-making circuit 121 housed within the roll sensor module 140 to deploy the inflatable air bladder 166. The inflatable air bladder 166 is thus deployed upon detection of a vehicle roll-over condition as just described. The inflatable air bladder 166 is positioned relative to the seat 12 so that it deploys adjacent to the one side of the seat back portion 16 about a head region of the occupant to thereby provide a cushion for one side of the occupant's head upon impact of the vehicle of sufficient severity. In an alternative embodiment, the vehicle safety seat 200 may provide for two such air bladders 166; one each positioned adjacent to a different side of the vehicle seat 12 to thereby provide cushions for both sides of the occupant's head upon detection of a vehicle roll over event. Such a vehicle seat 200' is illustrated in FIG. 17, and includes two air bladders 166 and 167, wherein the air bladder 166 is configured and positioned to deploy from a left side of the vehicle seat 200' and the air bladder 167 is configured and positioned to deploy from the right side of the vehicle seat 200'.

In an alternative embodiment, the deployable restraint system may be or include a resettable head restraint cushion mounted to the seat back 16. In this embodiment, the actuator 102 may be structurally coupled to such a resettable head restraint cushion, and the actuator 102 may be responsive to the roll signal produced by the decision-making circuit 121 housed within the roll sensor module 140 to deploy such a head restraint cushion. Alternatively, a separate actuator may be provided to deploy the head restraint cushion as just described. The head restraint cushion is thus deployed upon detection of a vehicle roll-over condition as just described. In one embodiment, such a head restraint cushion is positioned relative to the seat 12 so that it deploys adjacent to the one side of the seat back portion 16 about a head region of the occupant to thereby provide a cushion for one side of the occupant's head upon impact of the vehicle of sufficient severity. In an alternative embodiment, the vehicle safety seat 200 may provide for two such head restraint cushions; one each positioned adjacent to a different side of the vehicle seat 12 to thereby provide cushions for both sides of the occupant's head upon detection of a vehicle roll over event. In any case, the one or more head restraint cushions may be resettable under the control of the decision-making circuit 121. For example, when the vehicle roll-over condition is no longer present, the decision-making circuit 121 may be configured to produce a suitable signal on signal path 162A that causes the actuator 102, or other suitable actuator, to retract or reset the one or more head restraint cushions to the pre-deployed, or stored, positions.

In the embodiment illustrated in FIGS. 14A-16, the vehicle safety seat 200 further includes an impact sensor module 160 mounted to the seat base 18 as shown. A voltage signal line 162B is electrically connected at one end to a suitable voltage source (not shown), and at its opposite end to the impact sensor module. In one embodiment, as shown in FIG. 14B, the impact sensor module 160 includes any number, N, of conventional impact sensors, $IS_1$-$IS_N$, wherein N may be any positive integer, as illustrated in FIG. 14B. Each of the sensors $IS_1$-$IS_N$ may be variously oriented relative to the vehicle to thereby detect vehicle impacts along any desired axis or angle relative to the vehicle. In any case, the impact sensors $IS_1$-$IS_N$ are each electrically connected to a decision-making circuit (DC) 163 housed within the impact sensor module 160. The impact sensors, $IS_1$-$IS_N$, and the decision-making circuit 163 are each connected to the voltage supply line 162B for receiving an operating supply voltage. An impact signal line 162C is electrically connected at one end to the decision-making circuit 163, and at its opposite end to the actuator 102.

In one embodiment, the decision-making circuit 163 includes a conventional microprocessor or other processor circuit operable to execute instructions in the form of one or more software algorithms stored in memory. Alternatively, the decision-making circuit 163 may include other conventional circuitry configured to perform decision logic functions. In any case, the decision-making circuit 163 is configured to process the one or more impact signals produced by the one or more impact sensors, $IS_1$-$IS_N$, and produce an impact signal on the signal path 162C upon detection of a vehicle impact of sufficient severity. The impact sensor module 160 may further include alert notification circuitry 123 configured to notify a person, business or other entity in the event of an impact event. Such circuitry 123 may be similar to or identical to the alert notification system 123 described hereinabove.

In the illustrated embodiment, the actuator 102 is configured to be further responsive to the impact signal produced by the impact sensor module 160 on the signal path 162C to pull the suspension seat 12 toward the seat base 18 and hold the seat 12 in its lowest position adjacent to or in contact with the seat base 18. Prior to this function, the actuator 102 may additionally be configured to first take any slack out of the vehicle restraint harness (112 of FIGS. 12-13) by controlling the cables 108A and 110A in a manner that tightens at least the lap portion 114 of the restraint harness 112 about the occupant as described hereinabove. This "pre-tensioning" step may be used to first secure the occupant to seat 12 prior to securing the seat 12 to or near the seat base 18 as described above.

Figure 14B:
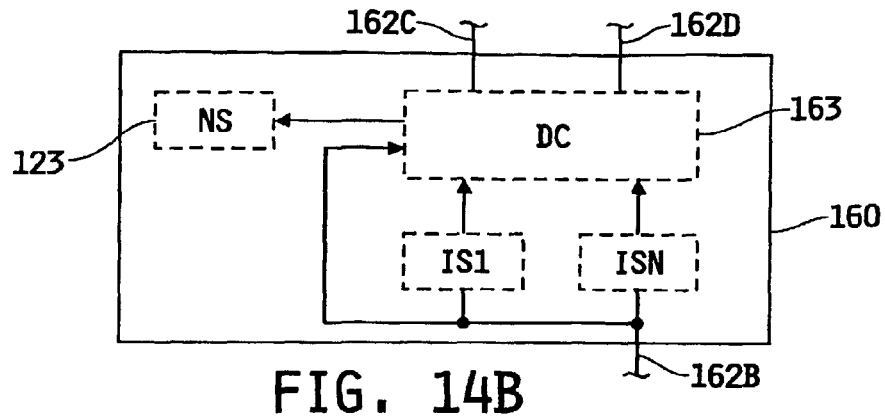
FIG. 14B is a block diagram illustration of one illustrative embodiment of the impact sensor module of FIG. 14A.
Figure 14A:
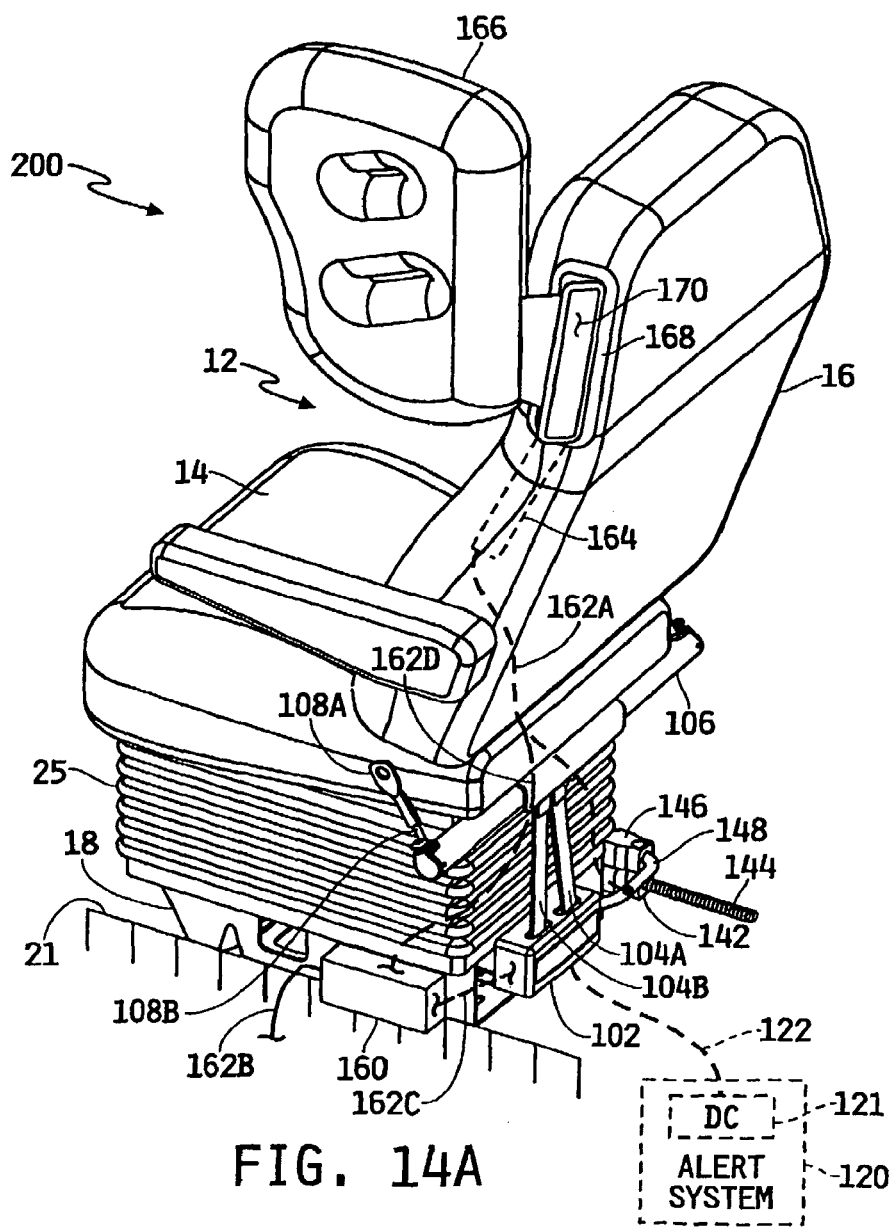
FIG. 14A is a rear perspective view showing another embodiment of a vehicle safety seat including a suspension seat coupled to a seat base that is mounted to a support surface of a motor vehicle.

Alternatively or additionally, the signal path 162C may also be electrically connected to the signal path 162A via a signal path 162D as shown in FIG. 14A. In this embodiment, the inflator 164 is further responsive to the impact signal produced by the impact sensor module 160 to deploy the inflatable air bladder 166. In embodiments wherein the deployable restraint system includes one or more resettable head restraint cushions as described hereinabove, the actuator 102 or other suitable actuator may likewise be responsive to the impact signal produced by the impact sensor module 160 to deploy the one or more resettable head restrain cushions. Such one or more head restraint cushions may be reset via the impact sensor module as described hereinabove.

Figure 19:
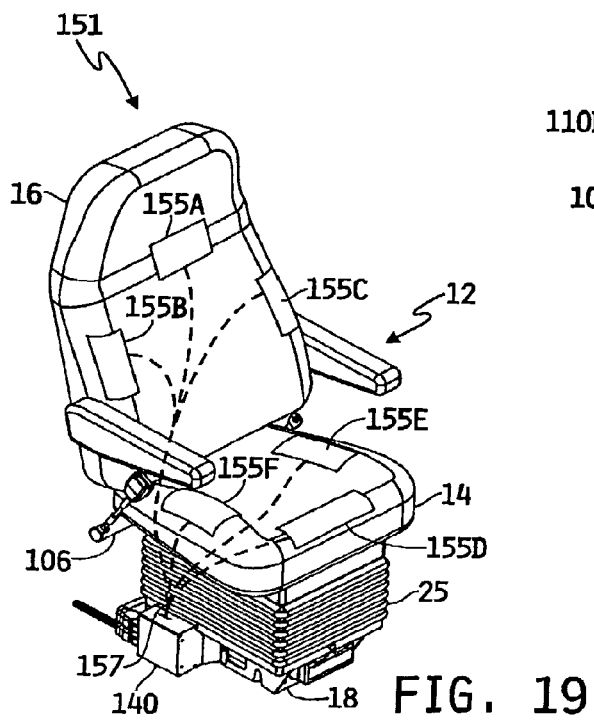
FIG. 19 is a front elevational view of a vehicle safety seat including a number of occupant presence and/or position sensors integral therewith.

Referring now to FIG. 19, another embodiment of a vehicle seat 151 is shown, which includes a vehicle seat in the form of a suspension seat 12 having a seat base 18 mounted to a support surface 21 of a motor vehicle. The vehicle safety seat 151 includes many of the same structural components as the vehicle safety seats of FIGS. 12-18, and like numbers are accordingly used to identify like components. In this embodiment, the vehicle seat 151 includes a number of integral seat occupant sensors configured to sense the presence of the occupant, i.e., whether or not the seat 151 is occupied by a person. Such sensors may be provided, for example, in the form of weight sensors, heat sensors, pressure sensors, optical sensors or the like In the illustrated embodiment, the vehicle seat 151 includes six such seat occupant sensors 155A-155F. Illustratively, a first one of the sensors 155A is located in the upper-middle of the seat back 16, and second and third ones of the sensors 155B and 155C are located on either side of the seat back 16 adjacent to the arm rests. A fourth one of the sensors 155D is located centrally at the end of the seat bottom 14, and fifth and sixths ones of the sensors 155E and 155F are located on either side of the seat bottom 14. All of the sensors 155A-155F are shown as being electrically connected to the roll sensor module 140, although they may alternatively be electrically connected to the impact sensor module 160. In any case, the decision making circuit in either module is operable, in one embodiment, to process the signals produced by the sensors 155A-155F and determine therefrom whether or not the seat 151 is occupied. Alternatively or additionally, the decision making circuit may be operable to determine, from the signals produced by the sensors 155A-155F, a position of the occupant relative to the seat 151. In either case, the decision making circuit is operable to suppress or inhibit deployment or activation of any one or more of the vehicle seat features illustrated and described herein if the seat 151 is not occupied and/or if the seat 151 is occupied but the occupant is in a position relative to the seat 151 that would make deployment or activation of one or more of the vehicle safety seat features unsafe or unnecessary. Those skilled in the art will recognize that other conventional mechanisms may be used to determine whether or not the seat 151 is occupied, and such other conventional mechanisms are contemplated by this disclosure. Examples include, but are not limited to, one or more seat belt latch detectors, one or more optical, pressure, weight, heat or other sensor or combination thereof, or the like.

Normally, as described herein, the decision making circuit is configured to activate at least one of the safety mechanisms, e.g., seat pull down mechanism, inflatable restraint, deployable cushion restraint, etc., carried by the vehicle seat and upon detection of a vehicle safety related event, e.g., vehicle impact or collision, vehicle roll over, etc. However, if the decision making circuit determines from at least one of the sensors 155A-155F that the vehicle seat 151 is not occupied, the decision making circuit is configured to inhibit activation of the one or more of the safety mechanism of the vehicle seat 151.

Referring now to FIGS. 20-21, yet another embodiment of a vehicle safety seat 300 is shown and again includes a vehicle seat in the form of a suspension seat 12 having a seat base 18 mounted to a support surface 21 of a motor vehicle. The vehicle safety seat 300 includes many of the same structural components as the vehicle safety seats of FIGS. 12-19, and like numbers are accordingly used to identify like components. It will be understood, however, that the above described feature of the actuator 102 being responsive to a collision alert signal to move the vehicle restraint harness 112 is optional in this embodiment, and the collision alert system 120 and connecting signal path 122 are accordingly shown in FIG. 20 in dashed-line form. The actuator 102, decision-making circuitry, actuatable components 104A, 104B, 108B and 110B, impact sensor 160, inflator 164 and air bladder 166, however, are included as shown. It will further be understood that the vehicle safety seat 300 includes a vehicle restraint harness, such as the vehicle restraint harness 112 illustrated in FIGS. 12 and 13, although such a restraint harness is omitted from FIGS. 20-21 for brevity and ease of illustration.

The vehicle safety seat 300 further includes another deployable restraint system. In the illustrated embodiment, this deployable restraint system is provided in the form of an inflatable bladder 190 configured to deploy adjacent to one side of the vehicle seat 12, e.g., the same side as the inflatable bladder 166, and extend in its deployed state between the seat bottom 14 and the seat back 16. In the illustrated embodiment, the inflatable bladder 90 is provided in the form of a tube that is normally, in its non-deflated state, carried within the seat bottom 14 and seat back 16. The inflatable tube 190 is attached at one end to the seat bottom 14 adjacent to or near a front portion of the seat bottom 14, and at its opposite end to the seat back 16 adjacent to or near a top portion of the seat back 16 as shown. Portions of the vehicle seat 12 are forced open during deployment the air bladder 190 so that the air bladder 190 is positioned, in its deployed state, between the seat bottom 14 and seat back 16 as shown. In the illustrated embodiment, the inflator 164 is responsive to either, or both of, the roll signal produced by the roll sensor module 140 and the impact signal produced by the impact sensor module 160, as described hereinabove, to control the inflator device 164 to deploy the inflatable air bladder 190. The inflatable air bladder 190 is thus deployed upon detection of either, or both of, a vehicle roll-over event and an impact of the vehicle of sufficient severity. The inflatable air bladder 190 is positioned relative to the seat 12 so that it deploys adjacent to the one side of the seat back portion 16 and between the seat bottom 14 and seat back 16 to thereby provide a cushioned restraint adjacent to the one side of the vehicle seat.

In the embodiment illustrated in FIGS. 20-21, two inflatable bladders 166 and 190 are provided. The bladder 166 provides for occupant head protection and the bladder 190 restrains lateral movement of the occupant. In one alternative embodiment, the vehicle safety seat 300 may provide for two such air bladders 190; one each positioned adjacent to a different side of the vehicle seat 12 to thereby restrain lateral movement of the occupant in either lateral direction. Alternatively or additionally, the vehicle safety seat 300 may provide for two air bladders 166; one each positioned adjacent to a different side of the vehicle seat 12 to thereby provide cushions for both sides of the occupant's head. Alternatively still, the vehicle safety seat 300 may omit the inflatable bladder 166 and provide only for one or more inflatable bladders 190 positioned adjacent to one or more sides of the vehicle seat 12.

In an alternative embodiment, the additional deployable restraint system for the vehicle safety seat 300 may be or include a resettable side restraint cushion mounted to the seat bottom 14, seat back 16 or both. In this embodiment, the actuator 102 may be structurally coupled to such a resettable side restraint cushion, and the actuator 102 may be responsive to either, or both of, the roll signal produced by the decision-making circuit 121 housed within the roll sensor module 140 and the impact signal produced by the decision-making circuit 163 to deploy such a side restraint cushion. Alternatively, a separate actuator may be provided to deploy the side restraint cushion in the manner just described. The side restraint cushion is thus deployed upon detection of either one or both of a vehicle roll-over condition and a vehicle impact of sufficient severity. In another alternative embodiment, the vehicle safety seat 300 may provide for two such side restraint cushions; one each positioned adjacent to a different side of the vehicle seat 12 to thereby provide cushions for both sides of the occupant upon detection of either one, or both of, a vehicle roll over event and a vehicle impact of sufficient severity. In any case, the one or more side restraint cushions may be resettable under the control of the decision-making circuit 121 and/or decision-making circuit 163. For example, when the vehicle roll-over condition and/or vehicle impact condition is no longer present, the decision-making circuit 121 and/or decision-making circuit 163 may be configured to produce a suitable signal that causes the actuator 102, or other suitable actuator, to retract or reset the one or more side restraint cushions to their pre-deployed, or stored, positions.

Figure 23:
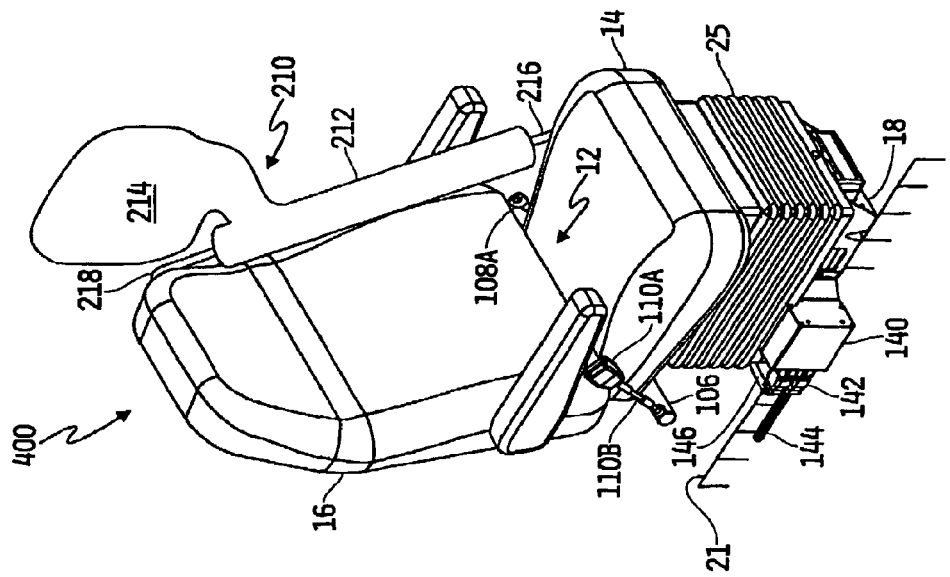
FIG. 23 is a front perspective view of the vehicle safety seat of FIG. 22.
Figure 22:
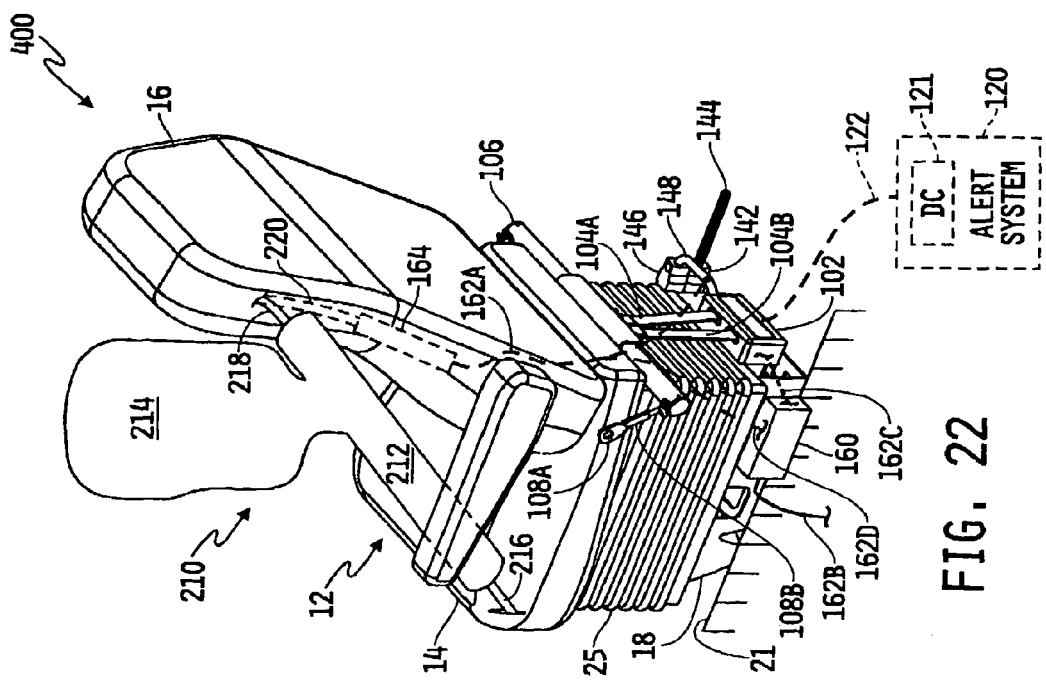
FIG. 22 is a rear perspective view showing a further embodiment of a vehicle safety seat including a suspension seat coupled to a seat base that is mounted to a support surface of a motor vehicle.

Referring now to FIGS. 22-23, a further embodiment of a vehicle safety seat 400 is shown and again includes a vehicle seat in the form of a suspension seat 12 having a seat base 18 mounted to a support surface 21 of a motor vehicle. The vehicle safety seat 400 includes many of the same structural components as the vehicle safety seats of FIGS. 12-21, and like numbers are accordingly used to identify like components. It will be understood, however, that the above described feature of the actuator 102 being responsive to a collision alert signal to move the vehicle restraint harness 112 is optional in this embodiment, and the collision alert system 120 and connecting signal path 122 are accordingly shown in FIG. 22 in dashed-line form. The actuator 102, decision-making circuitry, actuatable components 104A, 104B, 108B and 110B, impact sensor 160 and inflator 164, however, are included as shown. It will further be understood that the vehicle safety seat 400 includes a vehicle restraint harness, such as the vehicle restraint harness 112 illustrated in FIGS. 12 and 13, although such a restraint harness is omitted from FIGS. 22-23 for brevity and ease of illustration.

The vehicle safety seat 400 is similar to the vehicle safety seat 300 illustrated in FIGS. 20-21, with the exception that the two separate air bladders 166 and 190 are merged or integrated into a single inflatable air bladder 210. The inflatable air bladder 210 is normally carried, in its non-inflated state, within the vehicle seat 12, and is configured to deploy adjacent to one side of the vehicle seat 12 and extend in its deployed state between the seat bottom 14 and the seat back 16. In the illustrated embodiment, the inflatable bladder 210 the inflatable bladder includes a first bladder portion 214 configured to deploy adjacent to one side of the seat back 16 portion about a head region of an occupant of the vehicle seat 12 to thereby provide a cushion for one side of the occupant's head. The inflatable bladder further includes a second bladder portion 212 integral with the first bladder portion 214 and configured to deploy adjacent to the one side of the vehicle seat 12. The second bladder portion 212 extends in its deployed state between the seat back portion 16 of the vehicle seat 12 and the seat portion 14 of the vehicle seat 12 to thereby provide a cushioned restraint adjacent to the one side of the vehicle seat 12. The first bladder portion 214 thus provides for the function of the inflatable bladder 166 of the embodiment of FIGS. 20-21 and the second bladder portion 212 provides for the function of the inflatable bladder 190 of the embodiment of FIGS. 20-21. In any case, the inflator device 164 is responsive to either, or both of, the roll signal produced by the roll sensor module 140 and the impact signal produced by the impact sensor module 160 to deploy the inflatable air bladder 210. In an alternative embodiment, the vehicle safety seat 400 may provide for two such air bladders 210; one each positioned adjacent to a different side of the vehicle seat 12 to thereby restrain lateral movement of the occupant in either lateral direction and provide a cushion for each side of the occupant's head.

In an alternative embodiment, the inflatable air bladder 210 may be replaced with a resettable restraint cushion mounted to the seat bottom 14, seat back 16 or both. In this embodiment, the actuator 102 may be structurally coupled to such a resettable restraint cushion, and the actuator 102 may be responsive to either, or both of, the roll signal produced by the decision-making circuit 121 housed within the roll sensor module 140 and the impact signal produced by the decision-making circuit 163 to deploy such a side restraint cushion. Alternatively, a separate actuator may be provided to deploy the restraint cushion in the manner just described. The restraint cushion is thus deployed upon detection of either one or both of a vehicle roll-over condition and a vehicle impact of sufficient severity. In this embodiment, such a restraint cushion may include a first cushion portion positioned in the deployed position to provide a restraint cushion for the occupant's head in the same manner as the first bladder portion 214 just described, and a second cushion portion positioned in the deployed position to provide a side restraint in the same manner as the second bladder portion 212 just described. In another alternative embodiment, the vehicle safety seat 400 may provide for two such side restraint cushions; one each positioned adjacent to a different side of the vehicle seat 12 to thereby provide such cushions on both sides of the occupant upon detection of either one, or both of, a vehicle roll over event and a vehicle impact of sufficient severity. In any case, the one or more restraint cushions may be resettable under the control of the decision-making circuit 121 and/or decision-making circuit 163. For example, when the vehicle roll-over condition and/or vehicle impact condition is no longer present, the decision-making circuit 121 and/or decision-making circuit 163 may be configured to produce a suitable signal that causes the actuator 102, or other suitable actuator, to retract or reset the one or more restraint cushions to their pre-deployed, or stored, positions.

Figure 15B:
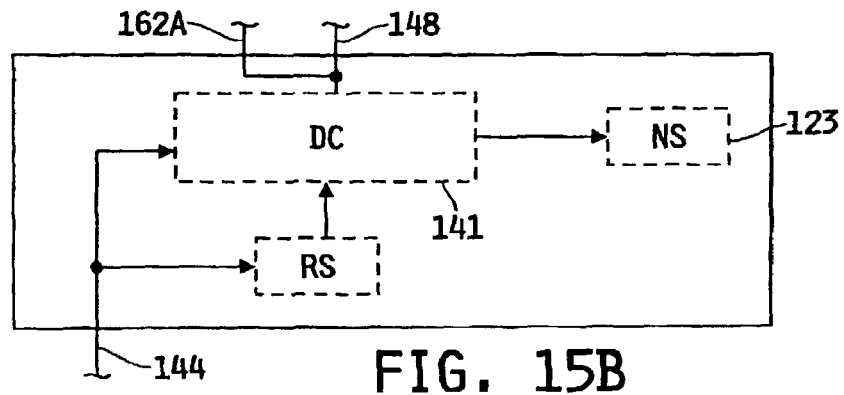
FIG. 15B is a block diagram illustration of one illustrative embodiment of the roll sensor module of FIG. 15A.
Figure 15A:
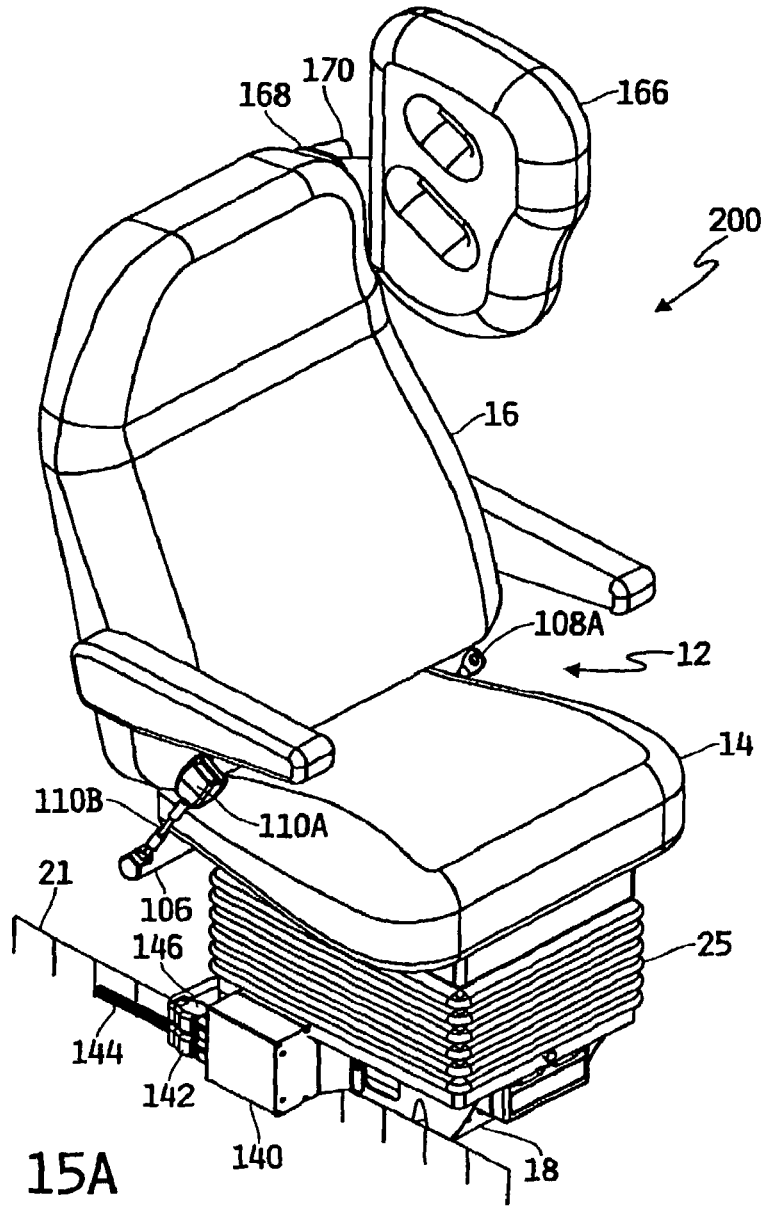
FIG. 15A is a front perspective view of the vehicle safety seat of FIG. 14A.

It has been described hereinabove with respect to FIGS. 12, 14B and 15B that the vehicle safety seat 100 or 200 may include a notification system 123 configured to transmit a notification signal upon detection of a collision or vehicle roll over event. It will be understood that such a notification system 123 may generally be configured to transmit a notification signal upon detection of any vehicle safety related event. Examples of vehicle safety related event detection systems that may be mounted to or carried by the vehicle seat and that may be configured to produce an event signal upon detection of a vehicle safety related event include, but should not be limited to, a roll sensor configured to produce the event signal upon detection of a vehicle roll over event, an impact or collision sensor configured to produce the event signal upon detection of a vehicle impact of sufficient severity, a vehicle or engine monitor configured to produce the event signal upon detection of an inoperable vehicle and/or a vehicle having compromised operability, a medical condition monitor configured to produce the event signal upon detection of a predefined medical condition of a driver of the vehicle, etc. As one specific example of the latter, the vehicle safety related event detection system may be a blood alcohol monitor which may be configured to produce the event signal upon detection of a blood alcohol content of the driver that is above a predefined blood alcohol level. It will be understood that other medical condition monitoring systems are contemplated by the present disclosure. In any case, the notification system responsive to the event signal to transmit a notification signal to a remote location. In any case, the notification system 123 may illustratively include a conventional cellular telephone system configured to transmit the notification signal by placing a call to the remote location. Alternatively or additionally, the notification system 123 may include a satellite transmission system configured to transmit the notification signal via satellite transmission. The notification system 123 may further include a global positioning system configured to determine a geographical location of the vehicle. In this case, the event signal may include information relating to the geographical location of the vehicle.

Figure 24:
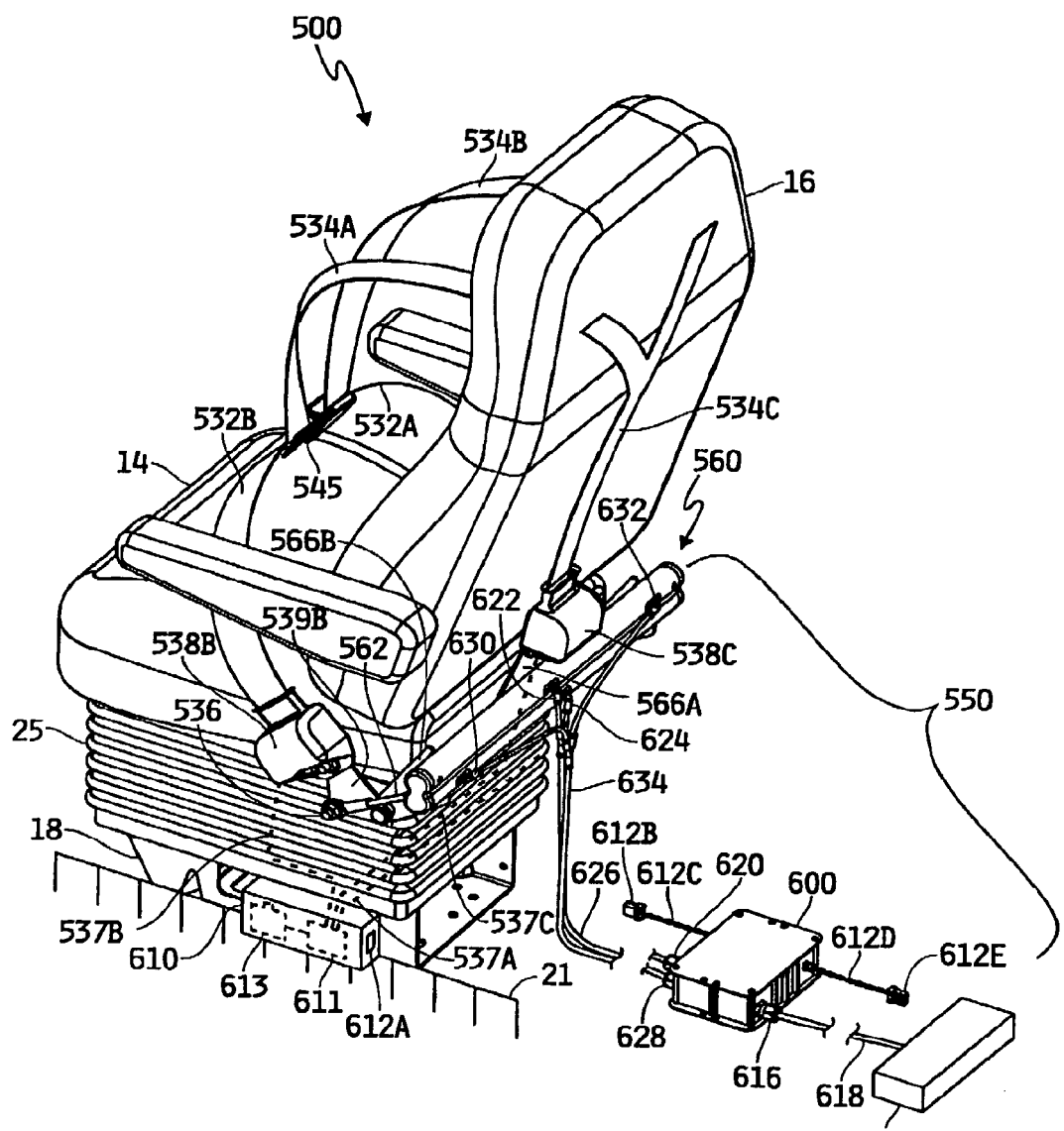
FIG. 24 is a rear perspective view of a vehicle suspension seat showing one illustrative embodiment of a resettable web pre-tensioning device and system.
Figure 25:
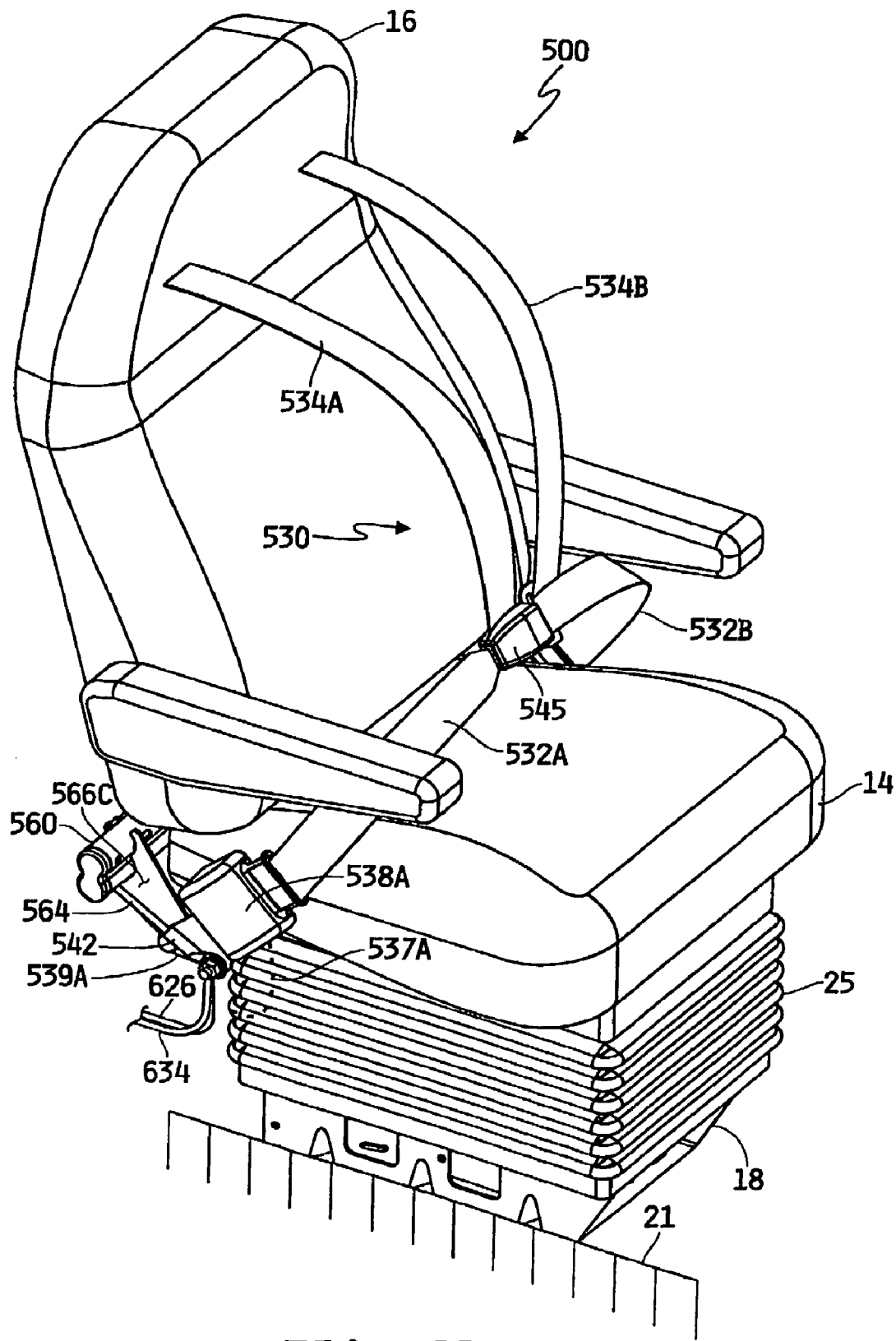
FIG. 25 is a front perspective view of the vehicle suspension seat of FIG. 24.
Figure 26:
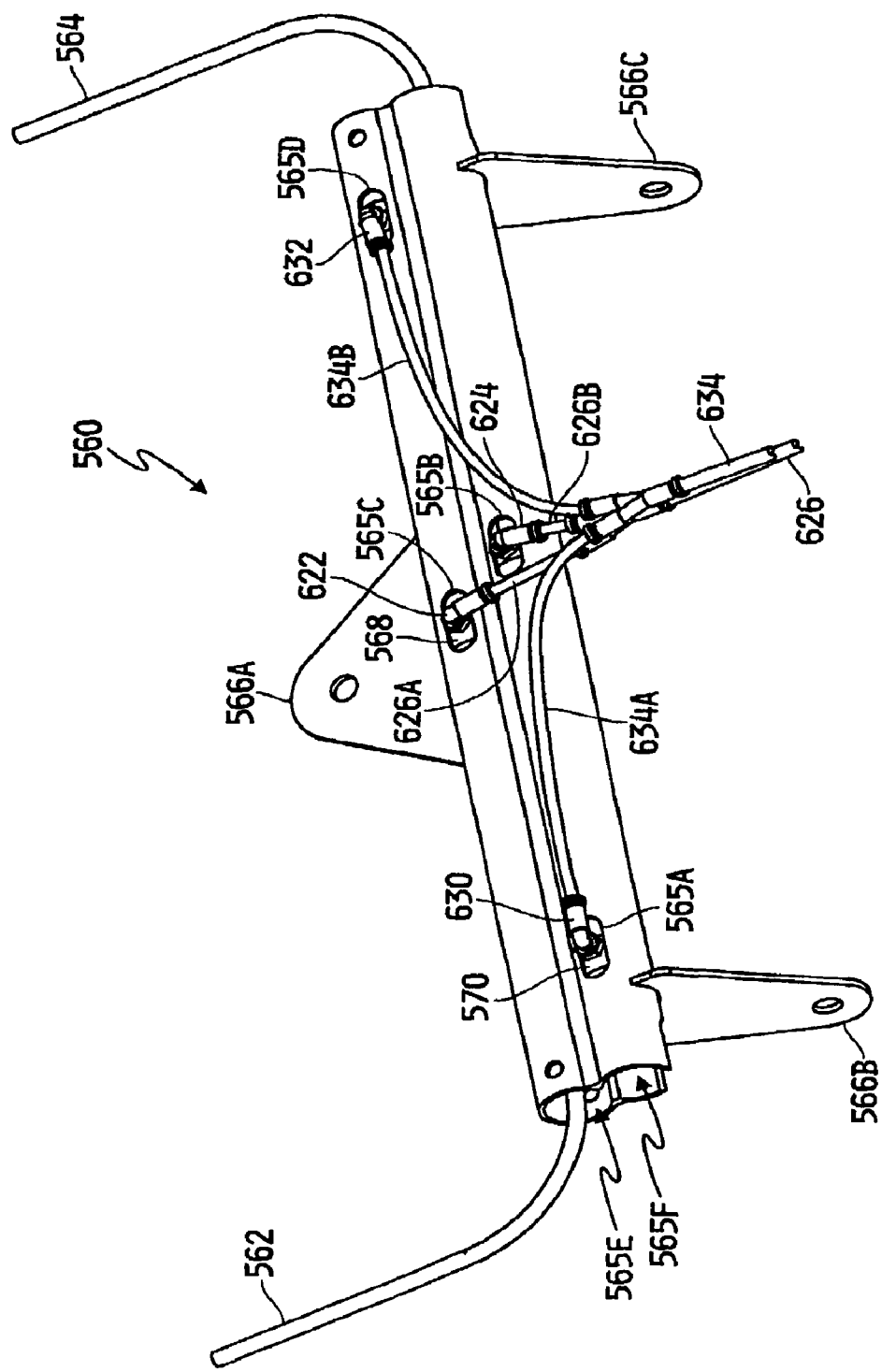
FIG. 26 is a perspective view of the resettable web pre-tensioning device of FIG. 24.

Referring now to FIGS. 24 and 25, one embodiment of a vehicle seat 500 is shown in the form of a suspension seat having a seat base 18 mounted to a support surface 21 of a motor vehicle. The suspension seat 500 is mounted to the seat base 18 via a conventional suspension mechanism (not shown). In the illustrated embodiment, the suspension mechanism is covered by a suitable cover or wrap 25, although such a cover or wrap 25 need not be related to the functionality of the suspension mechanism. The suspension mechanism may illustratively be a conventional pneumatic suspension mechanism, although the suspension mechanism may alternatively be a strictly mechanical, electro-mechanical, hydraulic, electro-hydraulic, electro-pneumatic, or like mechanism, or any combination thereof. In any case, the suspension mechanism is operable in a known manner to suspend the suspension seat 500 above the seat base 18 and at least somewhat isolate the seat 500 from vibrations, road noise and the like that are impressed upon the support surface 21 of the vehicle during normal vehicle operation. The suspension seat 10 itself includes a seat bottom 14 mounted to the suspension mechanism and a seat back 16 extending upwardly and away from the seat bottom 14.

The suspension seat 500 may further include a seat pull-down mechanism (not shown) that is configured to pull the suspension seat 500 down to, or near, the support surface 21 in the event of a vehicle rollover event and/or a vehicle impact of sufficient severity.

A multiple-point restraint harness is at least partially mounted to the vehicle seat 500. In the example illustrated in FIGS. 24 and 25, the multiple-point restraint harness is a conventional four-point restraint harness 530 including a first lap web or belt 532A, a second lap web or belt 532B, a first shoulder web or belt 534A, a second shoulder web or belt 534A and a central web or belt attachment mechanism 545 configured to releasably attach or engage the free ends of the webs or belts 532A, 532B, 534A and 534B to secure the webs or belts 532A, 532B, 534A and 534B about an occupant of the seat. The webs or belts 532A, 532B, 534A and 534B are positionable about an occupant of the seat in a conventional manner in that the web or belt 534A extends over a right shoulder of the occupant, the web or belt 534B extends over the left shoulder of the occupant, and the webs or belts 532A and 532B extend upwardly across a lap of the occupant.

One end of the lap web or belt 532A is secured to a conventional web retractor 538A that is secured to a web anchor plate 539A. The opposite end of the lap web or belt 532A is the free end described above, and is attached to a conventional tongue member configured to releasably engage the web or belt attachment mechanism 545 which, in this embodiment, is provided in the form of a conventional buckle member. Likewise, one end of the lap web or belt 532B is secured to a conventional web retractor 538B that is secured to a web anchor plate 539B. The opposite end of the lap web or belt 532B is the free end described above, and is attached to the web or belt mechanism 545 provided in the form of a conventional buckle member. In one alternative embodiment, either one or both of web retractors 538A and 538B may be integral with the web anchor plates 539A and 539B respectively. In another alternative embodiment, either or both of the web retractors 538A and 538B may be omitted, and either or both of the lap webs or belts 532A and 532B may be secured directly to the web anchor plates 539A and 539B respectively.

One end of the shoulder web or belt 534A is secured to, or integral with, another web or belt 534C. The opposite end of the lap web or belt 534A is the free end described above, and is attached to a conventional tongue member configured to releasably engage the web or belt attachment mechanism 545 provided in the form of a conventional buckle member. Likewise, one end of the lap web or belt 534B is secured to, or integral with, the web or belt 534C. The opposite end of the lap web or belt 534B is the free end described above, and is also attached to a conventional tongue member configured to releasably engage the web or belt attachment mechanism 545 provided in the form of a conventional buckle member. It will be understood that the buckle 545 may alternatively be attached to the free end of any of the webs or belts 532A, 532B, 534A and 534B, or that the buckle and various buckle-engaging tongues may be reversed, in that conventional buckles may be attached to the free ends of any three of the webs or belts 532A, 532B, 534A and 534B, and that a conventional buckle-engaging tongue may be attached to the free end of the remaining web or belt 532A, 532B, 534A and 534B.

The opposite end of the web or belt 534C is, in the illustrated embodiment, attached to another conventional web retractor 538C that is mounted to the seat 500. More specifically, the web retractor 538C in the illustrated embodiment is mounted to an attachment plate 566A of a resettable web pre-tensioning device 560 that is mounted to the seat 500 as will be described in greater detail hereinafter. In one alternative embodiment, the web retractor 538C may be attached directly to the seat. In another alternative embodiment, the web retractor 538C may be omitted, and the opposite end of the web or belt 534C may be attached directly to the attachment plate 566A or to the seat 500.

A resettable web pre-tensioning system 550 is operatively coupled to the suspension seat 500 and includes a resettable web pre-tensioning device 560, an air pressure control unit 600 in fluid communication with the resettable web pre-tensioning device 560 and with a pressurized air source 614, and a web pre-tension and reset control module 610 in data communications with the air pressure control unit 600. The pressurized air source 614 may be an existing pressurized air source carried by the vehicle or may alternatively be an auxiliary source of pressurized air provided for operation of the system 550 described herein. The resettable web pre-tensioning device 560 is mounted to the seat 500 via a number of mounting plates and appropriate attachment members. In the illustrated embodiment, for example, a pair of mounting plates 566A and 566B are attached, one each near opposite ends of the device 560, and a mounting plate 566C is attached substantially centrally to the device 560. The mounting plates 566A and 566B are attached via one or more suitable fixation or attachment members to opposite sides of the vehicle seat 500, and the mounting plate 566C is attached via one or more suitable fixation or attachment members to the seat 500, as shown. In alternative embodiments, more or fewer such mounting plates may be provided and positioned at various locations relative to the device 560 and/or seat 500. While some of the remaining components of the system 550 are shown in FIG. 25 as being mounted and/or mountable to the seat 500 and some are not, the present disclosure contemplates that any one, all, none, or some combination of the components 600, 610 and 614 may be mounted to the seat 500.

In the illustrated embodiment, the web pre-tension and reset control module 610 has an electrical connector 612A that is electrically connectable to a mating electrical connector 612B. The electrical connector 612B is electrically connected to one end of an electrical cord or cable 612C comprising one or more separate electrically conductive wires or conduction paths, the opposite end of which is electrically connected to the air pressure control unit 600. Another electrical cord or cable 612D extends outwardly from the air pressure control unit 600 and terminates at an electrical connector 612E. The electrical connector 612E is electrically connectable to a suitable voltage source; e.g., vehicle battery or vehicle ignition line (not shown), and the electrical cord or cable 612D is thus configured to provide a source voltage to the air pressure control unit 600. The electrical cord or cable 612C includes a sufficient number of conduction paths to provide the source voltage and ground reference to the web pre-tension and reset control module 610, and to also transfer control and/or data signals between the module 610 and the control unit 600. It will be understood that other electrical connection schemes may be used to provide electrical power to, and transfer information between, the module 610 and control unit 600, and that any such alternate schemes are contemplated by this disclosure.

In general, the web pre-tension and reset control module 610 includes at least one decision making circuit 611 electrically connected to the electrical connector 612A and in data communication with one or more web pre-tension and reset control units 613 each operable to monitor and detect occurrences of one or more web pre-tensioning and/or reset events. In one embodiment, the decision-making circuit 611 includes a conventional microprocessor or other processor circuit operable to execute instructions in the form of one or more software algorithms stored in memory. Alternatively, the decision-making circuit 611 may include one or more general-purpose and/or application-specific circuits configured to perform at least the functions described herein.

In one illustrative embodiment, the web pre-tension and reset control unit 613 may be or include a conventional collision alert system. The collision alert system further includes at least one radar antenna (not shown) suitably mounted to the vehicle, and signal processing circuitry configured to discern whether an object is in the path of the vehicle and whether a collision with the object is likely to occur under present operating conditions. Such a collision alert system may further be configured to provide an estimate of the time to impact with such an object. An example of one such a collision alert system is the VORAD® collision warning system produced by Eaton Corporation based in Cleveland, Ohio. Those skilled in the art will recognize, however, that other conventional collision warning or alert systems may be used. In any case, the signal processing circuitry included with the collision alert system is operable to produce a collision alert signal upon detection of an impending collision with an object in the path of the vehicle carrying the seat 500, and to provide the collision alert signal to the decision making circuit 611.

In another illustrative embodiment, the web pre-tension and reset control unit 613 may be or include a conventional vehicle roll over detection system. The vehicle roll over detection system includes at least one conventional roll sensor operable to monitor one or more vehicle roll over conditions and produce at least one roll over signal indicative of a vehicle roll over event, and to provide the roll over signal to the decision making circuit 611. In a further illustrative embodiment, the web pre-tension and reset control unit 613 may be or include a conventional vehicle impact detection system. The vehicle impact detection system includes at least one conventional impact sensor operable to monitor one or more vehicle impact conditions and produce at least one impact signal indicative of an impact of the vehicle of sufficient severity, and to provide the impact over signal to the decision making circuit 611. Those skilled in the art will recognize other sensors and/or systems that may be, or be included with, the web pre-tension and reset control unit 613, and any such other sensors and/or systems are intended to fall within the scope of this disclosure. Examples of such other sensors and/or systems may include, but are not limited to, sensors and/or systems for detecting a vehicle operator falling asleep, sensors and/or systems for detecting vehicle sliding or skidding conditions, sensors and/or systems for detecting vehicle runaway conditions, or the like. Any such sensors and/or systems may be operable to produce a web pre-tension signal, in the form of an operator alert signal, and to provide the operator alert signal to the decision making circuit 611.

Referring to FIGS. 24-27, the resettable web pre-tensioning device 560 includes a housing or carrier 565 having a number of mounting plates, brackets or flanges 566A, 566B and 566C mounted thereto for mounting and securing the device 560 to the vehicle seat 500 as described hereinabove. The housing or carrier 565 defines a pair of juxtaposed longitudinal chambers 565E and 565F therethrough for receiving a corresponding pair of web actuators 568 and 570 respectively therein. Each of the web actuators 568 and 570 include a guide member 582 extending into a housing 572 and longitudinally movable within a channel defined by the housing 572. The free end of the guide member 582 extending from the web actuator 568 is secured to a one end of a cable or other suitable linkage member 562 having an opposite end secured to the web anchor plate 539B at a web attachment point 536. Likewise, the free end of the guide member 582 extending from the web actuator 570 is secured to one end of another cable or other suitable linkage member 564 having an opposite end secured to the web anchor plate 539A at a web attachment point 542. The web actuators 568 and 570 are thus operatively coupled to the lap webs or belts 532A and 532B of the restraint harness 530 via the guide members 582, the cables 562 and 564 and the web anchor plates 539A and 539B respectively.

The air pressure control unit 600 has an air inlet 616 fluidly connected to an air outlet of the pressurized air source 614 via an air line 618. One air inlet/outlet 620 of the air pressure control unit 600 is fluidly connected to air inlet/outlet ports 622 and 624 of the web actuators 568 and 570 respectively via an air line 626, and another air inlet/outlet 628 of the air pressure control unit 600 is fluidly connected to air inlet/outlet ports 630 and 632 of the web actuators 568 and 750 respectively via an air line 634. In the embodiment illustrated in FIGS. 26 and 27, the housing or carrier 565 of the resettable web pre-tensioning device 560 defines a number of open slots 565A, 565B, 565C and 565D that align with corresponding ones of the air inlet/outlet ports 630, 624, 622 and 632 respectively of the web actuators 568 and 570 when the web actuators are received within the longitudinal chambers 565E and 565F respectively. The air line 626 forms a Y-connection, with one branch 626A being connected to the air inlet/outlet 622 of the web actuator 568 and the other branch 626B being connected to the air inlet/outlet 624 of the web actuator 570. Likewise, the air line 634 forms a Y-connection, with one branch 634A being connected to the air inlet/outlet 630 of the web actuator 570 and the other branch 634B being connected to the air inlet/outlet 632 of the web actuator 568. In an alternative embodiment, the air pressure control unit 600 may have separate air inlets/outlets for each of the air inlet/outlet ports 622, 624, 630 and 632 of the resettable web pre-tensioning device 560. In any case, the air pressure control unit 600, in one embodiment, includes a number of conventional electro-mechanical air valves that may be controlled by the decision making circuit 611 to selectively provide air pressure from the source 614 to any one or combination of the various air inlet/outlet ports 622, 624 and 630,632 of the resettable web pre-tensioning device 560, and to selectively allow pressurized air to escape from any one or combination of the various air inlet/outlet ports 622, 624 and 630,632 of the resettable web pre-tensioning device 560.

The decision making circuit 611 is responsive to a pre-tension signal produced by any one or more of the web pre-tension and reset control units 613 in the form of, for example, the collision alert signal, the roll over signal, the impact signal, the operator alert signal, or other web pre-tension signal, to control the air pressure control unit 600 in a manner that causes the web actuators 568 and 570 to draw the cables 562 and 564 into the housing or carrier 565. The cables 562 and 564, in turn, pull the restraint harness anchor plates 539A and 539B downwardly away from the seat bottom 14, thereby drawing the interconnected lap webs or belts 532A and 532B and the shoulder webs or belts 534A and 534B of the restraint harness 530 downwardly toward the seat bottom 14. This action thus causes the restraint harness 530 to tighten around the occupant of the seat 500. In this way, the decision making circuit 611 is responsive to a pre-tension signal to control the air pressure control unit 600 in a manner that moves the web actuators 568 and 570 to web pre-tension positions relative to the housing or carrier 565.

In one embodiment, if the impending event that triggered production of the pre-tension signal (e.g., impending collision with a body, vehicle roll over, vehicle impact, etc.) fails to occur, does not occur with sufficient severity, or after a predefined time period has elapsed since the pre-tension signal was produced, the one or more web pre-tension and reset control units 613 that produced the pre-tension signal then produces a reset signal. In this embodiment, the decision making circuit 611 is responsive to the reset signal produced by any one or more of the web pre-tension and reset control units 613 to control the air pressure control unit 600 in a manner that causes the web actuators 568 and 570 to extend the cables 562 and 564 outwardly from the housing or carrier 565 to release the pre-tension on the web anchor plates 539A and 539B and the restraint harness 530, and accordingly return the web anchor plates 539A and 539B, and thus the restraint harness 530, to their default positions. In their default positions, the restraint harness anchor plates 539A and 539B provide for a conventional amount of slack in the restraint harness 530. In this way, the decision making circuit 611 is responsive to a reset signal to control the air pressure control unit 600 in a manner that moves the web actuators 568 and 570 to web reset positions.

Alternatively or additionally, the decision making circuit 611 may, on its own, control the air pressure control unit 600 in a manner that moves the web actuators 568 and 570 to web reset positions after passage of a predetermined time period since receiving the web pre-tension signal. As an example of each embodiment, an on-board collision alert or warning system of the type described hereinabove may produce a pre-tension signal upon detection of a structure in the path of the vehicle with which impact is imminent. In response, the decision making circuit will control the air pressure control unit 600 in a manner that moves the web actuators 568 and 570 to their pre-tension positions, thus pre-tensioning the restraint harness 530. The vehicle operator may then employ the vehicle braking system and/or take evasive action to avoid the collision. With the collision avoided, the collision alert or warning system may then produce a web reset signal, to which the decision making circuit 611 is responsive to control the air pressure control unit 600 in a manner that results in a reset of the restraint harness 530 to its default position as just described. Alternatively or additionally, the decision making circuit 611 may, after the passage of a predefined time period since the web pre-tension signal was produced, control the air pressure control unit 600 on its own in a manner that results in a reset of the restraint harness 530 to its default position.

In embodiments of the illustrated and described seat 500 that include one or more of the retractors 538A, 538B and 538C, any one or more such actuators may further include a conventional electronic locking mechanism responsive to a locking control signal on a corresponding signal path 537A, 537B and 537C respectively to lock any one or more of the webs or belts 532A, 532B and 534C to a corresponding retractor 538A, 538B and 538C. In embodiments wherein the decision making circuit 611 is responsive to a pre-tension signal produced by any one or more of the web pre-tension and reset control units 613 to control the air pressure control unit 600 in a manner that causes the web actuators 568 and 570 to draw the cables 562 and 564 into the housing or carrier 565 to their pre-tension positions, wherein the event resulting in the production of the pre-tension signal would not otherwise result in inertial locking of any one or more of the retractors 538A, 538B and 538C, the decision making circuit 611 may further be configured to produce the one or more locking control signals to thereby electronically lock corresponding ones of the one or more retractors 538A, 538B and 538C prior to controlling the air pressure control unit 600 in a manner that controls the web actuators 568 and 570 to their pre-tensioning positions. Thus, in cases where the pre-tension signal is produced by the decision making circuit 611 in the form of, for example, the collision alert signal, the operator alert signal, or other web pre-tension signal indicative of a non-impact or non-roll over event, the decision making circuit 611 is first operable to lock one or more of the retractors 538A, 538B and 538C. When the decision making circuit 611 thereafter controls the air pressure control unit 600 in a manner that controls the web actuators 568 and 570 to their pre-tensioning positions, the one or more locked retractors 538A, 538B and 538C will be inhibited from paying out any web, thereby allowing the resettable web pre-tensioning device 560 to pre-tension the restraint harness 530 as described hereinabove. In one alternative embodiment, the electronic web locking mechanism of any one or more of the web retractors 538A, 538B and/or 538C may be replaced with a conventional air-pressure controlled actuator responsive to suitable air pressures supplied by the air pressure control unit 600 to control locking and unlocking thereof. In this embodiment, one or more additional air lines may be provided between the air control unit 600 and the one or more retractors 538A, 538B and 538C, and the decision making circuit 611 may be configured to control the operation of the air pressure control unit 600 in a conventional manner to control locking and unlocking of the one or more retractors 538A, 538B and 538C.

Figure 27:
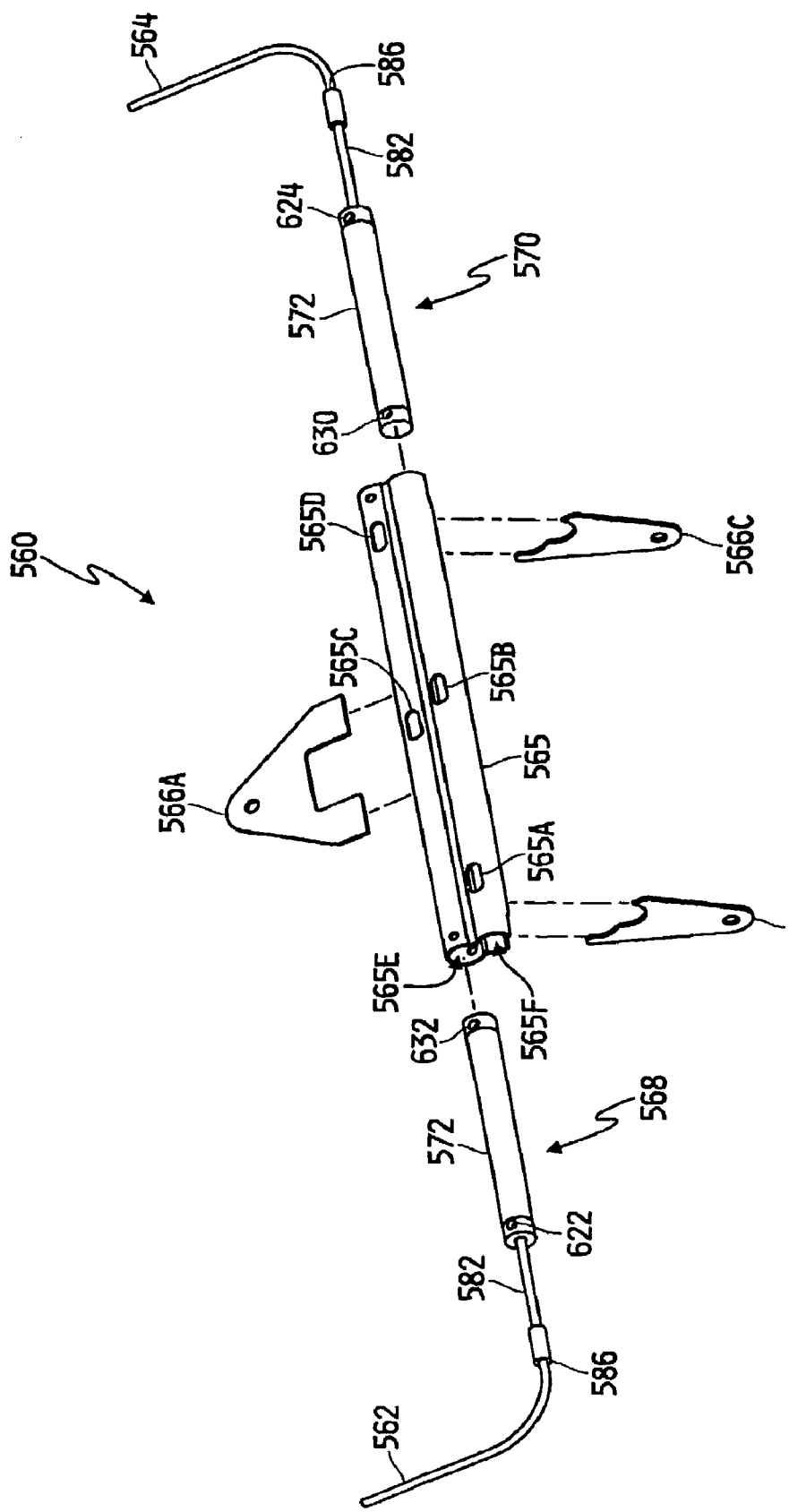
FIG. 27 is an exploded view of the resettable web pre-tensioning device of FIG. 26.
Figure 28:
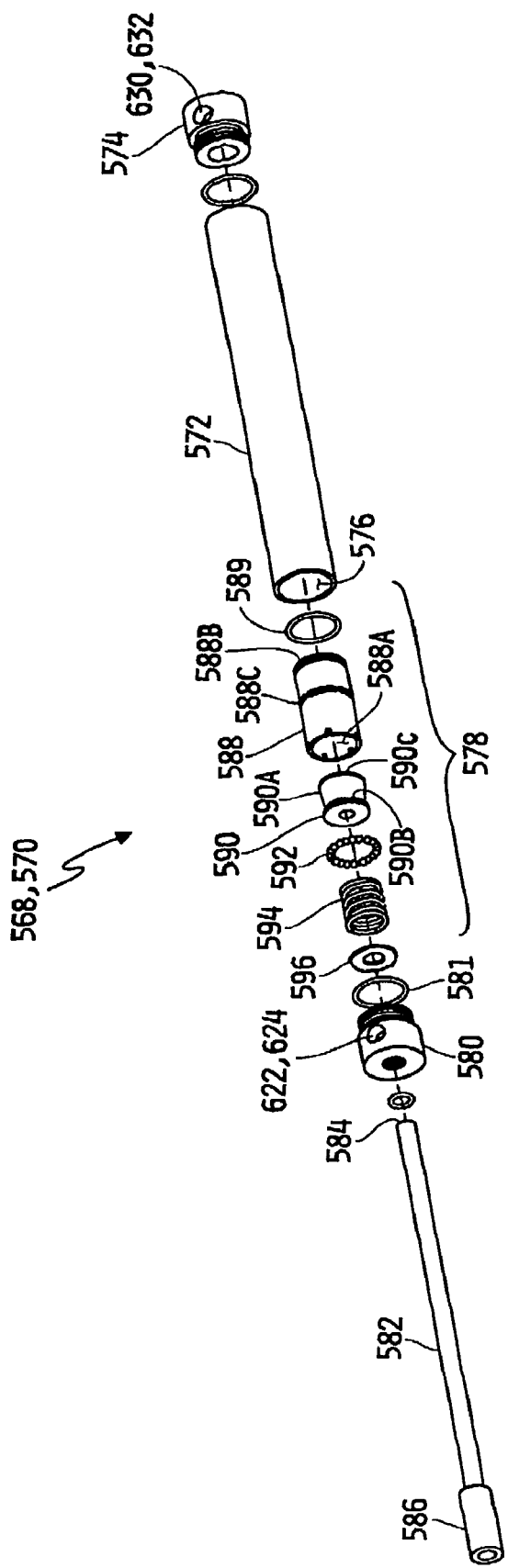
FIG. 28 is an exploded view of one of the web actuators associated the resettable web pre-tensioning device of FIGS. 26 and 27.

Referring now to FIG. 28 an exploded view of one embodiment of either of the web actuators 568, 570 of FIG. 27. is shown. In the illustrated embodiment, the web actuator 568, 570 includes an elongated housing 572 defining a channel 576 longitudinally therethrough. An end cap 574 is attached to one end of the housing 572, wherein the end cap 574 defines the air inlet/outlet port 630, 632. In the illustrated embodiment, the end cap 574 is threaded, and the end of the housing 572 is correspondingly threaded to threadingly receive the end cap 574 to form an air-tight seal therebetween. Alternatively, other conventional structures and/or techniques may be used to attach the end cap 574 to end of the housing 572. Any such attachment mechanism should form an air-tight seal between the housing 572 and the end cap 574.

A piston assembly 578 is configured to be received within the channel 576 of the housing 572, and to be linearly and longitudinally movable in either direction along the channel 576. Another end cap 580 is configured to be attached to the open end of the housing 572 after the piston assembly 578 is received therein. In the illustrated embodiment, the end cap 580 is threaded and the open end of the housing 572 is correspondingly threaded so that the end cap 580 threadingly engages the housing 572. Alternatively, other conventional structures and/or techniques may be used to attach the end cap 80 to the housing 572, and any such attachment mechanism should form an air-tight seal between the end cap 580 and the housing 572. In the illustrated example, an O-ring 81 is shown as being positioned between the end cap 584 and the housing 572 for the purpose of facilitating an air-tight seal between the end cap 580 and the housing 572. Although not specifically illustrated in FIG. 28, a similar O-ring may be positioned between the end cap 574 and the housing 572 to facilitate an air-tight seal therebetween. The O-ring 581 may be formed of any suitable flexible, rigid or semi-rigid material. Examples include, but are not limited to, rubber, nylon, or the like.

The end cap 580 defines a bore therethrough, and one end 584 of the guide member 582 extends through the bore in the end cap 580 and is mounted to the piston assembly 578 so that the piston assembly 578 and the guide member 582 are together movable in either longitudinal direction along the channel 576 formed in the housing 572. The opposite end 86 of the guide member 582 is configured to be secured to the cable 562, 564 (not shown in FIG. 28) in a conventional manner. Through the structural connections of the cable 562, 564 described hereinabove, the end 586 of the guide member 582 is thus secured to the restraint harness 530. The piston assembly 578 and guide member 582 are therefore together movable linearly along the channel 576 between a web pre-tensioning position and a web reset position as these terms are described hereinabove, and in the piston assembly 578 and guide member 582 thus form a linear actuator configured to move the cables 562 and 564 between the pre-tensioning and reset positions.

The piston assembly 578 includes a piston member 588 defining a bore or channel 588A therethrough terminating at a piston end 588B. A portion 588C of the sidewall of the piston member 588 is deformable in a manner that will be described hereinafter. In the illustrated embodiment, the deformable portion 588C completely circumscribes the sidewall of the piston member 588. Alternatively, the deformable portion 588C may be confined to a single location relative to the sidewall or extend only partially about the sidewall of the piston member 588. In any case, the outer sidewall of the piston member 588 further defines a groove or a channel thereabout adjacent to the end 599B, and a sealing member 589 is sized to be received within the channel or groove adjacent to the end 588B. The piston member 588 and the sealing member 589 are both sized so that the piston member 588 forms an air-tight seal between the open end 588A and the closed end 588B when the piston assembly 578 is received within the channel 576 of the housing 572. The sealing member 589, as with the sealing member 81, may thus be formed of any suitable material for facilitating an air-tight seal, examples of which include, but are not limited to, rubber, nylon, or the like.

A load member 90 is sized to be received within the piston member 588, and defines a bore therethrough that is sized to receive the end 854 of the guide member 582 therein. In one embodiment, the guide member 582 is threaded near its end 584 and the load member 590 is complimentarily threaded so that the guide member 582 is secured to the load member 590 via threaded engagement between the end 584 of the guide member 582 and the load member 590. Alternatively, the end 584 of the guide member 582 may be secured to the guide member 590 in any conventional manner. In any case, the guide member 582 and the load member 590 are secured together so that they move together relative to the channel 576 in the housing 572. In the illustrated embodiment, the load member 590 is wedge-shaped in cross-section between a reduced cross-section portion 590B and an end 590C of the load member 590. The outer surface 590A defined between the reduced cross-section portion 590B and the end 590C is sloped such that the cross-sectional area of the load member 590 increases between the reduced cross-section portion 590B and the end 590C. The outer surface 590A of the load member 590 thus slopes away from the inner sidewall of the piston member 588 in a direction away from the closed end 588B of the piston member 588.

A locking member 592 is sized to be positioned between the reduced cross-section portion 590B of the load member 590 and the inner sidewall of the piston member 588 when the load member 590 is received within the piston member 588. In the illustrated embodiment, the locking member 592 comprises a number of bead members sized to be positioned adjacent to the reduced cross-section portion 590A of the outer surface of the load member 590 so that when so positioned, the load member 590 may move longitudinally through the piston member 588 unimpeded by the locking member 592. Alternatively, the locking member 592 may comprise one or more bead members sized to be positioned relative to the reduced cross-section portion 590A of the load member 590 at a single location or extending at least partially about the outer surface of the load member 590. The bead members illustrated in FIG. 28 are circular in cross-section. Alternatively one or more of the bead members may have other or different cross-sectional shapes. The piston assembly 578 further includes a retaining member 596 positioned over the guide member 582, and a spring member 594 positioned between the retaining member 596 and the load member 590. The retaining member 596 is configured to mount to the open end 588A of the piston member 588.

Figure 29:
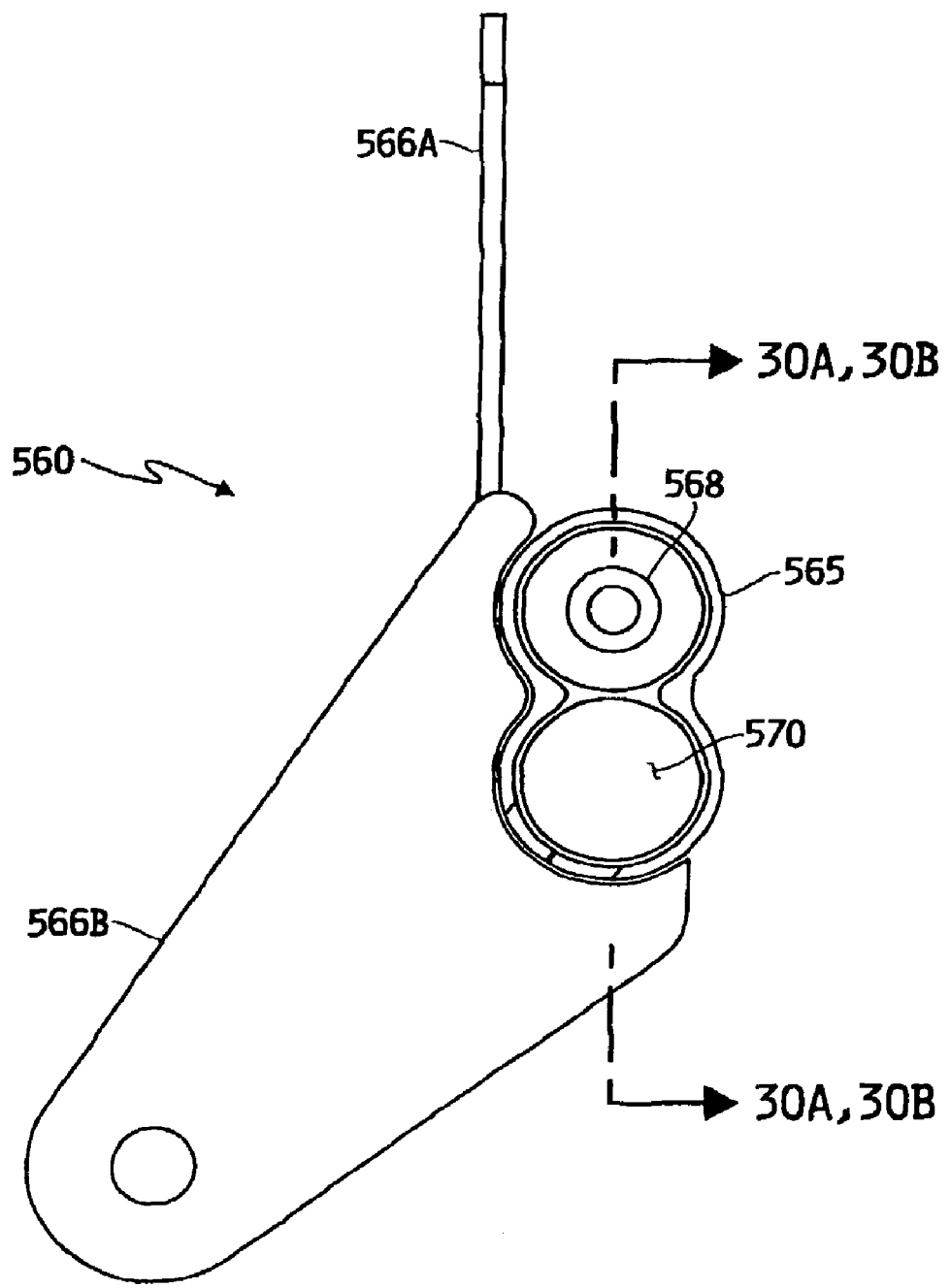
FIG. 29 is an end elevational view of the resettable web pre-tensioning device of FIGS. 26-28.
Figure 30C:
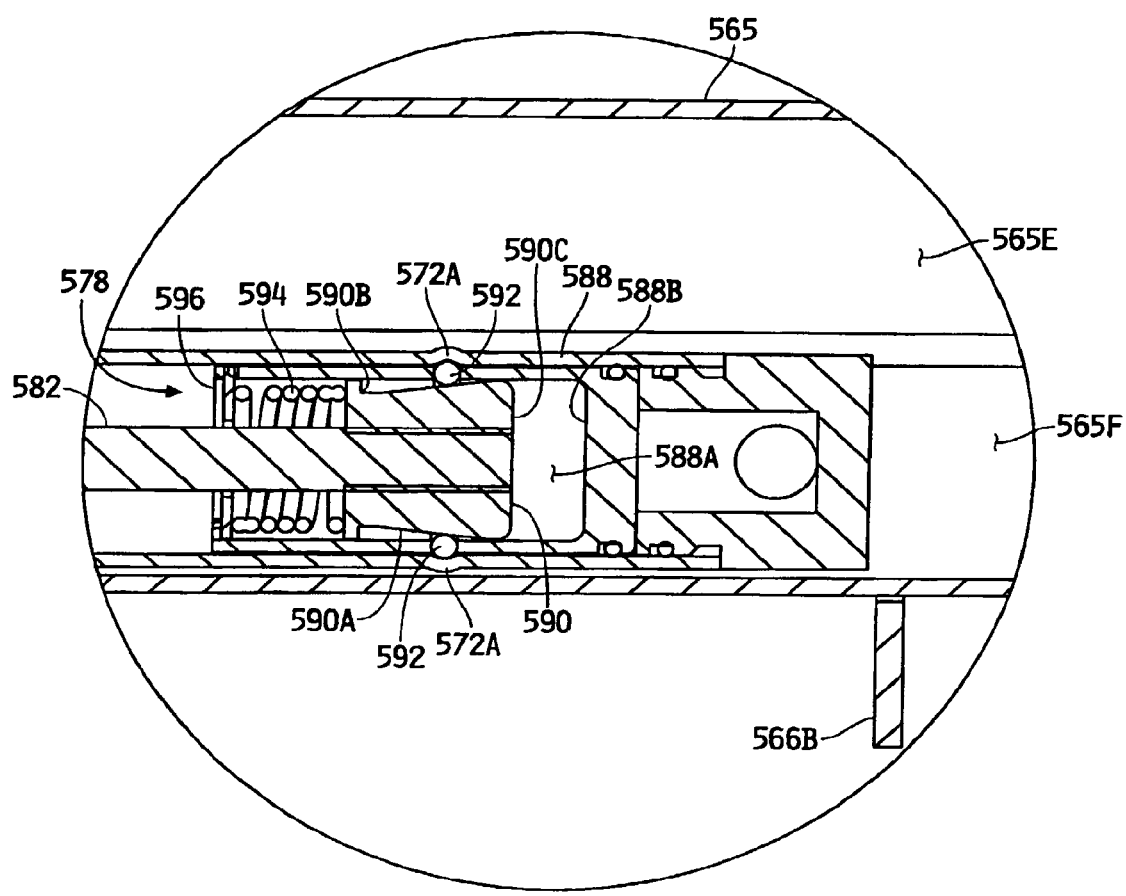
FIG. 30C is a magnified cross-sectional view of the area of the web actuator identified in FIG. 30B, illustrating locking of the guide member to the web actuator housing.

Referring now to FIGS. 30A-30C, operation of the re-settable web pre-tensioning device 560 will now be described. FIGS. 30A and 30B are both cross-sectional views of the re-settable web pre-tensioning device 560 as viewed along section lines 30A, B-30A, B of the end-view of the device 560 illustrated in FIG. 29. In the illustrated embodiment, the piston assembly 578 defines two separate air-tight spaces between the end caps 574 and 580 of the linear web actuator 568, 570. Specifically, a first space 576A is defined between the piston assembly 578 and the end cap 574, and a second space 576B is defined between the piston assembly 578 and the end cap 580. The piston assembly 578 forms an air-tight seal between the two spaces 576A and 576B as described hereinabove. The air inlet/outlet port 630, 632 defined in the end cap 574 is in fluid communication with the space 576A, and the air inlet/outlet port 622, 624 defined in the end cap 580 is in fluid communication with the space 576B. Generally, the piston assembly 578 is movable within the channel 576 of the web actuator 568, 570 between the web pre-tensioning and web reset positions described hereinabove as a function of pressure levels within the spaces 576A and 576B. For example, in the web reset position, which is the normal or default position of the web assembly 530 described hereinabove, the decision making circuit 611 (FIG. 24) is operable to control the air pressure control unit 600 in a manner that establishes a higher air pressure in the space 576A than in the space 576B to thereby force the piston assembly 578 toward the end cap 580 to a web reset position relative to the housing 572 as illustrated by example in FIG. 30A. In this position, the end 586 of the guide member 582 extends a predetermined distance from the end cap 580, thereby establishing the reset or default position of the restraint harness 530.

In the web pre-tensioning position, in contrast, the decision making circuit 611 is operable to control the air pressure control unit 600 in a manner that allows some air to escape from the space 576A while increasing the pressure in the space 576B so that the piston assembly 578 moves toward the end cap 574 to the web pre-tensioning position as illustrated by example in FIG. 30B. In this position, the end 586 of the guide member 582 extends a shorter distance from the end cap 580 than in the web reset position. As a result, the restraint harness 530 is moved to its web pre-tension position as described hereinabove. It will be understood that, depending upon the application, either one or both of the web actuators 568 and 570 may be controlled, as just described, to selectively control the web actuators 568 and 570 between their web pre-tension positions and their web reset positions respectively.

During normal (e.g., non-impact, non-rollover, etc.) operation, the decision making circuit 611 may be operable as described hereinabove to selectively move either or both of the web actuators 568 and 570 between their web pre-tension and web reset positions as described hereinabove. During such operation, as illustrated in FIGS. 30A and 30B, the load member 590 is maintained at or near the closed end 588B of the piston member 588 and the locking member 592 is, as a result, maintained at or near the reduced cross-section portion 590B of the outer surface 590A of the load member 590. However, under impact, rollover and/or other events that may cause the occupant of the seat 500 to exert a force on the restraint harness 530 in a direction away from the end 586 of the guide members 582, the locking member 592 is configured to lock the piston assembly 578 to the housing 572.

The pressure within the air space 576B generally applies a force to the retaining member 596 that is greater than the biasing force of the spring member 594. Thus, when no force, or a force that is insufficient to overcome the bias of the spring member 594, is applied to the guide member 582 in a direction away from the web actuator 568, 570, the load member 590 is forced by the bias in the spring member 594 into engagement with the closed end 588B of the piston member 588. However, when a force sufficient to overcome the bias in the spring member 594 is applied to the guide member 582 in a direction that draws the end 586 away from the end cap 580, such as during an impact, vehicle rollover, or the like, the guide member 582 draws the load member 590 toward the retaining member 596, thereby compressing the spring member 594, as illustrated in the magnified cross-sectional view of FIG. 30C. As this occurs, the locking member 592 travels along the sloped outer surface 590A of the load member 590. As travel of the load member 590 toward the retaining member 596 continues, the sloped outer surface 590A of the load member 590 forces the locking member 592 into the sidewall of the piston member 588. As the force between the outer surface of 590A of the load member 590 on the locking member 592 becomes sufficiently high, the deformable portion 588C of the piston member 588 will deform outwardly toward the sidewall of the channel 576 defined through the housing 572. As deformation of the piston member 588 occurs as the result of movement of the load member 590 toward the retaining member 596, the outer surface 590A of the load member 590 forces the locking member 592 into engagement between the load member 590 and the housing 572 of the web actuator 568, 570 with the piston member 588 positioned therebetween. As the load member 590 continues to move toward the retaining member 596, the increasing force of the locking member 592 with the housing 572 eventually causes the housing 572 to deform at a region 572A, thereby forcing the locking member 592 into locking engagement with the housing 570, with the deformed piston member 588 positioned therebetween.

Figure 31:
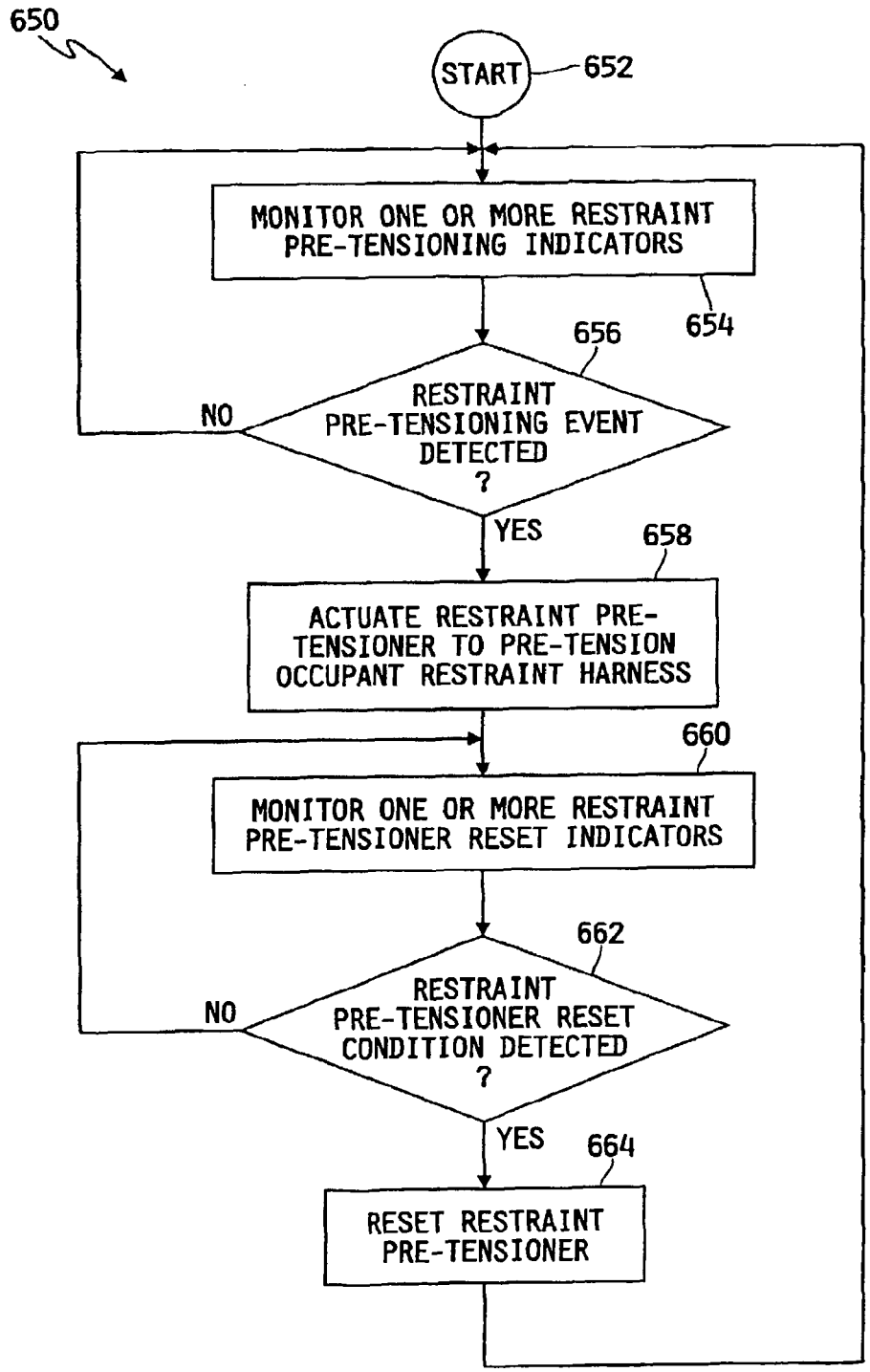
FIG. 31 is a flowchart illustrating one illustrative process for controlling operation of the resettable web pre-tensioning device.

Referring now to FIG. 31, a flow chart is shown illustrating one illustrative embodiment of a software algorithm 650 for controlling the re-settable web pre-tensioning device 560 between the web pre-tension and web reset positions described hereinabove. The algorithm is stored in a memory associated with the decision making circuit 611, and is executed by the decision making circuit 611 in a conventional manner. The algorithm 650 begins at step 652, and thereafter at step 654 the decision making circuit 611 is operable to monitor one or more restraint pre-tensioning indicators. The restraint pre-tensioning indicators may be or include any one or more of the web pre-tension signals described hereinabove including, but not limited to, a collision alert signal, a rollover signal, an impact signal, a vehicle stability signal produced by a conventional vehicle stability monitoring system, a sleepy driver signal produced by a conventional sleepy driver detection system, a continuous operation alert signal produced by a conventional vehicle operation monitoring system, a medical alert signal produced by a conventional body condition monitoring system, etc. A conventional vehicle stability monitoring system may, for example, be responsive to any one or more of vehicle pitch, roll and/or yaw, detected wheel slippage, vehicle acceleration and/or the like to determine whether current vehicle operation is stable and, if not, to produce a web pretension signal. A conventional sleepy driver detection system may, for example, be responsive to driver head and/or torso position and/or motion to determine whether the driver is asleep or is about to fall asleep and, if so, to produce a web pretension signal. A conventional vehicle operation monitoring system may, for example, be configured to monitor operation of the vehicle, and to produce a web pretension signal if the vehicle operation monitoring system determines that the vehicle and/or engine has been continuously operating for more than a predefined time period. A conventional body condition monitoring system may, for example, be configured to monitor a condition, e.g. a medical condition, of the driver and to produce a web pretension signal if the medical condition of the driver falls below a predefined threshold, rises above a predefined threshold and/ or falls outside of a predefined range of values. Examples of medical conditions that may be monitored include, but should not be limited to, heart rate, blood glucose level, blood pressure, blood alcohol level, and the like.

Following step 654, the decision making circuit 611 is operable at step 656 to determine, based on the monitoring step 654 whether a restraint pre-tensioning event has occurred. If not, execution of the algorithm 650 returns to step 654. If, on the other hand, the decision making circuit 611 has determined that a restraint pre-tensioning event has occurred, execution of the algorithm 650 advances to step 658 where the decision making circuit 611 is operable to control the air pressure control unit 600 in a manner that actuates the web actuator 568 and/or the web actuator 570 to pre-tension the occupant restraint harness 530 as described hereinabove. The decision making circuit 611 may be configured to control the air pressure control unit 600 differently for different web pre-tensioning events, and in any case may be configured to control the air pressure control unit 600 to actuate the web actuator 568 and/or the web actuator 570 any number of times according to any desired actuation pattern.

Following step 658, the decision making circuit 611 is operable at step 660 to monitor one or more restraint pre-tension or reset indicators. The restraint pre-tension or reset indicators may be or include, but are not limited to, web reset signals produced by any one or more of the web pre-tension and reset control units 613 described hereinabove, passage of a pre-determined amount of time following production of a web pre-tension signal, or the like. In any case, execution of the algorithm 650 advances from step 660 to step 662 where the decision making circuit 611 is operable to determine whether, from the monitoring step 660, any restraint pre-tension reset condition has occurred. If not, execution of the algorithm 650 loops back to step 660. If, on the other hand, a decision making circuit 611 determines at step 660 that a restraint pre-tension reset condition has occurred, execution of the algorithm advances to step 664 where the decision making circuit 611 is operable to control the air pressure control unit 600 in a manner that results in resetting of the web actuators 568 and/or 570 to their web reset positions as described hereinabove.

Figure 32:
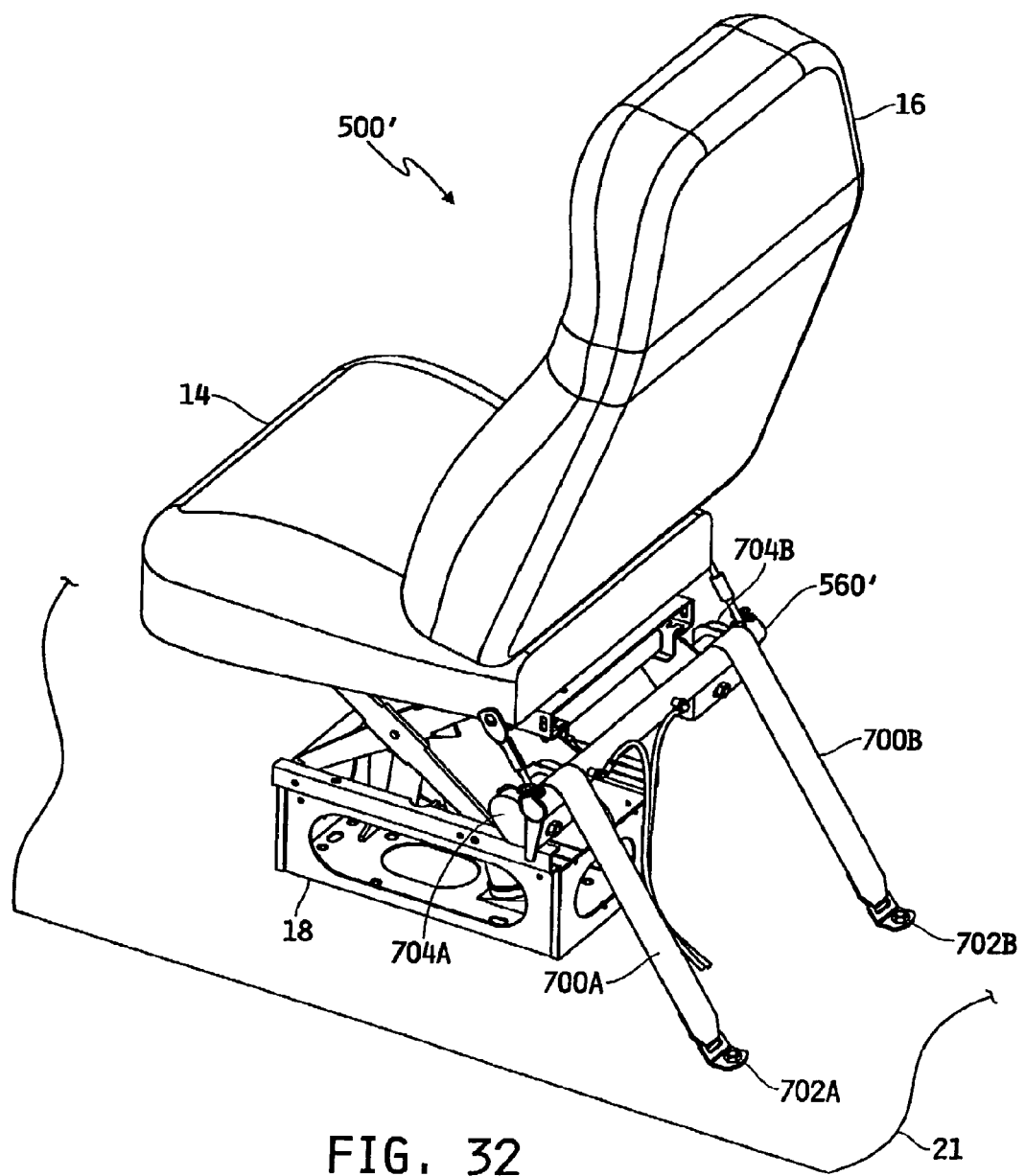
FIG. 32 is a rear perspective view of one illustrative embodiment of a vehicle seat restraint apparatus.

Referring now to FIG. 32, a vehicle suspension seat 500' is shown. In this embodiment, the resettable web pre-tensioning device 560' has mounted thereto on either side a pair of retractors 704A and 704B with corresponding webs 700A and 700B extending therefrom. The free ends 702A and 702B of the webs 700A and 700B are secured to the support surface 21; e.g., the floor of the vehicle. The retractors are configured such that the webs 700A and 700B are fully extended and taught when the vehicle seat 500' is in its fully upwardly extended position. In this position, and without the webs 700A and 700B as shown, an occupant of the seat 500' may exert sufficient forward force against an occupant restraint harness (not shown) during vehicle impact and/or roll over to draw the seat 500' and deform the suspension mechanism before the seat pull down mechanism is able to pull the seat 500' down to or near the support surface 20 as described hereinabove. The webs 700A and 700B maintain sufficient force on the resettable web pre-tensioning device 560' to inhibit such deformation of the seat pull down mechanism. It will be understood that more or fewer such webs may be provided. Alternatively or additionally, the one or more retractors 704A and 704B may be mounted to the seat bottom 14 and/or seat frame.

Referring now to FIGS. 33A and 33B, a vehicle seat 500" is shown including another embodiment of a resettable seat pre-tensioning device 810. In the illustrated embodiment, an occupant restraint harness 800 is a conventional three-point restraint harness having a shoulder and lap web 802 extending through a web support member 804 mounted to a support surface of the vehicle, such as a wall of the cab area, and secured to a resettable web pre-tensioning device 810. The device 810 is secured to the support surface 21; e.g., floor of the vehicle, via a bracket 812. The device 810 includes a housing 820 having a linear actuator 830 mounted thereto, wherein the linear actuator 830 may be identical to the linear actuators 568, 570 illustrated and described herein. Alternatively, the linear actuator 830 may be identical to the linear actuators 568, 570 illustrated and described herein with the exception that the locking mechanism 592 may be omitted. In this embodiment, the end 584 of the guide member 582 need not move relative to the piston 588, and all structure relating to such movement that was illustrated and described herein may likewise be omitted. In any case, the linear actuator 830 has a first air inlet/outlet 832 connected by a tube, hose or conduit 834 to the air pressure control unit 600, and a second air inlet/outlet 836 connected by a tube, hose or conduit 838 to the air pressure control unit 600.

The housing 820 defines a compartment 822 having a retractor 824 mounted therein with the web 802 attached thereto in a conventional manner. A slot 826 is defined in the housing 820 and receives a collar 828 positioned between the housing of the linear actuator 830 and a guide member 840 extending from the linear actuator housing. The guide member 840 is attached via a nut 842 or other suitable fixation element to a web turning member 844.

In operation, the decision making circuit 611 is responsive to a pre-tension signal produced by any one or more of the web pre-tension and reset control units 613 in the form of, for example, the collision alert signal, the roll over signal, the impact signal, the operator alert signal, or other web pre-tension signal, to control the air pressure control unit 600 in a manner that causes the web actuator 830 to engage the web turning mechanism 844 and push the mechanism 844 toward the retractor 824. This results in a downward force on the web 802, thereby tightening the web 802 against an occupant of the seat 500".

In one embodiment, if the impending event that triggered production of the pre-tension signal (e.g., impending collision with a body, vehicle roll over, vehicle impact, etc.) fails to occur, does not occur with sufficient severity, or after a predefined time period has elapsed since the pre-tension signal was produced, the one or more web pre-tension and reset control units 613 that produced the pre-tension signal then produces a reset signal. In the embodiment illustrated in FIGS. 33A and 33B, the decision making circuit 611 is responsive to the reset signal produced by any one or more of the web pre-tension and reset control units 613 to control the air pressure control unit 600 in a manner that causes the web actuator 830 to release the web turning mechanism 844, to thereby release the pre-tension on the web 802 and accordingly return the web 802, to its default position. In its default positions, the linear actuator 830 provides for a conventional amount of slack in the web 802. In this way, the decision making circuit 611 is responsive to a reset signal to control the air pressure control unit 600 in a manner that moves the web actuator 830 to a web reset position. Alternatively or additionally, the decision making circuit 611 may, on its own, control the air pressure control unit 600 in a manner that moves the web actuator 830 to a web reset position after passage of a predetermined time period since receiving the web pre-tension signal, as described hereinabove. In any case, it will be understood that the resettable web pre-tensioning device 830 may be used alone or in combination with the resettable web pre-tensioning system 560 illustrated and described hereinabove.

While the resettable web pre-tensioning system 550 and device 560 were disclosed hereinabove in the context of a vehicle suspension seat, it will be understood that the system 550 and device 560 may alternatively be used with any vehicle seat, including portable vehicle seats. Moreover, while the resettable web pre-tensioning system 550 and device 560 were disclosed hereinabove as being operable between a web pre-tension position and a web reset position, the present disclosure contemplates alternatively or additionally controlling operation of the web actuators 568 and 570 to other positions between the web reset and the web pre-tension positions. For example, the decision making circuit 611 may be configured to control the air pressure control unit 600 in a manner that moves the vehicle restraint harness 530 only sufficiently to provide a tactile indicator to the occupant of the seat 500 of an impending event, such as an imminent collision with another structure, dozing off of the occupant, or the like. The decision making circuit 611 may control the air pressure control unit 600 in this embodiment to move the restraint web 530 in any desired pattern, e.g., single movement, pulsed movement, periodic single or pulsed movement, etc. In any case, the decision making circuit 611 may thereafter be responsive to a reset signal, or on its own, to control the air pressure control unit 600 to move the restraint harness 530 back to its default or reset position.

The embodiment of the resettable web pre-tensioning device 560 has been illustrated and described herein as including two linear actuators 568 and 570, wherein the linear actuators 568 and 570 are operable, under the control of the decision making circuit 611, to move between reset and web pre-tension positions to thereby pre-tension and reset the four-point restraint harness 530. In this embodiment, one or more rocker arms and/or similar mechanisms may be provided to amplify or dampen the movement of the linear actuators 568 and 570. In an alternate embodiment, the restraint harness may be a conventional three-point restraint harness including a single shoulder portion and a lap portion. In this embodiment, the resettable web pre-tensioning device 560 may include two linear actuators 568 and 570 as described herein. Alternatively, in this embodiment, the resettable web pre-tensioning device 560 may include only a single linear actuator 568 or 570 configured to linearly actuate only one side of the lap portion of the restraint harness 530. In this embodiment, the housing or carrier 565 may define both longitudinal chambers 565E and 565F with the single linear actuator 568 or 570 disposed in one of the chambers 565E or 565F, or may instead define only one of the chambers 565E or 565F with the single linear actuator 568 or 570 disposed therein.

All of the linear actuators 568, 570 and 830 have been illustrated and described herein as being air-pressure controlled linear actuators. In one alternative embodiment, any one or more of the linear actuators 568, 570 and 830 may be electrically controlled linear actuators, pneumatically controlled linear actuators, or any combination of air pressure, electrically and pneumatically controlled linear actuators. In another alternative embodiment, any one or more of the linear actuators may be a conventional fluidic muscle linear actuator. One embodiment of a fluidic muscle linear actuator includes a membrane wrapped in a watertight, flexible conduit or hose. When pressurized air is introduced into the unit, a grid pattern formed by the membrane is deformed or shortened, thereby creating a linear pulling force in the axial direction. When the pressurized air is removed, the membrane returns to its original length. This type of linear actuator requires only a single compressed air line.

Figure 34:
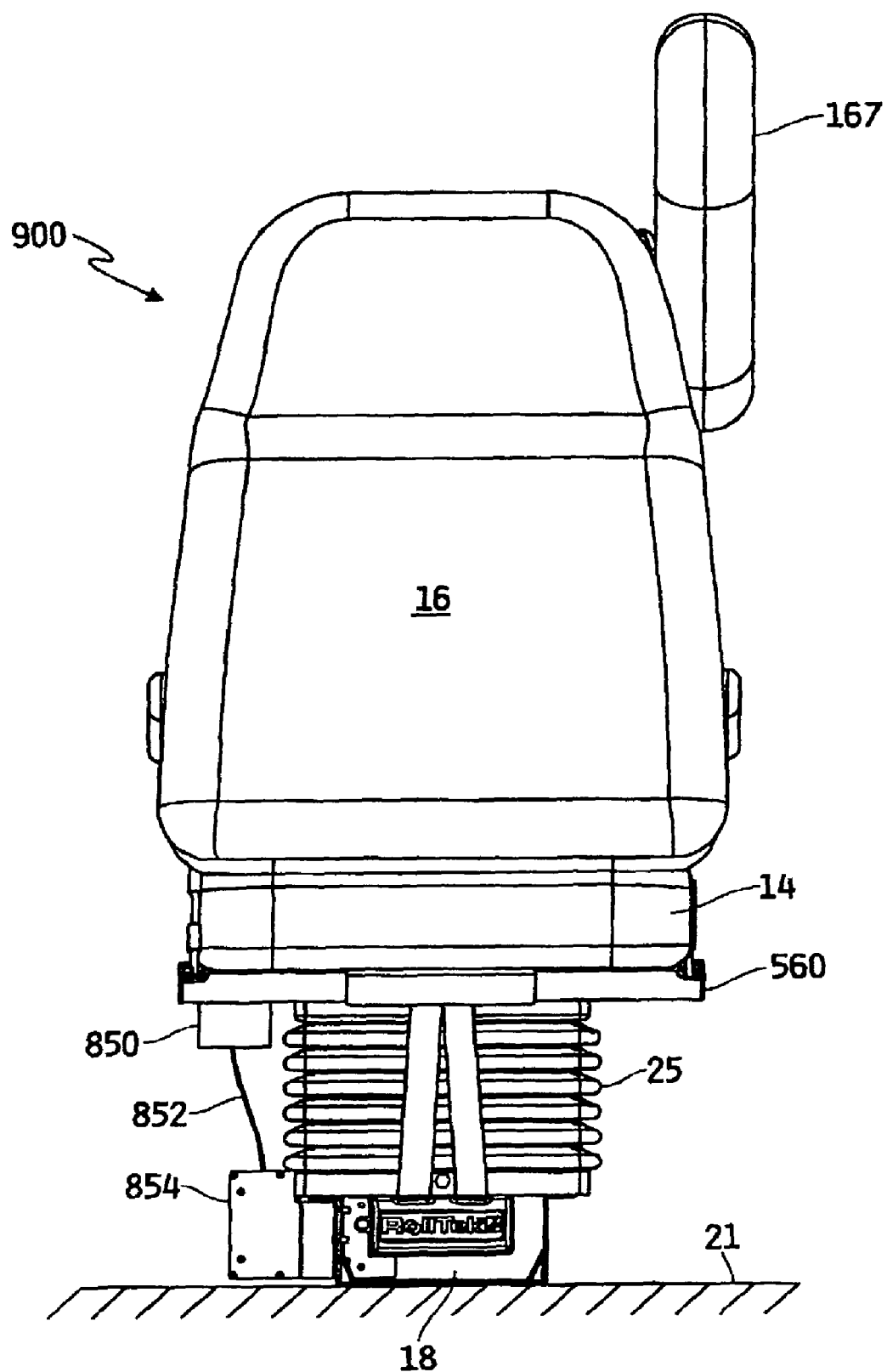
FIG. 34 is a rear elevational view of a vehicle safety seat including a warning device mounted to thereto.

Referring now to FIG. 34, a vehicle seat 900 is shown and includes a seat bottom 14 mounted to a seat base 18, and a seat back 16 extending upwardly away from the seat bottom 14. The seat base 18 is configured to be mounted to a support surface 21 of the vehicle using any of the seat base mounting embodiments described herein. A sensor and/or event detection unit 854 is mounted to the seat base 18, and is electrically connected to a warning or alert device 850 via a signal path 852. The unit 854 may represent any of the control systems illustrated and described herein, and in any case includes a decision making circuit configured to control operation of the warning or alert device 850. The seat 900 includes an integral, side-mounted inflatable restraint 167, as illustrated and described herein, which is shown in FIG. 34 in its deployed position. The seat 900 also includes a web pre-tensioning device 560 as illustrated and described herein.

For diagnostic and other purposes, it is desirable to capture the driver's attention. Conventionally this is accomplished via one or more visual warning indicators mounted in the instrument cluster or panel area. However, with such systems the vehicle driver must visually scan the various visual warning indicators from time to time to keep apprised of possible alert or warning conditions. In the illustrated embodiment, the warning or alert device 850 captures the driver's attention by stimulating a sense other than sight to alert the driver to an alert or warning condition and/or to direct the driver's attention to the conventional visual warning indicators. The unit 854 is responsive to an alert or warning condition to activate the warning or alert device in a conventional manner. In one embodiment, for example, the warning or alert device 850 may be or include a vibratory device that is configured to be responsive to an activation signal produced by the unit 854 to vibrate in a manner that captures the driver's attention. Alternatively or additionally, the warning or alert device 850 may be or include an audible device that is configured to be responsive to an activation signal produced by the unit 854 to generate audible signals of sufficient volume, pitch, pattern, etc. to capture the driver's attention. In lieu of, or in addition to, the warning or alert device 850, one or more of the control systems mounted to the seat may be responsive to the alert or warning condition to produce a web pre-tensioning signal that causes the web pre-tensioning device 560 to pre-tension the restraint harness (not shown) of the vehicle seat 900 according to a predefined actuation pattern that prompts the vehicle driver to look to the conventional visual warning indicators.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while a number of vehicle safety seat features have been illustrated and described herein, it will be understood that the present disclosure contemplates vehicle safety seat embodiments having any one or combination of such vehicle safety seat features integral therewith.

What is claimed is:

1. A vehicle safety seat comprising:
    a suspension seat including an occupant seat coupled to a seat base, the seat base attachable to a support surface of a motor vehicle via a number of seat base attachment members,
    a sensor module mounted to the seat base, the sensor module including a sensor configured to produce a sensor signal upon detection of at least one of a vehicle roll over event and a vehicle impact event,
    at least one electrical wire electrically connectable to the sensor, wherein electrical connection between the at least one electrical wire and the sensor is required for operation of the sensor,
    a seat base removal safety mechanism that requires electrical disconnection of, or that causes electrical disconnection of, the at least one electrical wire from the sensor before all of the number of seat base attachment members the seat base can be accessed to completely detach the seat base from the support surface of the vehicle.

2. The vehicle safety seat of claim 1 further comprising an electrical connector electrically connected by the at least one electrical wire to the sensor and configured to be electrically connected to the sensor module.

3. The vehicle safety seat of claim 2 wherein the electrical connector comprises a voltage supply connector configured to supply an operating voltage to the sensor.

4. The vehicle safety seat of claim 2 wherein the electrical connector comprises a signal connector configured to provide a sensor signal produced by the sensor to a signal processor.

5. The vehicle safety seat of claim 2 wherein the electrical connector comprises a voltage supply electrical connector configured to supply an operating voltage to the sensor module and a signal connector configured to provide a sensor signal produced by the sensor to a signal processor.

6. The vehicle safety seat of claim 2 wherein the electrical connector blocks access to the seat base removal safety mechanism when electrically connected to the sensor module.

7. The vehicle safety seat of claim 6 wherein the number of seat base attachment members comprises at least a first attachment member configured to extend through the seat base and engage the support surface of the vehicle,
    and wherein the seat base removal safety mechanism comprises a second attachment member extending into the seat base and over the first attachment member such that the second attachment member normally blocks access to the first attachment member when extended through the seat base and over the first attachment member, and wherein the sensor module is positioned relative to the seat base such that the electrical connector inhibits access to the second attachment member when the electrical connector is electrically connected to the sensor module, and such that the second attachment member is accessible when the electrical connector is electrically disconnected from the sensor module.

8. The vehicle safety seat of claim 7 wherein the seat base comprises an engaging member configured to receive the second attachment member, the second attachment member configured to extend into the seat base and into engagement with the engaging member to secure the second attachment member to the seat base.

9. The vehicle safety seat of claim 7 wherein the first attachment member comprises a first bolt and the second attachment member comprises a second bolt.

10. The vehicle safety seat of claim 2 wherein the electrical connector inhibits movement of the seat base removal safety mechanism relative to the seat base when electrically connected to the sensor module.

11. The vehicle safety seat of claim 2 wherein the number of attachment members comprises at least a first attachment member configured to extend through the seat base and engage the support surface of the vehicle, and wherein the seat base removal safety mechanism comprises a safety plate mounted to the seat base, a first portion of the safety plate positioned relative to the seat base to inhibit access to the first attachment mechanism when the electrical connector is electrically connected to the sensor module, the safety plate positioned between the electrical connector and the sensor module such that the electrical connector inhibits movement of the safety plate relative to the seat base to thereby inhibit access to the first attachment member when electrically connected to the roll sensor.

12. The vehicle safety seat of claim 11 further including a sensor mounting bracket having the sensor module mounted thereto, the sensor mounting bracket mounted to the seat base via a plurality of mounting elements, and wherein a second portion of the safety plate extends over at least one of the plurality of mounting elements to inhibit access thereto and thereby inhibit removal of the sensor mounting bracket when the electrical connector is electrically connected to the roll sensor.

13. The vehicle safety seat of claim 12 wherein the sensor mounting bracket includes at least one anti-rotation tab extending over a portion of the seat base, the at least one anti-rotation tab engaging the seat base and preventing rotation of the sensor mounting bracket relative to the seat base when enough of the plurality of mounting elements have been removed to otherwise permit rotation of the sensor mounting bracket relative to the seat base.

14. The vehicle safety seat of claim 1 further comprising a vehicle seat mounting plate having a bottom plate member configured to be mounted to a support surface of the vehicle and a top plate member movably attached to the bottom plate member and configured to be attached to the seat base, wherein a first subset of the number of seat base attachment members extend through the bottom plate member to secure the seat base to the support surface, the first subset of the number of seat base members accessible only when the top plate member is moved away from the bottom plate member to an open position to expose the first subset of the number of seat base attachment members, and wherein a second subset of the number of seat base attachment members extend through the top and bottom plate members to secure the seat base to the support surface when the top plate member is moved toward the bottom plate member to a closed position in which access to the first subset of the number of seat base attachment members is blocked by the top plate member.

15. The vehicle safety seat of claim 14 wherein the seat base removal safety mechanism comprises a contact switch mounted to one of the top and the bottom plate members, the contact switch being closed by contact with the other of the top and bottom plate members when the top and bottom plate members are in the closed position, and the contact switch being opened when the top and bottom plate members are moved sufficiently away from each other toward the open position, the contact switch interposed in-line with the at least one electrical wire such that the sensor module is only operable when the contact switch is closed and the sensor module is inoperable when the contact switch is otherwise open.

16. The vehicle safety seat of claim 15 wherein the at least one electrical wire is one of a ground wire connecting a voltage supply to the sensor module and a signal wire connecting the sensor to a signal processor.

17. The vehicle safety seat of claim 1 wherein the sensor comprises at least one of a roll sensor and a vehicle impact sensor.

18. The vehicle safety seat of claim 1 wherein the sensor comprises a roll sensor and includes a signal output electrically connected to a signal processor, the signal processor processing a roll sensor signal produced by the roll sensor at the signal output to determine whether a vehicle roll over event is occurring.

19. The vehicle safety seat of claim 18 wherein the occupant seat is coupled to the seat base by a suspension mechanism, and wherein the suspension seat includes an actuator responsive to a seat actuation signal to draw the occupant seat toward the seat base to a locked position relative to the seat base, and wherein the signal processor is configured to produce the seat actuation signal when the signal processor determines that the vehicle roll over event is occurring.

20. The vehicle safety seat of claim 1 wherein the sensor comprises a vehicle impact sensor and includes a signal output electrically connected to a signal processor, the signal processor processing a vehicle impact sensor signal produced by the vehicle impact sensor at the signal output to determine whether a vehicle impact event is occurring.

* * * * *